US012674670B1

(12) United States Patent　(10) Patent No.: US 12,674,670 B1
Thompson　(45) Date of Patent: Jul. 7, 2026

(54) SYSTEMS AND METHODS FOR AUTONOMOUS SWARM OPERATIONS IN SUBTERRANEAN AND GPS-DENIED ENVIRONMENTS

(71) Applicant: Drone Operations LLC, Mosinee, WI (US)

(72) Inventor: Nicholas Thompson, Mosinee, WI (US)

(73) Assignee: DRONE OPERATIONS LLC, Mosinee, WI (US)

( * ) Notice: Subject to any disclaimer, the term of this patent is extended or adjusted under 35 U.S.C. 154(b) by 0 days.

(21) Appl. No.: 19/369,299

(22) Filed: Oct. 26, 2025

Related U.S. Application Data

(63) Continuation-in-part of application No. 19/262,766, filed on Jul. 8, 2025.

(51) Int. Cl.
*G01C 21/28* (2006.01)
*G01C 21/16* (2006.01)
(Continued)

(52) U.S. Cl.
CPC .......... *G01C 21/1652* (2020.08); *G01S 19/09* (2013.01); *G05D 1/6985* (2024.01)

(58) Field of Classification Search
None
See application file for complete search history.

(56) References Cited

U.S. PATENT DOCUMENTS 6,904,335 B2 * 6/2005 Solomon .............. G05D 1/0088
700/262
9,524,648 B1 * 12/2016 Gopalakrishnan ...... G06F 21/00
(Continued)

OTHER PUBLICATIONS

Aydemir, Fatih & Cetin, Aydin; "Multi-Agent Dynamic Area Coverage Based on Reinforcement Learning with Connected Agents", Computer Systems Science and Engineering, vol. 45, No. 1, pp. 215-230. Jun. 9, 2022, https://doi.org/10.32604/csse.2023.031116.

(Continued)

*Primary Examiner* — Jonathan M Dager

(74) *Attorney, Agent, or Firm* — GALVIN PATENT LAW LLC; Brian R. Galvin

(57)　ABSTRACT

An autonomous drone swarm system and method for subterranean and GPS-denied operations utilizing artificial intelligence for coordinated operations comprises command drones equipped with large language model processors and subordinate drones coordinated through a hierarchical Queen-Worker architecture. The system processes natural language commands, generates autonomous mission plans, and coordinates multi-drone operations through an encrypted self-healing mesh communication network utilizing multiple modalities including radio frequency, optical, acoustic, and visual channels. A Unified Ground Frame with Surface-Referenced Z (UGF-SRZ) coordinate system provides signed vertical coordinates enabling seamless operation across surface and subterranean environments. GPS-denied navigation combines multi-sensor dead reckoning, collaborative positioning, and distributed mapping with fog-layer processing for enhanced accuracy. The system implements federated learning protocols for distributed AI improvement, fault-tolerant operation with automatic leader election, and specialized adhesion Workers functioning as persistent infrastructure nodes.

20 Claims, 20 Drawing Sheets

(51) Int. Cl.
    *G01S 19/09*     (2010.01)
    *G05D 1/698*     (2024.01)

(56)      References Cited

U.S. PATENT DOCUMENTS

| | | | | |
|---|---|---|---|---|
| 10,025,303 B1* | 7/2018 | Annan | B64U 50/37 | |
| 10,162,351 B2* | 12/2018 | Shaw | G05D 1/0027 | |
| 10,310,518 B2* | 6/2019 | MacCready | G05D 1/104 | |
| 10,694,529 B2* | 6/2020 | MacCready | H04W 8/005 | |
| 10,909,859 B1* | 2/2021 | Dodd | G08G 5/53 | |
| 11,237,877 B2* | 2/2022 | Anderson | G06F 9/45558 | |
| 11,644,829 B2* | 5/2023 | Shaw | G05D 1/0027 | |
| | | | | 701/2 |
| 11,721,030 B2* | 8/2023 | Liu | H04N 23/661 | |
| | | | | 382/284 |
| 11,920,899 B2* | 3/2024 | Squillace | F41G 7/2253 | |
| 11,958,183 B2* | 4/2024 | Zhang | B25J 9/1664 | |
| 12,050,476 B2* | 7/2024 | Kang | G05D 1/104 | |
| 12,366,854 B2* | 7/2025 | Venkatesh | G06Q 10/0631 | |
| 2004/0030449 A1* | 2/2004 | Solomon | H04L 67/12 | |
| | | | | 700/248 |
| 2014/0222248 A1* | 8/2014 | Levien | G08G 5/57 | |
| | | | | 701/2 |
| 2015/0334768 A1* | 11/2015 | Ranasinghe | G06V 10/84 | |
| | | | | 370/328 |
| 2016/0247404 A1* | 8/2016 | Srivastava | G08G 5/723 | |
| 2016/0293018 A1* | 10/2016 | Kim | G08G 5/53 | |
| 2017/0083979 A1* | 3/2017 | Winn | G06Q 20/102 | |
| 2017/0131727 A1* | 5/2017 | Kurdi | G05D 1/0027 | |
| 2017/0236428 A1* | 8/2017 | High | G08G 5/55 | |
| | | | | 701/120 |
| 2018/0010914 A1* | 1/2018 | Hardt | G01C 21/165 | |
| 2018/0074520 A1* | 3/2018 | Liu | G08G 5/25 | |
| 2018/0139152 A1* | 5/2018 | Shaw | H04W 84/18 | |
| 2018/0247544 A1* | 8/2018 | Mustafic | H04W 48/08 | |
| 2018/0310127 A1* | 10/2018 | Xia | H04W 24/10 | |
| 2019/0355145 A1* | 11/2019 | Bruner | H04W 4/38 | |
| 2022/0075068 A1* | 3/2022 | Liu | G01S 15/89 | |
| 2022/0136832 A1* | 5/2022 | Berkovich | G01C 21/206 | |
| | | | | 701/446 |
| 2023/0058405 A1* | 2/2023 | Chen | B64C 39/024 | |
| 2023/0081963 A1* | 3/2023 | James | G05D 1/6985 | |
| | | | | 701/2 |
| 2023/0086306 A1* | 3/2023 | Venkatesh | G08G 5/22 | |
| | | | | 701/2 |
| 2023/0089776 A1* | 3/2023 | Venkatesh | B64U 10/13 | |
| | | | | 701/3 |
| 2023/0091555 A1* | 3/2023 | Venkatesh | G08G 5/55 | |
| | | | | 700/3 |
| 2023/0177968 A1* | 6/2023 | Arksey | G06T 7/73 | |
| | | | | 701/120 |
| 2023/0409054 A1* | 12/2023 | Bradley | G05D 1/106 | |
| 2025/0052854 A1* | 2/2025 | Pratt | G01C 21/38 | |
| 2025/0208619 A1* | 6/2025 | Frey | G05D 1/2247 | |
| 2025/0223036 A1* | 7/2025 | Venkatesh | B64C 39/024 | |
| 2025/0224737 A1* | 7/2025 | Bohez | G06N 3/0499 | |

OTHER PUBLICATIONS

Cai, Xuli, et al; "Multi-Agent Deep Reinforcement Learning for Optimized Multi-UAV Coverage and Power-Efficient UE Connectivity", arXiv:2503.23669v1, Mar. 31, 2025.

Chan, Brian J. et al; "Don't do RAG: When Cache-Augmented Generation is all you Need for Knowledge Tasks", arXiv:2412.15605v2, Feb. 23, 2025.

Dewi, Maya Utami, et al; "Optimizing AI Performance in Industry: A Hybrid Computing Architecture Approach Based on Big Data", Journal of Technology Informatics and Engineering, 3(3), pp. 308-323, Dec. 12, 2024.

Goecks, Vinicius G. & Waytowich, Nicholas; "COA-GPT: Generative Pre-trained Transformers for Accelerated Course of Action Development in Military Operations", arXiv:2402.01786v2, Mar. 28, 2024.

Hoang, Duc N. M., et al; "Clustered and Scalable Federated Learning Framework for UAV Swarms", TechRxiv. May 4, 2023.

Lewis, Patrick, et al; "Retrieval-Augmented Generation for Knowledge-Intensive NLP Tasks", arXiv:2005.11401v4, Apr. 12, 2021.

Lin, Chin-Yew; "Rouge: A Package for Automatic Evaluation of Summaries", In Proceedings of Workshop on Text Summarization Branches Out, Post-Conference Workshop of ACL 2004, Barcelona, Spain.

Reddy, Revanth Gangi, et al; "SmartBook: AI-Assisted Situation Report Generation for Intelligence Analysts" arXiv:2303.14337v3, May 27, 2024.

Spitzer, Philipp, et al; "Looking Through the Deep Glasses: How Large Language Models Enhance Explainability of Deep Learning Models." In Proceedings of Mensch und Computer 2024 (MuC '24). Sep. 1-4, 2024, Association for Computing Machinery, New York, NY, USA, pp. 566-570. https://doi.org/10.1145/3670653.3677488.

Yang, Xinyu, et al.; "APE: Faster and Longer Context-Augmented Generation via Adaptive Parallel Encoding", arXiv:2502.05431v2, Feb. 12, 2025.

Zhao, Ji & Lin, Xiao; "General-Purpose Aerial Intelligent Agents Empowered by Large Language Models", arXiv:2503.08302v1, Mar. 11, 2025.

* cited by examiner

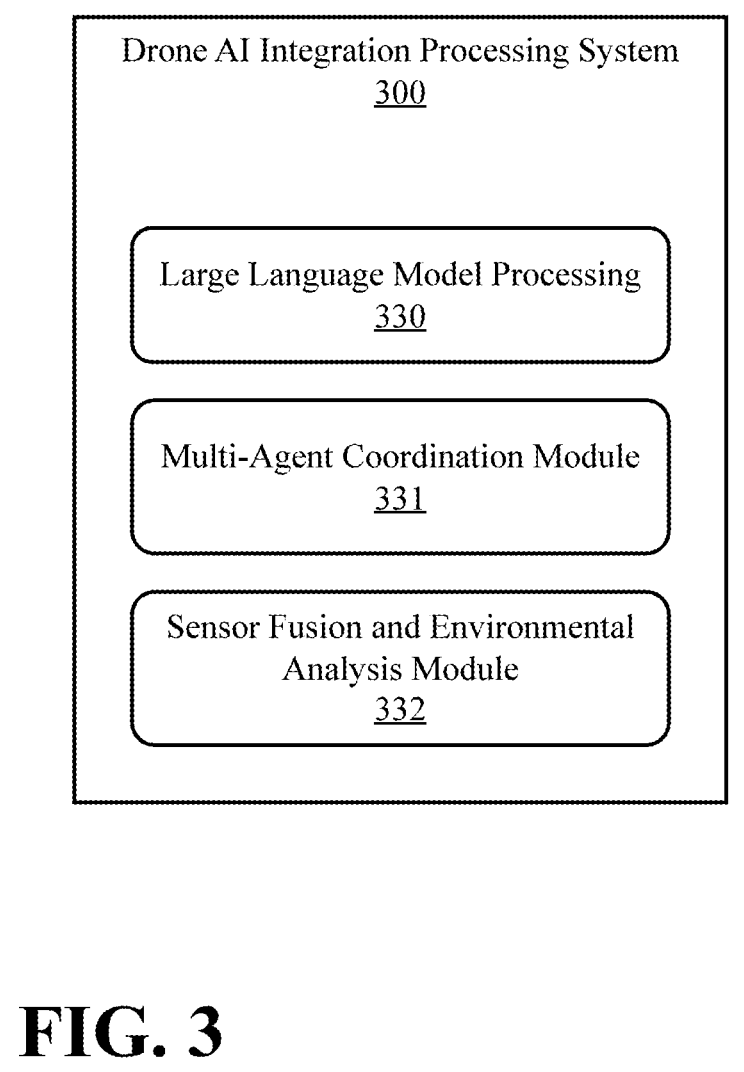

Drone AI Integration Processing System
300

Large Language Model Processing
330

Multi-Agent Coordination Module
331

Sensor Fusion and Environmental
Analysis Module
332

FIG. 3

Figure 4:
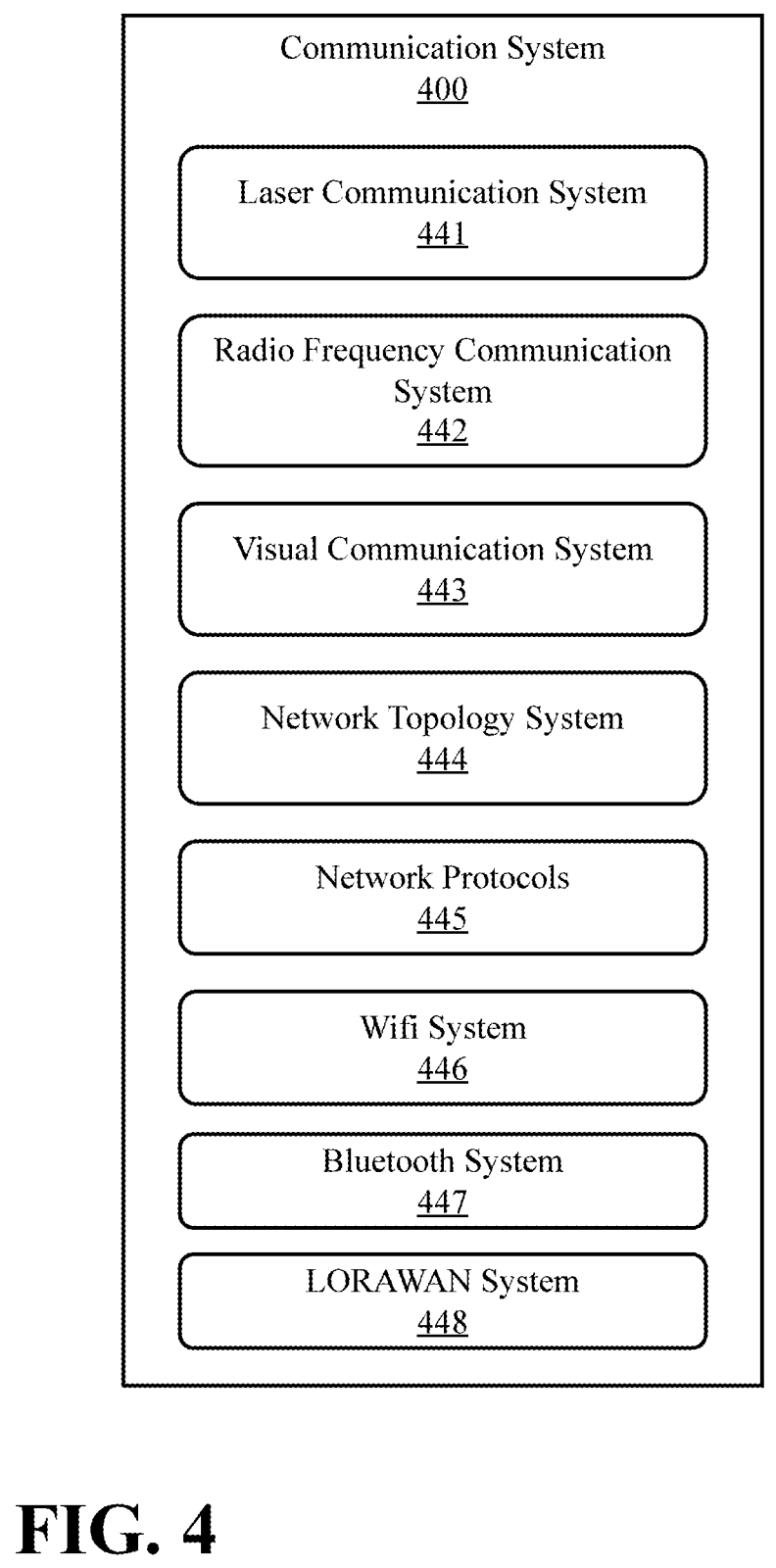

Communication System
400

Laser Communication System
441

Radio Frequency Communication
System
442

Visual Communication System
443

Network Topology System
444

Network Protocols
445

Wifi System
446

Bluetooth System
447

LORAWAN System
448

SYSTEMS AND METHODS FOR AUTONOMOUS SWARM OPERATIONS IN SUBTERRANEAN AND GPS-DENIED ENVIRONMENTS

CROSS-REFERENCE TO RELATED APPLICATIONS

Priority is claimed in the application data sheet to the following patents or patent applications, each of which is expressly incorporated herein by reference in its entirety:
Ser. No. 19/262,766

BACKGROUND OF THE INVENTION

Field of the Art

The present disclosure relates to autonomous unmanned aerial systems (UAS), and more particularly to hierarchical multi-agent drone swarms configured for reliable operation in subterranean or otherwise GPS-denied environments.

Discussion of the State of the Art

Unmanned systems frequently rely on satellite navigation and high-bandwidth communications to maintain position, coordinate tasks, and exchange mission data. In subterranean settings—including tunnels, mines, underground facilities, basements, urban substructures, and hardened bunkers—satellite signals are attenuated or blocked and communications pathways are obstructed. Conventional single-platform SLAM robots or tethered solutions lack scalability, resilience, and mission throughput, particularly when the operational area extends beyond line-of-sight or includes dynamic hazards (e.g., dust, smoke, RF interference, collapses).

There is a need for a scalable, fault-tolerant Queen-Worker swarm architecture that: (i) maintains accurate relative and absolute navigation without GNSS, (ii) builds and shares subterranean maps cooperatively, (iii) preserves command and control despite harsh multipath, and (iv) continues mission execution when individual units fail. There is further a need for a global, surface-referenced vertical coordinate usable above and below ground, and for survey-grade traverse and leveling adjustments to continuously back-trace position and elevation where GPS is unavailable. Additional needs include cornering and lost line-of-sight (LOS) continuity, single-drone triangulation using a fixed sensor baseline, UGF-specific Workers capable of adhering to infrastructure, a fog-layer server that offloads computationally intensive point-cloud processing and synchronizes with a cloud backend, and robust surface selection and estimation that adapts to forested mountains, deserts with shifting sands, and other dynamic or data-sparse regions.

SUMMARY OF THE INVENTION

Accordingly, the inventor has conceived and reduced to practice, an autonomous drone swarm system and method for subterranean and GPS-denied operations utilizing artificial intelligence for coordinated operations comprises command drones equipped with large language model processors and subordinate drones coordinated through a hierarchical Queen-Worker architecture. The system processes natural language commands, generates autonomous mission plans, and coordinates multi-drone operations through an encrypted self-healing mesh communication network utilizing multiple modalities including radio frequency, optical, acoustic, and visual channels. A Unified Ground Frame with Surface-Referenced Z (UGF-SRZ) coordinate system provides signed vertical coordinates enabling seamless operation across surface and subterranean environments. GPS-denied navigation combines multi-sensor dead reckoning, collaborative positioning, and distributed mapping with fog-layer processing for enhanced accuracy. The system implements federated learning protocols for distributed AI improvement, fault-tolerant operation with automatic leader election, and specialized adhesion Workers functioning as persistent infrastructure nodes.

According to a preferred embodiment, an autonomous drone swarm system for subterranean and GPS-denied operations is disclosed, comprising: a hierarchical swarm architecture comprising: at least one command drone comprising a large language model processor configured to process natural language instructions and generate autonomous mission plans; and a plurality of subordinate drones configured to execute tasks delegated by the command drone; a multi-modal communication system establishing encrypted mesh network connectivity between drones using at least two communication modalities selected from radio frequency, optical beaconing, acoustic signaling, and visual communication channels, wherein the mesh network implements self-healing protocols that automatically adapt routing pathways when individual communication links become unavailable; a GPS-denied navigation system comprising: multi-sensor dead reckoning algorithms processing inertial measurement data, visual odometry, and LiDAR scan matching; a Unified Ground Frame with Surface-Referenced Z (UGF-SRZ) coordinate system that dynamically selects surface references from hierarchical data sources comprising satellite-derived digital surface models, fog-maintained surface mosaics, local drone-generated cursory mapping, and algorithmic surface estimation, and computes signed vertical coordinates where positive SRZ values indicate positions above the selected surface reference and negative SRZ values indicate positions below the surface reference, thereby enabling unified coordinate representation across surface and subterranean operational environments; and collaborative positioning protocols that share navigation data across the mesh network to enhance swarm-wide positioning accuracy; a distributed mapping and localization system specifically configured for subterranean operations comprising: edge processing algorithms at individual drones that generate keyframes, feature descriptors, and point cloud fragments optimized for GPS-denied environments; fog layer processing that performs multi-agent map fusion, loop closure detection, and pose graph optimization using data streams from multiple drones, wherein the fog layer integrates UGF-SRZ surface corrections with collaborative mapping to maintain coordinate consistency between surface and subterranean operations; and map correction distribution that provides updated environmental models and UGF-SRZ positioning corrections back to individual drones, enabling seamless navigation transitions between surface and underground environments.

According to another preferred embodiment, a method for autonomous drone swarm operations in subterranean and GPS-denied environments is disclosed, comprising the steps of: coordinating drone operations through a hierarchical swarm architecture by: processing natural language instructions at a command drone using a large language model processor to generate autonomous mission plans; and executing tasks at a plurality of subordinate drones as delegated by the command drone; establishing encrypted mesh network connectivity between drones using at least two communication modalities selected from radio frequency, optical beaconing, acoustic signaling, and visual communication channels, and implementing self-healing protocols that automatically adapt routing pathways when individual communication links become unavailable; performing GPS-denied navigation by: processing inertial measurement data, visual odometry, and LiDAR scan matching using multi-sensor dead reckoning algorithms; computing signed vertical coordinates using a Unified Ground Frame with Surface-Referenced Z (UGF-SRZ) coordinate system that dynamically selects surface references from hierarchical data sources comprising satellite-derived digital surface models, fog-maintained surface mosaics, local drone-generated cursory mapping, and algorithmic surface estimation, where positive SRZ values indicate positions above the selected surface reference and negative SRZ values indicate positions below the surface reference, thereby enabling unified coordinate representation across surface and subterranean operational environments; and sharing navigation data across the mesh network using collaborative positioning protocols to enhance swarm-wide positioning accuracy; executing distributed mapping and localization specifically configured for subterranean operations by: generating keyframes, feature descriptors, and point cloud fragments at individual drones using edge processing algorithms optimized for GPS-denied environments; performing multi-agent map fusion, loop closure detection, and pose graph optimization at a fog layer processor using data streams from multiple drones, wherein the fog layer integrates UGF-SRZ surface corrections with collaborative mapping to maintain coordinate consistency between surface and subterranean operations; and distributing updated environmental models and UGF-SRZ positioning corrections back to individual drones, enabling seamless navigation transitions between surface and underground environments.

According to a further aspect, the method includes deploying UGF-specific adhesion Workers that adhere to infrastructure surfaces including walls, ceilings, and pipes, and operating the adhesion Workers as persistent communication relays, navigation reference targets, and environmental sensors.

According to a further aspect, the method includes implementing federated learning by generating compressed model parameter updates at subordinate drones based on local operational experience, transmitting the updates to the command drone without transmitting raw sensor data, and aggregating the updates at the command drone to improve swarm-wide artificial intelligence capabilities.

According to a further aspect, the method includes implementing fault-tolerant operations by continuously monitoring health of drone platforms, automatically redistributing tasks when individual drones become unavailable, executing consensus-based leader election using distributed algorithms when command drones fail, and maintaining essential mission capabilities through degraded-mode operations despite reduced swarm capacity.

According to a further aspect, the method includes computing signed vertical coordinates comprising implementing surface selection policies that prioritize satellite-derived digital surface models when available, utilize fog-maintained surface mosaics when satellite data is unavailable or outdated, activate local drone-generated cursory mapping when higher-priority sources are insufficient, and apply algorithmic surface estimation as a fallback when direct measurement is not feasible.

According to a further aspect, the method includes performing single-vehicle triangulation using a duo-sensing baseline scheme wherein individual drones equipped with two spatially separated sensors at a fixed baseline distance estimate distance and bearing for autonomous navigation when peer drones are not visible.

According to a further aspect, the method includes activating store-and-forward protocols during communication degradation by writing critical telemetry and events to append-only, content-addressable logs with signed manifests, queuing data by priority levels, encrypting data at rest, implementing opportunistic peer synchronization between drones, and distributing erasure-coded parity to prevent mission data loss.

According to a further aspect, the method includes performing multi-agent map fusion further comprising implementing point cloud registration using iterative closest point algorithms, generating three-dimensional meshes through surface reconstruction, and performing semantic labeling of environmental elements using machine learning algorithms.

According to a further aspect, the method includes executing GPS-denied traverse and back-trace methodology by performing systematic station-to-station movement with distance, azimuth, and vertical difference measurements, calculating misclosure upon return to starting position, and correcting errors using horizontal Bowditch adjustment and rise-and-fall vertical leveling to achieve survey-grade positioning accuracy.

According to a further aspect, the method includes establishing encrypted mesh network connectivity further by implementing delay-tolerant networking protocols for orchestrating data synchronization during communication restoration, and executing integrity-checked bandwidth scheduling with content hash deduplication to optimize catch-up operations.

BRIEF DESCRIPTION OF THE DRAWING FIGURES

FIG. 3 is a block diagram illustrating an artificial intelligence integration architecture, according to an embodiment.

FIG. 4 is a block diagram illustrating an exemplary communication architecture for the multi-modal communication systems, encryption protocols, and mesh network topology that enable resilient coordination and data, according to an embodiment.

Figure 19:
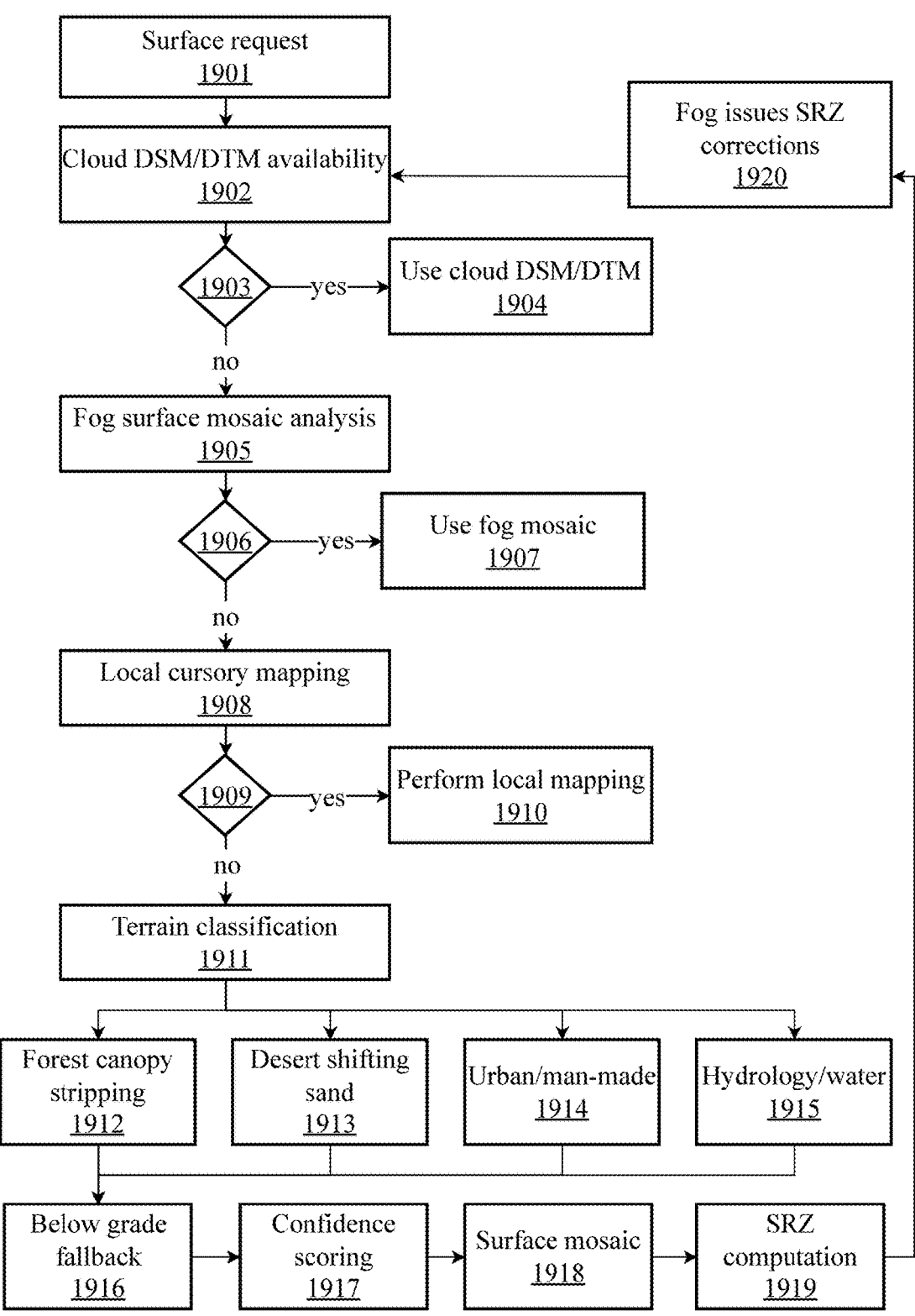

FIG. 19 is a flow diagram illustrating an exemplary method for surface selection and estimation which implements a hierarchical source priority system, confidence scoring algorithms, terrain-specific algorithmic estimation techniques, and below-grade fallback procedures to provide robust surface-referenced coordinate determination across diverse operational environments, according to an embodiment.

Figure 20:
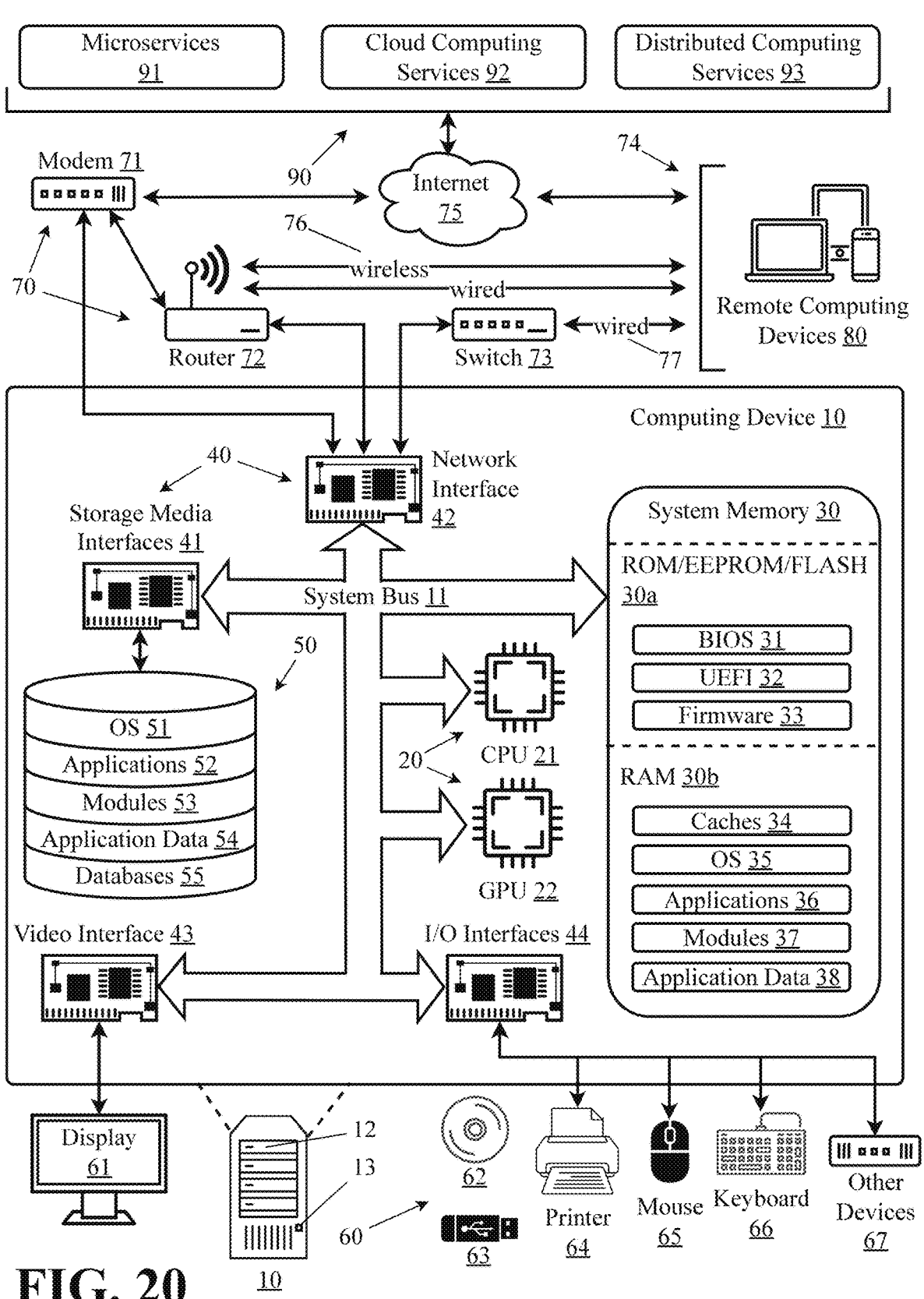

FIG. 20 illustrates an exemplary computing environment on which an embodiment described herein may be implemented.

DETAILED DESCRIPTION OF THE INVENTION

The inventor has conceived, and reduced to practice, an autonomous drone swarm system and method for subterranean and GPS-denied operations utilizing artificial intelligence for coordinated operations comprises command drones equipped with large language model processors and subordinate drones coordinated through a hierarchical Queen-Worker architecture. The system processes natural language commands, generates autonomous mission plans, and coordinates multi-drone operations through an encrypted self-healing mesh communication network utilizing multiple modalities including radio frequency, optical, acoustic, and visual channels. A UGF-SRZ coordinate system provides signed vertical coordinates enabling seamless operation across surface and subterranean environments. GPS-denied navigation combines multi-sensor dead reckoning, collaborative positioning, and distributed mapping with fog-layer processing for enhanced accuracy. The system implements federated learning protocols for distributed AI improvement, fault-tolerant operation with automatic leader election, and specialized adhesion Workers functioning as persistent infrastructure nodes.

The command drone processes natural language instructions from operators and autonomously develops mission plans, delegates tasks to subordinate drones, and coordinates swarm operations. The system integrates multiple sensor modalities including, but not limited to, electro-optical, infrared, LiDAR and photogrammetry, radio frequency, thermal, and chemical detection capabilities to provide comprehensive environmental awareness and target recognition.

The system can be implemented as a self-healing communication architecture utilizing redundant laser, radio frequency, and visual communication channels with AES-256 encryption. The system employs federated learning algorithms to maintain coordination in signal-denied environments and includes fault-tolerant protocols for continued operation despite individual drone failures.

The autonomous drone swarm system implements a hierarchical agent architecture wherein command drones function as coordinating agents that process mission objectives, environmental conditions, and swarm status to generate coordination decisions and task assignments, while subordinate drones operate as execution agents that autonomously interpret assigned tasks, adapt to local environmental conditions, and execute mission activities while maintaining coordination with the command agent and peer agents within the swarm network.

Command drone agents implement high-level decision-making capabilities including natural language processing for operator command interpretation, strategic mission planning based on available resources and environmental analysis, dynamic task allocation among subordinate agents based on capabilities and positioning, and swarm-wide coordination oversight that monitors mission progress and adapts coordination strategies based on operational feedback. Subordinate drone agents execute autonomous task processing including local environmental assessment and obstacle avoidance, tactical maneuvering and formation maintenance, sensor data collection and preliminary analysis, and collaborative coordination with peer agents for enhanced mission effectiveness while maintaining communication and coordination with the commanding agent throughout mission execution.

The agent-based architecture enables distributed intelligence wherein each drone operates as an autonomous decision-making entity capable of independent action while contributing to collective mission objectives, providing scalable coordination that adapts to changing swarm composition, environmental conditions, and mission requirements through intelligent agent interaction and collaborative decision-making processes.

The system processes natural language commands, generates autonomous mission plans, and coordinates multi-drone operations through an encrypted self-healing mesh communication network utilizing laser, radio frequency, and visual communication channels. Multi-modal sensor integration including, but not limited to, electro-optical, infrared, light detection and ranging (LiDAR) and photogrammetry, radio frequency, and chemical detection provides comprehensive environmental awareness while federated learning algorithms enable distributed coordination in signal-denied environments. The system implements configurable operational modes spanning tactical (e.g., spanning time ranges of 15 minutes-2 hours and/or covering a space of 2 to 5 square kilometers), operational (e.g., spanning time ranges of 6-24 hours and/or covering a space of 20 to 50 square kilometers), and strategic (e.g., spanning time ranges of 7-30+ days and/or covering a space of 200 to 500 square kilometers) mission profiles for military and commercial applications. Fault-tolerant protocols ensure continued operation despite individual failures through automatic task redistribution and leader election procedures.

In various embodiments, the autonomous drone swarm system implements a comprehensive operational framework comprising three distinct operational levels, each optimized for specific mission durations, coverage areas, and tactical objectives. The operational framework enables scalable deployment from immediate tactical support through sustained operational missions to long-term strategic objectives, providing commanders with flexible autonomous capabilities across the full spectrum of military and civilian operations.

The autonomous drone swarm system's operational framework is fundamentally designed around the military principle that commanders often trade space for time in operational planning. This principle recognizes that applying concentrated force and resources within a defined spatial area can significantly reduce mission duration and increase operational effectiveness. Conversely, operations requiring coverage of larger geographic areas typically necessitate extended mission durations to maintain adequate surveillance density and operational impact. The drone swarm system's configurable operational modes reflect this space-time relationship, enabling commanders to optimize force deployment based on specific mission requirements, available resources, and tactical constraints.

The system's multi-tier operational framework (e.g., tactical, operational, and strategic) incorporates both temporal and spatial parameters as flexible guidelines rather than rigid constraints. In line with military doctrine, these parameters are flexible; applying greater force may reduce mission duration, allowing commanders to trade space for time based on operational requirements. The operator maintains complete control over mission configuration, setting specific parameters including, but not limited to, mission duration, geographic coverage area, surveillance density, force allocation, and operational objectives. Once the operator defines and confirms these mission parameters, the system's agentic artificial intelligence algorithms autonomously optimize all aspects of execution including, but not limited to, drone deployment patterns, resource allocation strategies, power management protocols, communication network configuration, and coordination procedures within the operator-specified constraints.

This clear division of responsibilities ensures that tactical and strategic decision-making remains under human command authority, while the complex technical optimization and real-time operational management are handled autonomously by the system. The operator retains oversight and can modify mission parameters at any time, while the system continuously adapts its autonomous operations to achieve the specified objectives within the established parameters. This approach provides commanders with the flexibility to adapt the system's capabilities to diverse operational contexts while maintaining the autonomous coordination and fault-tolerant operation that characterize the system's core functionality.

Tactical operations typically last from fifteen minutes to twenty-four hours and cover geographic areas ranging from two to five square kilometers, optimized for immediate, localized response scenarios requiring rapid deployment and concentrated surveillance or tactical support. The tactical mode configures the drone swarm for high-intensity operations with emphasis on rapid response times, detailed surveillance coverage, and immediate tactical impact within confined operational areas. Examples include convoy protection, breach overwatch, emergency medical evacuation support, and immediate threat response operations where concentrated drone coverage within a limited area provides maximum operational effectiveness.

Operational missions typically extend from one day to six days and cover geographic areas ranging from twenty to fifty square kilometers, designed for sustained regional coverage requiring persistent surveillance and coordinated multi-drone operations across moderate geographic scales. The operational mode balances surveillance persistence with resource sustainability, implementing power management protocols, coordinated drone rotation schedules, and extended communication networks that maintain operational effectiveness throughout the extended mission duration. Examples include wide-area surveillance, infrastructure protection, border monitoring segments, and regional security operations where sustained coverage across moderate geographic areas supports broader operational objectives.

Strategic deployments typically span from seven to thirty days and cover geographic areas ranging from two hundred to five hundred square kilometers, configured for long-term, large-scale autonomous operations requiring minimal human oversight and comprehensive integration with theater-level command and logistics systems. The strategic mode emphasizes autonomous operation sustainability, automated logistics coordination, and integration with national-level intelligence and command systems while maintaining persistent surveillance and coordination capabilities across extensive geographic areas. Examples include theater-wide surveillance, strategic border monitoring, maritime domain awareness, and campaign-duration operations where long-term autonomous coverage of large geographic areas supports strategic military objectives.

The autonomous drone swarm system implements a clear separation of responsibilities between human operators and autonomous system functions, ensuring that strategic and tactical decision-making authority remains under human command while complex technical optimization is handled autonomously. Operator responsibilities may comprise defining mission objectives, setting operational parameters such as mission duration and geographic coverage areas, specifying surveillance priorities and force allocation levels, establishing rules of engagement and operational constraints, and maintaining oversight authority with the ability to modify parameters or terminate operations at any time.

System autonomous functions encompass all technical optimization and real-time operational management within operator-defined parameters, including, but not limited to, autonomous calculation of optimal drone deployment patterns based on coverage requirements and available resources, automatic resource allocation and power management optimization to maximize mission duration and effectiveness, real-time coordination protocol implementation and communication network management, continuous environmental monitoring and tactical adaptation based on changing conditions, and automatic fault tolerance and recovery procedures when individual drones fail or become unavailable.

This role separation ensures that human judgment and command authority are preserved for all strategic and tactical decisions, while the system's artificial intelligence capabilities handle the complex technical coordination and optimization tasks that exceed human processing capacity in real-time operational environments. The operator can intervene at any level of operation, from high-level mission modification to direct control of individual drones when necessary, while the system provides comprehensive autonomous support that enhances operational effectiveness without compromising command authority.

The system's operational mode configuration process enables dynamic adjustment of both temporal and spatial parameters based on specific mission requirements and operational constraints, fully reflecting established military doctrine regarding the space-time relationship in operational planning. In line with military doctrine, these parameters are flexible; applying greater force concentration within a defined area may significantly reduce mission duration, while extended coverage areas typically require longer mission durations to maintain operational effectiveness. Mission commanders specify desired coverage areas, surveillance density requirements, mission duration, force allocation levels, and operational objectives, exercising complete control over strategic and tactical parameters.

The system's artificial intelligence algorithms then autonomously optimize all technical aspects of mission execution, automatically calculating optimal drone deployment patterns, implementing dynamic resource allocation strategies, managing power consumption and battery rotation schedules, configuring communication network topology and relay protocols, and establishing coordination procedures to achieve commander-specified objectives within the established parameters. This approach ensures that the same hardware and software systems can be effectively deployed across diverse operational scenarios ranging from intensive short-duration tactical support requiring concentrated force application to extensive long-duration strategic operations requiring sustained coverage across large geographic areas.

Tactical operations provide immediate, short-duration support for frontline units and emergency response scenarios, typically lasting from fifteen minutes to two hours over two to five square kilometers. The tactical operational mode configures the drone swarm for high-intensity, localized missions requiring rapid deployment and immediate tactical impact. A "Convoy Guardian" mode implements a two-tier screening formation wherein subordinate drones establish overwatch positions three hundred meters ahead of friendly convoys and one hundred fifty meters to each flank. The convoy guardian mode employs automated threat detection algorithms that identify ambush indicators including, but not limited to, unusual terrain signatures, concealed positions, and electronic warfare emissions. Upon threat detection, the system automatically cues counter-fire micro-munitions or directs suppressive fires while maintaining continuous overwatch of the convoy route. A "Point-of-Breach Overwatch" mode establishes vertical racetrack patterns directly over breach points during urban operations or facility entries. The overwatch configuration utilizes any one of or combination of the various sensing systems which may be configured onto a drone platform including, but not limited to, LiDAR and photogrammetry and electro-optical/infrared feeds transmitted directly to squad heads-up displays, providing real-time tactical intelligence to ground forces. The system automatically marks muzzle flashes and other hostile indicators, enabling immediate suppressive fire coordination and tactical adaptation. A "Quick-Look ISR Bubble" mode deploys subordinate drones in a three-hundred-sixty-degree perimeter at five hundred meter radius around designated points of interest. The ISR bubble automatically classifies moving targets and hands off tracking information to integrated fire control systems including ATK-NET and advanced field artillery tactical data system (AFATDS). The configuration provides comprehensive situational awareness for tactical commanders while maintaining automated threat tracking and engagement coordination. A "HLZ/DZ & MEDEVAC Survey" mode utilizes six to twelve drone micro-swarms that fan out to evaluate potential helicopter landing zones (HLZ) and drop zones (DZ) for medical evacuation (MEDEVAC) operations. The survey mission employs LiDAR and photogrammetry and electro-optical/infrared sensors to build three-dimensional obstruction maps, analyze slope conditions, sample wind patterns, and assess dust hazard levels. The system automatically scores potential sites using (for example) green/amber/red classifications and instantly transmits georeferenced coordinates to ATAK systems. Approved zones receive automatic marker deployment using infrared and visible strobes, while escort drones remain on station to guide inbound aircraft and provide casualty pickup overwatch. An "Ad Hoc Relay" mode converts a subset (e.g., approximately twenty percent) of the swarm to mesh relay nodes, extending voice and data communication capabilities five kilometers or more through urban clutter and challenging terrain. The relay configuration activates on demand to provide immediate communication support when primary communication systems become degraded or unavailable. A "Precision Marker" mode employs designator drones that provide laser target designation while shooter platforms remain masked from enemy observation. The precision marker configuration may comprise real-time wind compensation algorithms that adjust targeting data based on current atmospheric conditions, ensuring accurate fires coordination and target engagement. The system typically operates for thirty minutes or less during active engagement periods, providing critical fire support coordination for ground forces.

Operational operations provide sustained mission support lasting, typically, six to twenty-four hours over 20 to 500 square kilometers, configured for extended coverage areas and persistent surveillance requirements. The operational mode optimizes power management, communication relay efficiency, and sensor coordination for prolonged autonomous operations. A "Wide-Area Sentinel" mode implements sector scanning across a geographic area (e.g., a ten by ten kilometer) using rolling handoff protocols between multiple drone formations. The sentinel configuration fuses moving target indicator data, electronic warfare signal collection, and pattern-of-life analytics to provide comprehensive area surveillance. The system maintains continuous coverage through coordinated drone rotation and autonomous charging procedures. An "Air-Corridor Clearance" mode establishes protective corridors for low-level unmanned aerial system and rotary-wing aircraft operations. The clearance mission combines radio frequency geolocation with electro-optical correlation to identify and suppress threat drones within designated flight corridors. The system provides real-time airspace deconfliction and threat neutralization throughout specified mission windows. A "Mobile Command Post Shadow" mode maintains orbiting protective layers above tactical and advance headquarters vehicles, providing redundant communications capabilities, counter-unmanned aerial system protection, and obscurant deployment. The shadow configuration enables twelve-hour-plus continuous operations through coordinated drone rotation and provides backup command and control capabilities for mobile headquarters elements. A "Deep Fires Mesh" mode extends swarm operations fifty to one hundred kilometers beyond the forward line of own troops, combining organic sensors with satellite and airborne intelligence cues to nominate high-payoff targets. The fires mesh automatically generates digital call-for-fire messages transmitted to rocket and cannon units, providing real-time battle damage assessment for rapid re-attack capabilities. The system operates on twenty-four-hour cycles with seamless takeover and handoff procedures. An "Integrated Fires Tip & Cue" mode fuses satellite and airborne intelligence, surveillance, and reconnaissance with swarm sensors to generate target nominations, pushing fire-mission data to corps fires cells and returning live battle damage assessment for rapid re-attack coordination. The system operates on-call or in twenty-four-hour cycles based on operational requirements. A "Dynamic Fires Mesh" mode assigns sub-swarms to artillery units for on-call battle damage assessment, splash spotting, and re-target suggestions during active fire missions. The dynamic fires configuration operates on twenty-four-hour cycles, providing continuous fire support coordination and assessment capabilities. An "Infrastructure Defense Net" mode establishes a geofenced lattice over bridges, fuel farms, logistics package routes, and other critical infrastructure, automatically launching counter-rocket, artillery, and mortar micro-interceptors upon detection of inbound threats. The defense net provides continuous protection for critical infrastructure and logistics operations.

Strategic operations enable long-term persistent missions lasting seven to thirty days or campaign-duration deployments over 200 to 500 square kilometers, optimized for theater-level objectives and sustained autonomous operations with minimal human oversight. A "Persistent Border Monitor" mode establishes autonomous surveillance lanes covering one hundred fifty kilometers of border areas, integrating national intelligence, surveillance, and reconnaissance assets with organic drone sensors. The border monitoring system automatically flags massing forces and suspicious activities, pushing real-time alerts to command and control systems and joint/combined coordination centers. The persistent monitoring capability operates continuously for seven to thirty-day periods with automated logistical support. A "Theater Fires Orchestrator" mode deploys long-endurance swarm layers across theater-wide areas of operations, fusing national intelligence, synthetic aperture radar, and Joint Surveillance Target Attack Radar System feeds with organic swarm intelligence to generate pre-planned and dynamic long-range precision fires target sets. The orchestrator system provides continuous target development, fire corridor deconfliction, and persistent kill-chain visibility for corps and combined-joint fires coordination cells throughout campaign-duration operations. A "Critical Node Resilience" mode pre-positions power-augmented relay drones over satellite communication gateways, ports, airfields, and other critical infrastructure nodes to guarantee communications continuity if primary infrastructure becomes disrupted. The resilience configuration activates automatically upon infrastructure damage or communications disruption, providing immediate backup capabilities essential for maintaining command and control during contingency operations. A "Maritime Chokepoint Watch" mode implements hybrid air and sea swarm deployments over strategic maritime passages and straits. The chokepoint monitoring combines Automatic Identification System spoof-checking, electro-optical/infrared vessel identification, and cueing of naval assets for comprehensive maritime domain awareness. The system can be configured to provide fourteen-day continuous monitoring with automated vessel tracking and classification. A "Strategic Deception Grid" mode coordinates multiple drone formations to emit tailored radio frequency, infrared, and radar signatures that simulate brigade-sized military movements designed to mislead adversary sensor systems. The deception operations coordinate with theater-level information operations and provide tactical deception capabilities lasting, for example, twenty-four to seventy-two hours based on operational requirements. A "Theater EW Umbrella" deploys high-altitude endurance drones that map the electromagnetic spectrum, jam hostile command and control links, and dynamically allocate quiet communication channels for friendly forces. The electronic warfare (EW) umbrella provides campaign-long electronic warfare capabilities, ensuring communication superiority and electromagnetic spectrum dominance throughout extended operations.

The operational framework described across tactical, operational, and strategic levels demonstrates the scalable autonomous capabilities enabled by the present drone swarm system, wherein identical hardware and software systems can be configured and deployed across mission profiles ranging from immediate tactical support to sustained strategic operations. The modular mission profile architecture enables rapid reconfiguration based on changing operational requirements while maintaining the core autonomous coordination and communication capabilities essential to effective swarm operations.

The Queen-Worker hierarchical architecture described herein demonstrates remarkable scalability and adaptability across tactical, operational, and strategic mission categories, with the core coordination structure remaining consistent while mission parameters, resource allocation, and coordination complexity adapt dynamically to operational requirements. At the tactical level, individual Queen drones typically coordinate between two to ten (but can coordinate with any number of) Worker drones in tight formations optimized for immediate response and high-intensity operations. The Queen's large language model processor focuses on rapid decision-making and real-time tactical adaptation, processing operator commands and environmental changes within seconds to minutes. Mission parameters emphasize speed, responsiveness, and concentrated effects, with Worker drones maintaining close proximity to the Queen for maximum coordination efficiency and immediate tactical impact.

The communication architecture operates at high bandwidth with minimal latency requirements, enabling real-time coordination for missions such as convoy protection, breach overwatch, and emergency medical evacuation support.

As operations scale to the operational level, the Queen-Worker architecture expands to coordinate multiple Hive formations across larger geographic areas and extended time periods. Individual Queens may coordinate with peer Queens to establish overlapping coverage zones, with each Queen managing its full complement of Worker drones across areas measuring tens of square kilometers. The mission parameters shift toward sustained surveillance, persistent coverage, and coordinated handoff procedures that maintain operational continuity over six to twenty-four hour periods. The Queen's artificial intelligence systems adapt to emphasize mission persistence, resource optimization, and coordinated drone rotation schedules that ensure continuous coverage while managing power consumption and maintenance requirements. Communication protocols adjust to accommodate longer-range coordination requirements and increased network complexity, with federated learning algorithms enabling enhanced coordination between multiple Queens operating in the same operational area.

At the strategic level, the Queen-Worker architecture scales to coordinate multiple squadrons comprising dozens of Hives across theater-wide areas of operation, with mission durations extending from weeks to campaign-length deployments. Queens operate with increased autonomy and sophisticated mission planning capabilities, coordinating not only with their immediate Worker complement but also with multiple peer Queens across vast geographic areas. The strategic operational parameters emphasize long-term mission planning, automated logistics coordination, and integration with theater-level intelligence and command systems. The artificial intelligence systems within Queens adapt to process strategic-level intelligence feeds, coordinate with national reconnaissance assets, and maintain persistent situational awareness across areas measuring hundreds of square kilometers. Mission parameters include automated resupply coordination, strategic deception operations, and integration with joint and coalition command structures, requiring enhanced communication security and sophisticated coordination algorithms that can operate effectively despite extended communication delays and contested electromagnetic environments.

The architectural adaptability extends to mission parameter optimization, where the same hardware and software systems automatically reconfigure based on operational category selection. Tactical missions prioritize rapid response algorithms, high-frequency position updates, and aggressive maneuvering protocols that maximize immediate tactical advantage. Operational missions balance responsiveness with endurance, implementing power management protocols, coordinated rotation schedules, and expanded sensor integration that supports sustained operations. Strategic missions emphasize long-term stability, predictive maintenance algorithms, and integration with external intelligence and logistics systems that enable persistent operations with minimal human oversight. The Queen's decision-making algorithms can automatically adjust planning horizons, risk assessment parameters, and resource allocation priorities based on the selected operational category, ensuring optimal performance across the full spectrum of mission requirements while maintaining the fundamental coordination principles that enable effective autonomous swarm operations.

In a convoy protection mission scenario, autonomous drone swarm system's agentic processing demonstrates its capabilities when mission parameters specify protecting a friendly convoy from Point A to Point B, maintaining 300-meter forward reconnaissance, identifying and alerting on potential threats according to rules of engagement, and reporting threats immediately to convoy commanders. When external stimuli are detected including electro-optical sensors detecting unusual heat signatures 400 meters ahead of the convoy, LiDAR and/or photogrammetry indicating metallic objects concealed behind vegetation, and radio frequency sensors detecting electronic emissions consistent with improvised explosive devices, the agentic processing system responds through autonomous threat assessment, mission parameter integration, autonomous action execution, and continuous adaptation.

The autonomous threat assessment process involves agents processing multiple sensor inputs simultaneously, correlating heat signature, metallic object detection, and RF emissions data, classifying threat probability as high based on pattern recognition algorithms, and determining that immediate response is required. Mission parameter integration enables agents to reference rules of engagement parameters, evaluate mission constraints including convoy protection and reconnaissance maintenance requirements, and select appropriate response levels including alert procedures and tactical positioning. Autonomous action execution follows with agents executing immediate threat alerts to convoy commanders, coordinating with other drones to establish overwatch positions, initiating detailed surveillance of suspected threat locations, and maintaining convoy protection formation while monitoring threats.

Continuous adaptation capabilities enable agents to monitor threat development and convoy movement, adjust surveillance patterns based on threat behavior, prepare escalation procedures if threat levels increase, and maintain communication with human commanders throughout operations. This agentic processing approach demonstrates real-time decision-making wherein agents independently classify threats and select responses without waiting for human authorization, multi-source integration that combines data from optical, LiDAR, and RF sensors to reach threat assessment conclusions, mission alignment that selects actions fulfilling protection missions while maintaining operational constraints, autonomous coordination that initiates coordination with other drones without external commands, and adaptive monitoring that continuously adjusts surveillance based on evolving situations.

Agentic processing differs significantly from conventional automated systems that rely on pre-programmed rules such as "IF heat signature detected, THEN send alert," single-input responses where each sensor triggers predetermined actions, limited contextual evaluation that cannot assess threat significance, restricted coordination requiring external coordination commands, and static responses that execute the same action regardless of situational context. Agentic processing provides intelligent assessment that evaluates multiple inputs for comprehensive threat analysis, contextual responses with actions appropriate to specific threat levels and mission context, autonomous coordination that initiates appropriate multi-drone responses, adaptive behavior that modifies approaches based on threat development, and mission-aware actions that balance threat response with mission continuation requirements, enabling sophisticated autonomous operations that exceed conventional automation capabilities while maintaining alignment with human-defined mission objectives and operational constraints.

The autonomous drone swarm system's multi-tier operational framework provides comprehensive solutions for civilian and commercial applications, with tactical operations addressing emergency response scenarios, operational missions supporting infrastructure monitoring and maintenance, and strategic deployments enabling long-term environmental monitoring and resource management. The scalable Queen-Worker architecture adapts from immediate emergency response through sustained commercial operations to persistent environmental stewardship, providing civilian organizations with the same autonomous coordination capabilities developed for military applications.

According to an embodiment, tactical-level emergency response operations leverage the system's rapid deployment and immediate response capabilities for disaster relief, search and rescue, and emergency services coordination. During natural disasters such as earthquakes, hurricanes, or wildfires, the drone swarm can deploy within minutes to establish communication relays in affected areas, conduct rapid damage assessment, and coordinate emergency response activities. As an example, the convoy guardian configuration adapts to escort emergency vehicle convoys through disaster areas, providing real-time hazard detection and route clearance. The point-of-breach overwatch transforms into structural assessment missions, where drones establish overwatch positions above collapsed buildings or damaged infrastructure to provide real-time intelligence to search and rescue teams using building-penetrating sensors and thermal imaging capabilities.

Additionally, quick-look ISR bubble configurations provide immediate situational awareness for incident commanders during mass casualty events, chemical spills, or terrorist incidents, establishing perimeter surveillance while automatically tracking emergency personnel and civilian movements to ensure responder safety and operational coordination. The HLZ/DZ & MEDEVAC survey capability directly translates to civilian emergency medical services, where drone swarms rapidly assess potential helicopter landing zones for medical evacuation while providing continuous overwatch during patient extraction operations. Emergency response missions typically last from fifteen minutes to two hours, matching the tactical operational timeframe while providing critical immediate assistance during the most vulnerable phases of disaster response.

Operational-level infrastructure monitoring extends the system's capabilities to sustained commercial applications including utilities monitoring, transportation infrastructure assessment, and industrial facility surveillance over periods ranging from six hours to multiple days. Wide-area sentinel configurations adapt to monitor critical infrastructure such as power transmission lines, pipeline networks, and transportation corridors across areas measuring tens of square kilometers. The system provides continuous monitoring for equipment anomalies, unauthorized access, and environmental hazards while maintaining automated reporting to facility management systems and regulatory authorities.

Air-corridor clearance capabilities translate to commercial aviation support, where drone swarms maintain protective corridors around airports, ensuring airspace security and detecting unauthorized drone activity that could threaten commercial aircraft operations. The system provides real-time coordination with air traffic control systems and automated threat response capabilities. Mobile command post shadow configurations adapt to provide communication and surveillance support for mobile industrial operations such as mining, oil and gas exploration, and large-scale construction projects, maintaining persistent connectivity and security overwatch for remote operational sites.

Infrastructure defense net configurations protect critical commercial facilities including data centers, chemical plants, and logistics hubs by establishing automated perimeter security that detects and responds to intrusion attempts, equipment malfunctions, and environmental threats. The operational timeframe enables shift-based monitoring and maintenance schedules while providing continuous protection for high-value commercial assets. Dynamic monitoring systems can be configured to track equipment performance, predict maintenance requirements, and coordinate with facility management systems to optimize operational efficiency and prevent costly downtime.

Strategic-level environmental monitoring provides long-term autonomous surveillance and data collection for environmental research, conservation efforts, and resource management across vast geographic areas over periods ranging from weeks to years. Persistent border monitor configurations adapt to wildlife conservation applications, monitoring protected areas and migration corridors while detecting poaching activities, habitat encroachment, and environmental changes. The system integrates with satellite imagery and ground-based sensor networks to provide comprehensive ecosystem monitoring and automated threat detection for conservation organizations and government agencies.

Theater-wide environmental monitoring deploys long-endurance swarm layers across watersheds, forests, and agricultural areas to monitor air and water quality, track weather patterns, and assess environmental changes. The system fuses data from multiple sensor types including, but not limited to, chemical detectors, weather monitoring equipment, and biological sensors to provide real-time environmental assessments and early warning for pollution events, extreme weather, or ecological disruptions. Maritime environmental monitoring implements hybrid air and sea deployments to monitor ocean health, track marine life populations, and detect pollution events across large maritime areas.

Strategic environmental applications include climate research, where persistent drone deployments collect long-term atmospheric and surface data to support climate modeling and research initiatives. Agricultural monitoring provides season-long crop assessment, pest detection, and irrigation optimization across large farming operations, integrating with precision agriculture systems to optimize crop yields while minimizing environmental impact. Forest management applications provide continuous wildfire detection, timber assessment, and ecosystem health monitoring, supporting sustainable forestry practices and early warning systems for fire prevention.

Resource management applications include water resource monitoring across watersheds and groundwater systems, providing long-term data collection for water conservation and allocation decisions. Energy sector applications monitor renewable energy installations such as solar farms and wind installations, providing predictive maintenance, performance optimization, and security monitoring across distributed energy infrastructure. The strategic operational framework enables these applications to operate with minimal human oversight while providing continuous data collection and automated alerting for significant environmental changes or resource management requirements.

Commercial integration and scalability across all operational levels provides civilian organizations with flexible deployment options that scale from immediate emergency response through sustained commercial operations to long-term monitoring commitments. The modular architecture enables rapid reconfiguration between operational modes based on changing requirements, seasonal variations, or emergency conditions. Commercial customers can deploy the same hardware and software systems across multiple operational categories, maximizing investment value while maintaining consistent operational capabilities and reducing training requirements for personnel.

Integration with civilian command and control systems, regulatory reporting networks, and commercial communication infrastructure ensures seamless operation within existing organizational structures while providing enhanced capabilities that exceed traditional monitoring and response systems. The autonomous coordination capabilities reduce personnel requirements, minimize operational costs, and provide continuous coverage that exceeds human-operated alternatives while maintaining the flexibility and adaptability essential for diverse commercial applications across multiple industry sectors.

According to one aspect, a hierarchical swarm includes at least one command drone ("Queen") and a plurality of subordinate drones ("Workers") configured to operate cooperatively in subterranean or GPS-denied environments. Each drone executes light-weight multi-sensor dead-reckoning and local perception; Workers generate feature-level outputs and keyframes rather than full reconstructions; the Queen coordinates tasks and quality control. A secure, self-healing mesh uses adaptive channel selection (e.g., low-frequency RF, optical line-of-sight, acoustic signaling) and relay chaining to sustain connectivity through obstacles. The swarm executes collaborative SLAM and federated model updates, performs consensus-based leader election upon Queen loss, and dynamically reallocates tasks under power and health constraints.

In another aspect, a UGF-SRZ provides a signed vertical coordinate at any latitude/longitude that is referenced to the local surface directly overhead. The SRZ value is positive above the surface and negative below, unifying "AGL" and "BGL" into a single, explicit geodetic quantity. A surface selection policy dynamically chooses among satellite- or aerial-derived DSM/DTM sources, fog- or cloud-hosted updates, cursory Hive-led local mapping, and algorithmic surface estimation with confidence tagging; a below-grade fallback can be used when only coarse grade is known.

In another aspect, a GPS-denied traverse and back-trace pipeline models each station-to-station motion as survey observations—distance, azimuth/bearing, and vertical difference—then performs horizontal Bowditch/Transit adjustments and vertical rise-and-fall leveling (or full least-squares/pose-graph optimization) to minimize misclosures. Adjusted positions (E,N,U) are converted to SRZ.

In another aspect, a duo-sensing baseline scheme equips a drone with two spatially separated sensors at a fixed baseline (e.g., 6-18 inches). The drone performs single-vehicle triangulation and distance/bearing/elevation estimation using disparity, time-of-flight, or differential phase across the baseline, enabling robust cornering and lost-LOS resection when peers are not visible.

In another aspect, UGF-specific adhesion Workers ("perch nodes") adhere to walls, ceilings, pipes, or other infrastructure and function as persistent relays, reference targets, and environmental sensors. The same spatial triangulation can be done with any robotic system or man-portable device. Leave-behind tripods, vertical pickets, stuck-to-wall devices, or any other similar device can have the technology mounted to it to achieve the desired data communications path.

In another aspect, a Fog Layer Server positioned near the operation zone performs heavy 3D processing, including point-cloud registration (ICP/NDT), submap fusion, meshing/semantic labeling, multi-agent loop-closure search, UGF-SRZ surface mosaicking and correction, and delta synchronization with a cloud backend. The fog layer returns compressed, mission-appropriate map tiles and instructions to edge devices, reducing SWaP and power demands on the drones.

In another aspect, a non-transitory computer-readable medium stores instructions which, when executed, cause the system to perform any of the foregoing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, the term "Hive" refers to a coordinated unit comprising one command drone and one or more subordinate drones operating under unified autonomous control through the hierarchical Queen-Worker architecture.

As used herein, the term "Squadron" refers to a networked formation of multiple Hives coordinated for large-scale operations through inter-Hive communication and distributed leadership protocols.

As used herein, the term "Federated Learning" refers to a distributed machine learning process wherein individual drones generate model parameter updates based on local operational experience and transmit compressed learning data to command drones for swarm-wide performance improvement without transmitting raw sensor data.

As used herein, the term "Self-Healing Mesh Network" refers to a communication network topology that automatically detects failed communication links and dynamically reconfigures routing pathways through alternative drones to maintain network connectivity.

As used herein, the term "Agentic Processing" refers to artificial intelligence-driven computational processes wherein autonomous software agents execute decision-making, task selection, and response generation based on external stimuli, mission parameters, and learned behaviors. Agentic processing differs from conventional automated systems by implementing intelligent decision-making capabilities that enable autonomous agents to evaluate environmental conditions, interpret mission requirements, and execute appropriate responses without predetermined programming for specific scenarios. Agentic processing systems continuously analyze incoming data streams, assess situational context, and autonomously select optimal actions based on mission objectives and operational constraints rather than following rigid programmed sequences.

Agentic processing is characterized by autonomous decision-making wherein agents independently evaluate multiple response options and select optimal actions based on current conditions and mission parameters, environmental responsiveness that continuously monitors external stimuli including sensor data, communication inputs, and environmental changes to trigger appropriate agent responses, and mission parameter integration that incorporates operator-defined mission objectives, rules of engagement, and operational constraints into decision-making processes. The processing systems implement adaptive learning capabilities that modify decision-making approaches based on operational experience and environmental feedback, while maintaining contextual awareness that evaluates situational context including threat levels, resource availability, and tactical conditions to inform decision-making processes. The system implements agentic processing capabilities wherein AI agents continuously monitor environmental conditions and autonomously execute tactical responses based on detected threats, mission parameters, and operational constraints, enabling intelligent decision-making that adapts to changing conditions without requiring predetermined programming for specific scenarios.

Conceptual Architecture

Figure 6:
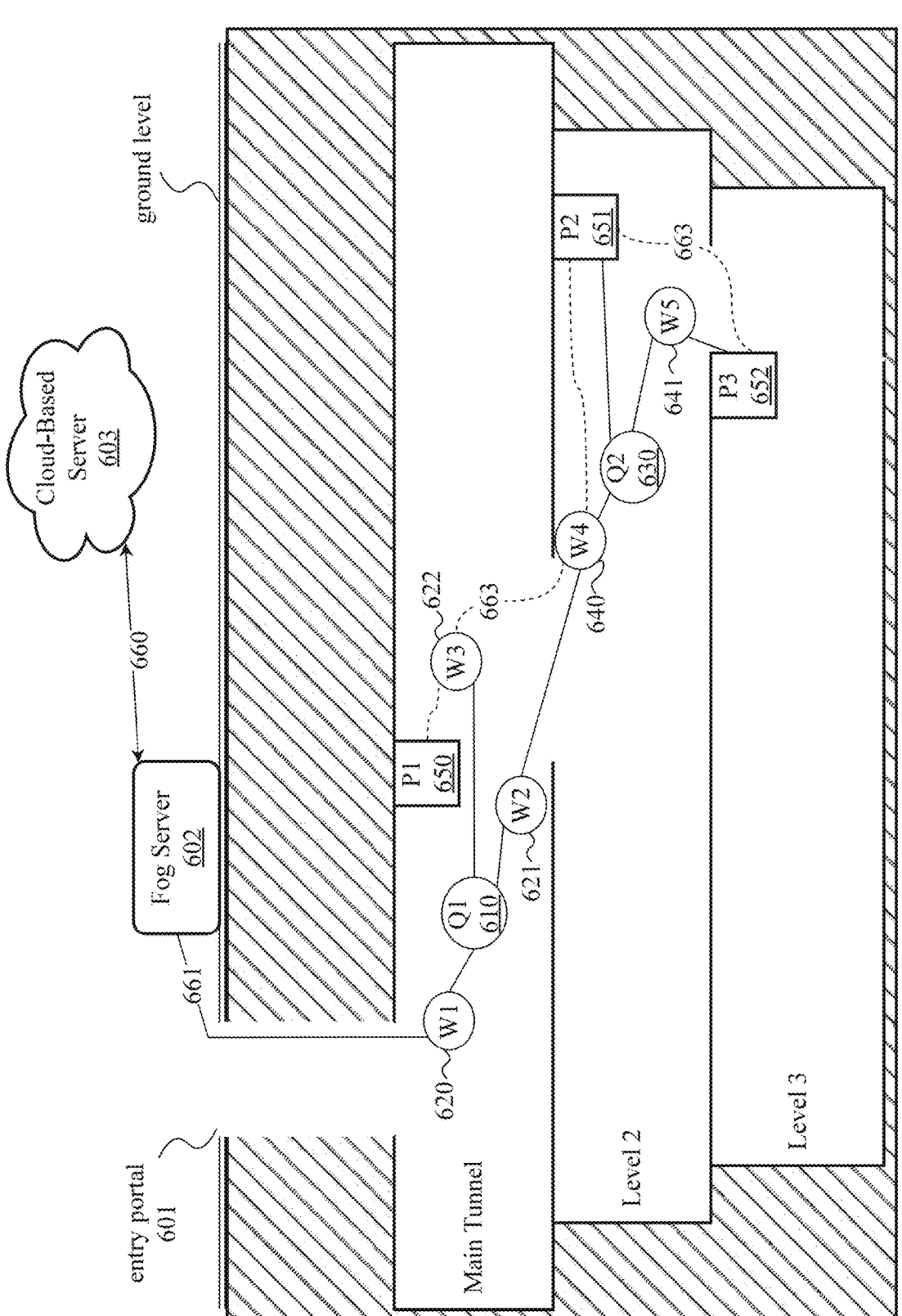
FIG. 6 is a block diagram illustrating an exemplary system architecture for an autonomous drone swarm system configured for subterranean and GPS-denied environments, according to an embodiment.

FIG. 6 is a block diagram illustrating an exemplary system architecture for an autonomous drone swarm system configured for subterranean and GPS-denied environments, according to an embodiment. The system demonstrates the hierarchical Queen-Worker coordination architecture operating within a multi-level underground facility with fog-assisted processing and cloud backend integration.

According to an embodiment, the system comprises surface infrastructure including entry portal 601 providing controlled access between surface operations and subterranean environments, fog layer server 602 positioned at the surface level for intermediate processing and coordination, and cloud backend 603 providing comprehensive data archival, analytics, and fleet management capabilities. Entry portal 601 serves as the primary communication gateway between surface-based fog layer server 602 and underground drone operations, enabling secure data transmission and mission coordination despite the GPS-denied operational environment. Fog layer server 602 may be a specifically configured implementation of field server 106.

An exemplary underground operational environment comprises multiple tunnel levels including main tunnel level 1, tunnel level 2, and tunnel level 3, with interconnecting passages and corner sections that create line-of-sight obstructions and communication challenges typical of subterranean operations. The multi-level tunnel architecture demonstrates the complex three-dimensional navigation requirements addressed by the autonomous drone swarm system.

According to an embodiment, the system implements a hierarchical swarm architecture comprising multiple independent drone swarms (i.e., Hives) operating cooperatively within the subterranean environment. Hive 1 comprises Queen drone (Q1) 610 serving as the primary command and coordination node for Worker drones 620, 621, and 622. Queen drone 610 implements large language model processing, mission planning algorithms, and swarm coordination protocols while maintaining direct command links with each subordinate Worker drone within its Hive. Worker drone 620 operates in proximity to Queen drone 610 for close coordination support, while Worker drones 621 and 622 are positioned to provide distributed sensor coverage and tactical positioning throughout tunnel level 1. In some embodiments, one or more worker drones may be configured for duo-sensing operations comprising two identical sensor packaged mounted on a single drone platform.

Hive 2 comprises Queen drone 630 coordinating Worker drones 640 and 641 within tunnel level 2. The multi-Hive architecture enables scalable operations across extensive underground areas while maintaining autonomous coordination capabilities and fault-tolerant operation despite individual component failures or communication disruptions.

According to an embodiment, the system incorporates specialized adhesion Workers functioning as perch nodes 650, 651, and 652 strategically positioned throughout the tunnel system. Perch node (P1) 650 is positioned at a corner junction between tunnel levels to provide communication relay capabilities and persistent environmental monitoring. Perch node (P2) 651 is mounted to tunnel infrastructure at tunnel level 2 to serve as a reference target for triangulation and navigation assistance. Perch node (P3) 652 is positioned at tunnel level 3 to extend communication range and provide redundant relay capabilities for deep underground operations. The adhesion Workers can adhere to walls, ceilings, pipes, or other infrastructure elements and function as persistent communication relays, reference targets for navigation, and environmental sensors, enabling sustained operations in areas where mobile drones cannot maintain continuous presence.

The communication architecture implements multiple link types optimized for subterranean operations. Cloud sync link 660 provides high-bandwidth communication between fog layer server 602 and cloud backend 603, enabling real-time data synchronization, model updates, and mission coordination with external command systems. Communication link 661 connects fog layer server 602 to entry portal 601, providing the primary data pathway between surface processing capabilities and underground operations.

According to an embodiment, direct command links connect each Queen drone to its respective Worker drones, providing reliable coordination and task delegation within each Hive. Queen drone 610 maintains direct command links with Worker drones 620, 621, and 622, while Queen drone 630 coordinates Worker drones 640 and 641 through similar direct communication pathways. Inter-Hive communication link enables coordination between Queen drones 610 and 630, allowing multiple Hives to operate cooperatively across large underground areas while maintaining autonomous decision-making capabilities within each Hive.

The system implements a self-healing mesh network architecture utilizing mesh network links between distributed components to provide redundant communication pathways and fault-tolerant connectivity. Mesh network links can connect Worker drones to perch nodes, enabling communication relay through fixed infrastructure elements when direct line-of-sight between mobile platforms becomes unavailable. The mesh network automatically adapts to changing topology as drones move through the tunnel system and as communication links become obstructed by environmental conditions or structural obstacles. Relay chain 663 (illustrated as a dashed line) demonstrates the system's capability to maintain communication continuity through complex underground topologies including corners, intersections, and areas with significant line-of-sight obstruction. The relay chain utilizes a combination of mobile Worker drones and fixed perch nodes to establish communication pathways from tunnel level 1 through corner sections to tunnel level 3, enabling coordination across the entire underground operational area despite the challenging RF propagation environment.

According to an embodiment, fog layer server 602 performs computationally intensive processing tasks including, but not limited to, point-cloud registration, submap fusion, pose-graph optimization, and surface-referenced coordinate calculations, reducing processing demands on individual drone platforms while providing enhanced analytical capabilities. The fog layer processes data streams from multiple drones simultaneously and returns compressed map tiles, navigation corrections, and mission updates to the underground swarm through entry portal 601. Cloud backend 603 provides long-term data storage, cross-mission analytics, and integration with broader command and control systems while maintaining the autonomous operational capabilities essential for GPS-denied environments.

The system architecture demonstrated in FIG. 6 provides scalable autonomous coordination from small-scale single-Hive operations to large-scale multi-Hive deployments across extensive underground facilities, while maintaining fault-tolerant communication and processing capabilities essential for reliable operation in subterranean and GPS-denied environments.

Figure 7:
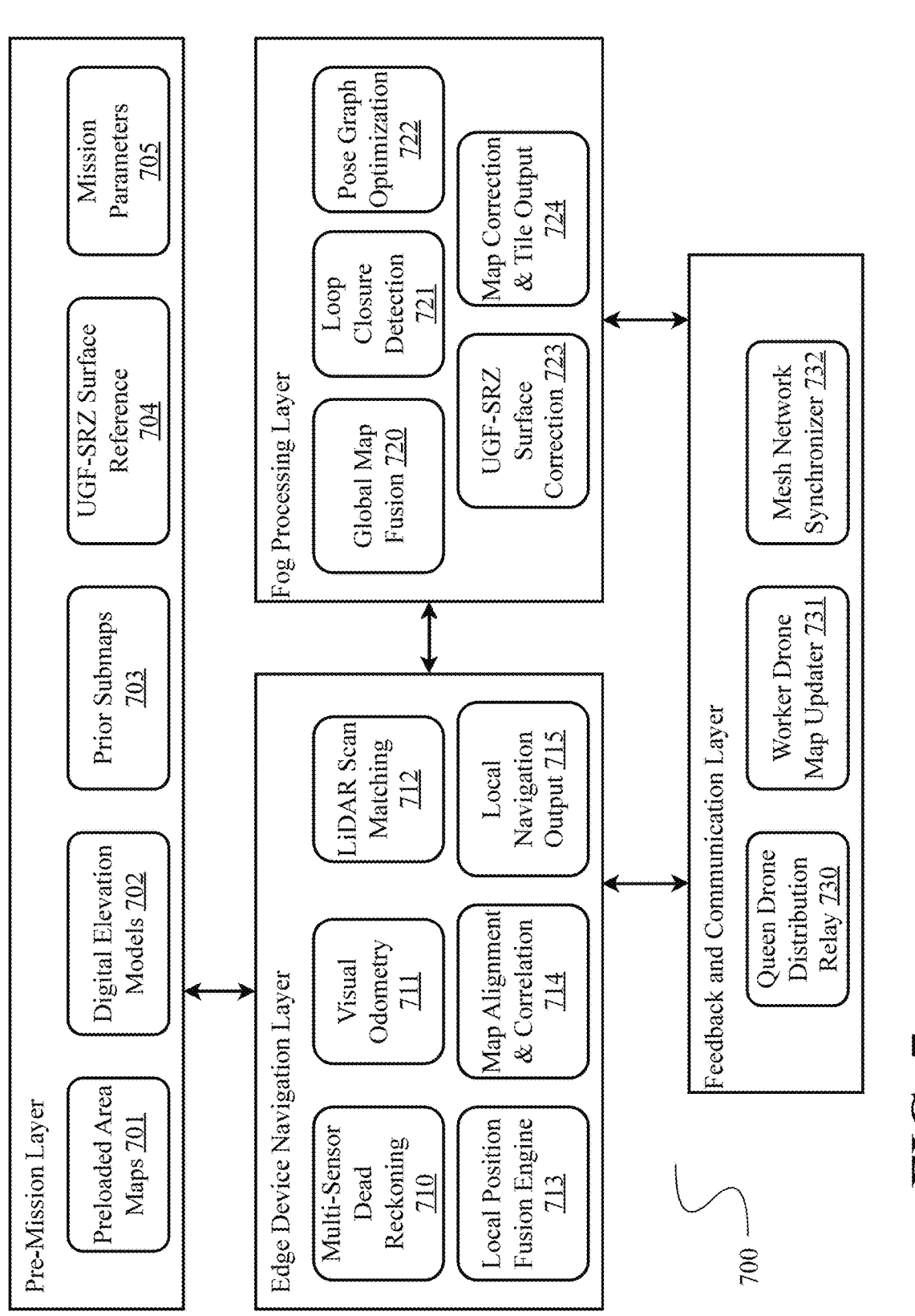
FIG. 7 is a block diagram illustrating an exemplary navigation stack architecture for GPS-denied subterranean operations, according to an embodiment.

According to a further embodiment, the subterranean drone swarm system illustrated in FIG. 6 implements the navigation stack architecture described in FIG. 7 to provide GPS-denied positioning and coordination capabilities throughout the underground operational environment. Each drone platform within the system, including Queen drones 610 and 630, Worker drones 620, 621, 622, 640, and 641, and perch nodes 650, 651, and 652, incorporates the edge device navigation layer components comprising multi-sensor dead reckoning, visual odometry, and LiDAR scan matching for autonomous position estimation and environmental awareness.

In some embodiments, fog layer server 602 implements the fog processing layer components including global map fusion, loop closure detection, pose graph optimization, and UGF-SRZ surface correction to provide computationally intensive navigation processing that exceeds the capabilities of individual drone platforms. The fog layer server 602 processes feature data streams transmitted from Queen drones 610 and 630 through communication link 661 and entry portal 601, performs collaborative SLAM operations across multiple drone platforms simultaneously, and generates map corrections for distribution back to the underground swarm.

Various navigation stack feedback mechanisms operate through the established communication architecture, wherein map corrections and navigation updates generated by fog layer server 602 are transmitted through entry portal 601 and distributed via Queen drone distribution through direct command links to Worker drone map update processes. Inter-Hive communication link 662 enables mesh network synchronization of navigation corrections between Queen drones 610 and 630, ensuring consistent positioning accuracy across multiple Hives operating within the subterranean environment. The mesh network links connecting Worker drones to perch nodes 650, 651, and 652 provide redundant pathways for navigation update distribution and enable continued positioning accuracy despite communication disruptions or line-of-sight obstructions typical of underground operations.

Pre-mission data provisioning for the navigation stack occurs through cloud backend 603 and fog layer server 602, which provide preloaded area maps, digital elevation models, prior submaps, UGF-SRZ surface reference, and mission parameters to Queen drones 610 and 630 prior to underground deployment. This integration of the navigation stack architecture with the hierarchical Queen-Worker swarm topology enables reliable autonomous coordination and positioning accuracy essential for effective subterranean operations in GPS-denied environments while maintaining the fault-tolerant communication and processing capabilities demonstrated in the system overview.

According to an embodiment, a duo-sensing baseline scheme represents a fundamental advancement in autonomous drone navigation that enables single-platform triangulation and positioning capabilities independent of external reference sources or peer drone visibility. This technology addresses critical limitations in GPS-denied environments where traditional positioning methods fail and line-of-sight communication between swarm members becomes obstructed by physical barriers, corners, or structural interference.

The duo-sensing baseline comprises two identical sensor packages mounted on a single drone platform with precise spatial separation maintained through rigid mechanical mounting. The baseline distance (e.g., 6-18 inches) represents an optimal balance between triangulation accuracy and physical constraints imposed by typical drone airframe dimensions. Shorter baselines provide insufficient geometric separation for accurate triangulation, while longer baselines create aerodynamic challenges and increase mechanical complexity. The fixed baseline ensures consistent geometric relationships that enable precise mathematical triangulation calculations without requiring dynamic calibration or baseline measurement during flight operations.

Sensor mounting configurations implement several geometric arrangements optimized for different operational scenarios. Horizontal baseline mounting positions sensors along the drone's lateral axis, providing optimal triangulation accuracy for targets at similar elevation levels and enabling precise azimuth determination. Vertical baseline mounting arranges sensors along the drone's vertical axis, optimizing elevation angle determination and target height estimation. Diagonal baseline mounting provides compromise geometry that maintains reasonable accuracy across both azimuth and elevation measurements while minimizing airframe integration complexity.

The duo-sensing system utilizes multiple measurement technologies that provide complementary ranging and bearing information through different physical principles. Disparity-based measurements can employ stereo vision techniques using synchronized cameras that capture simultaneous images of targets from slightly different viewpoints. Image processing algorithms identify corresponding features between the two camera views and calculate pixel disparity values that directly relate to target distance through baseline geometry and camera calibration parameters. This technique provides passive ranging capability that requires no active signal transmission and operates effectively in well-lit environments with sufficient visual contrast.

Time-of-flight measurements utilize synchronized laser rangefinders, ultrasonic transducers, or radar sensors that emit signals from both baseline positions and measure the round-trip travel time to targets. The time difference between signals received at each baseline position enables triangulation calculations that determine target distance and bearing with high accuracy. Laser-based time-of-flight systems provide millimeter-level ranging accuracy over distances up to several hundred meters, while ultrasonic systems offer lower accuracy but operate effectively in environments with optical obstructions or adverse lighting conditions.

Differential phase measurements can employ radio frequency or acoustic signals transmitted from known sources and received simultaneously at both baseline positions. Phase difference analysis between the two received signals enables precise determination of target bearing and distance through interferometric techniques. This method proves particularly valuable for tracking radio beacons, acoustic sources, or other electronic signatures that provide consistent signal characteristics for triangulation calculations.

Single-vehicle triangulation utilizes the precisely known baseline geometry to determine target position through geometric calculation rather than requiring multiple independent platforms. The triangulation process begins with simultaneous measurements from both baseline sensors, typically comprising distance measurements $(d_1, d_2)$ from each sensor to the target, or bearing measurements $(\alpha, \beta)$ from each baseline position to the target. Basic triangulation formulas apply the law of cosines and law of sines to the triangle formed by the two baseline sensors and the target position.

For distance-based triangulation using two range measurements, target distance from the baseline midpoint is calculated as: $D=\sqrt{[(d_1^2+d_2^2-b^2)/2]}$ where b represents the baseline length and $d_1$, $d_2$ represent distances measured from each baseline position.

Target bearing relative to the baseline axis is determined through: $\theta=\arccos[(d_1^2-d_2^2)/(2bD)]$ For bearing-based triangulation using angle measurements from each baseline position, target distance is calculated as: $D=b\times\sin(\alpha)\times\sin(\beta)/\sin(\alpha+\beta)$ where $\alpha$ and $\beta$ represent bearing angles measured from each baseline sensor.

Cornering scenarios present particular challenges in subterranean navigation where drones must maintain accurate positioning while navigating around physical obstructions that block line-of-sight to reference points or peer drones. The duo-sensing baseline scheme addresses these challenges by enabling continued triangulation using environmental features, infrastructure elements, or geometric references visible from the corner position. Corner navigation algorithms identify suitable triangulation targets including wall intersections, pipe junctions, structural supports, or distinctive visual features that provide stable reference points for positioning calculations.

Advanced cornering techniques utilize sequential triangulation measurements as the drone progresses around corners, maintaining positioning continuity through overlapping measurements and geometric consistency checks. The system implements corner angle estimation algorithms that determine the geometric relationship between successive corridor segments, enabling accurate dead reckoning calculations that account for direction changes and maintain coordinate system consistency throughout corner navigation maneuvers.

Lost-LOS resection represents the most sophisticated application of duo-sensing baseline technology, enabling accurate position determination when the drone becomes isolated from peer platforms or external references. Resection techniques utilize multiple triangulation measurements to known or assumed reference points, calculating drone position through intersection of multiple bearing lines or distance circles. The duo-sensing baseline enhances resection accuracy by providing two independent measurement positions that create geometric redundancy and enable error detection and correction.

Environmental resection utilizes distinctive features visible in the operational environment including structural elements, equipment installations, or natural landmarks that provide triangulation references. The system maintains databases of known feature locations established during initial mapping operations or provided through pre-mission intelligence, enabling accurate resection calculations when these features become visible during lost-LOS scenarios.

Infrastructure resection leverages permanently installed elements including perched adhesion workers, communication beacons, or navigation aids that provide known position references for triangulation calculations. These infrastructure elements transmit identification signals, position coordinates, or timing references that enable both distance and bearing measurements for comprehensive resection solutions.

The duo-sensing baseline scheme integrates seamlessly with hierarchical Queen-Worker coordination protocols by providing individual drone positioning capability that reduces dependence on continuous communication with command platforms. During communication disruptions or peer isolation scenarios, duo-sensing enables autonomous navigation and task execution while maintaining coordinate system consistency for eventual reintegration with swarm operations.

Coordinate system alignment protocols ensure that positions determined through duo-sensing triangulation remain consistent with swarm-wide coordinate references and navigation systems. Transformation algorithms convert local triangulation results to unified coordinate systems including UGF-SRZ coordinates, enabling seamless integration with mission planning and coordination algorithms when communication connectivity is restored.

Duo-sensing baseline accuracy depends on several geometric and environmental factors that affect triangulation precision. Optimal performance occurs when targets are positioned at moderate distances (e.g., 10-100 baseline lengths) where geometric dilution of precision remains acceptable while maintaining adequate signal strength or image resolution. Very close targets create large triangulation angles that amplify measurement errors, while distant targets provide insufficient geometric separation for accurate bearing determination.

Environmental limitations include visual obstruction for camera-based systems, acoustic interference for ultrasonic ranging, and multipath propagation for radio frequency measurements. The system compensates for these limitations through multi-modal sensor fusion, adaptive measurement techniques, and robust error detection algorithms that maintain positioning accuracy despite challenging environmental conditions.

The duo-sensing baseline scheme represents a critical enabling technology for autonomous drone operations in GPS-denied environments, providing individual platform positioning capability that maintains mission effectiveness despite communication disruption, peer isolation, or complex environmental obstacles that challenge traditional coordination methods.

According to an embodiment, UGF-specific adhesion Workers, designated as "perch nodes," implement specialized attachment mechanisms and persistent operation capabilities that enable secure adherence to diverse infrastructure surfaces including walls, ceilings, pipes, conduits, structural beams, and other fixed installations within subterranean or GPS-denied operational environments. The adhesion Workers function as stationary communication relays, navigation reference targets, and environmental monitoring stations that extend the operational capabilities and coverage area of mobile drone platforms while providing persistent infrastructure support for extended missions.

The adhesion mechanism comprises multiple attachment technologies optimized for different surface types and operational requirements. Magnetic attachment systems utilize high-strength permanent magnets or electromagnets for secure adherence to ferromagnetic surfaces including steel pipes, structural beams, and metallic infrastructure commonly found in industrial and subterranean environments. The magnetic system implements controlled attachment and release mechanisms that enable precise positioning and reliable retrieval when mission parameters change.

Mechanical gripping systems employ adjustable clamps, spring-loaded mechanisms, or expandable attachment devices that secure to pipes, conduits, railings, and structural elements through mechanical pressure and geometric constraint. The gripping mechanisms implement variable force application that adapts to different pipe diameters, structural shapes, and surface textures while maintaining secure attachment despite vibration, temperature changes, or structural movement.

Adhesive attachment systems utilize specialized bonding agents, pressure-sensitive adhesives, or temporary mounting compounds that provide strong attachment to smooth surfaces including concrete walls, finished surfaces, and non-metallic infrastructure. The adhesive systems implement removable bonding technologies that enable secure attachment for extended periods while permitting non-destructive removal when operational requirements change.

In some embodiments, advanced adhesion Workers implement vacuum suction systems that create negative pressure attachment suitable for smooth, non-porous surfaces including glass, polished concrete, metal panels, and finished wall surfaces. The suction system comprises miniaturized vacuum pumps, pressure sensors, and adaptive sealing mechanisms that maintain secure attachment despite minor surface irregularities or environmental pressure changes.

The vacuum attachment system implements redundant sealing chambers and pressure monitoring algorithms that detect attachment degradation and automatically adjust suction pressure to maintain secure adherence. Emergency backup systems activate alternative attachment mechanisms if vacuum seal integrity becomes compromised, ensuring continued operational capability even during attachment system failures.

Perch nodes can function as persistent communication relay stations that extend mesh network coverage throughout complex three-dimensional environments where mobile drone platforms cannot maintain continuous presence. The relay functionality implements multi-modal communication capabilities including radio frequency transceivers, optical communication systems, and acoustic signaling technologies that adapt to local environmental conditions and communication requirements.

Communication relay algorithms implement store-and-forward protocols that buffer messages during communication disruptions and forward data when pathway connectivity is restored. The relay system maintains priority-based message queuing that ensures critical communications receive preferential handling while managing bandwidth constraints and power consumption requirements.

Mesh network integration protocols enable perch nodes to function as intermediate routing nodes that automatically discover optimal communication pathways through complex underground topologies. The routing algorithms adapt to changing network conditions including mobile drone movement, communication link quality variations, and environmental interference that could disrupt communication pathways.

Perch nodes provide precision navigation reference targets that enable mobile drones to perform accurate positioning calculations and coordinate system alignment in GPS-denied environments. Each perch node maintains precisely surveyed coordinates and broadcasts position information through multiple communication channels to support various positioning algorithms and navigation requirements.

The reference target system implements visual markers, radio frequency beacons, and optical reflectors that enable multiple positioning methodologies including visual landmark recognition, radio frequency ranging, and laser measurement techniques. Multi-modal reference capabilities ensure positioning accuracy despite varying environmental conditions, sensor availability, and operational constraints.

Coordinate system maintenance algorithms ensure that perch node position information remains consistent with established navigation frameworks including the UGF-SRZ coordinate system described herein. Position verification protocols utilize redundant measurement techniques and cross-validation with multiple reference sources to maintain positioning accuracy throughout extended operations.

Perch nodes incorporate comprehensive environmental monitoring capabilities that provide persistent surveillance of local conditions including atmospheric composition, temperature, humidity, vibration, acoustic signatures, and other environmental parameters relevant to mission safety and operational effectiveness. Sensor integration supports both mission-specific monitoring requirements and long-term environmental assessment for operational planning and safety management.

Chemical detection sensors monitor atmospheric composition for hazardous gases, toxic substances, oxygen depletion, and other airborne threats that could endanger personnel or compromise equipment operation. Environmental monitoring algorithms implement threshold detection and alert protocols that provide immediate notification when hazardous conditions are detected.

Acoustic monitoring systems detect and analyze environmental sounds including structural vibrations, equipment operation, human activity, and other audio signatures that provide situational awareness and threat detection capabilities. Audio analysis algorithms distinguish between normal environmental sounds and potential threats or unusual activities requiring investigation.

The perch node architecture implements standardized interfaces and modular design principles that enable integration of the same spatial triangulation and communication technologies into diverse deployment platforms beyond dedicated adhesion Workers. The modular approach supports technology integration into various stationary and portable platforms based on operational requirements and deployment constraints.

In some embodiments, perch nodes may be implemented as leave-behind tripod systems comprising portable deployment platforms that provide stable mounting for perch node technology in areas where surface attachment is not feasible or appropriate. Tripod platforms comprise lightweight, adjustable legs with variable height adjustment and terrain adaptation capabilities that enable deployment on uneven surfaces, debris fields, or temporary operational areas.

The tripod mounting system implements quick-deployment mechanisms that enable rapid setup and precise leveling for optimal sensor positioning and communication performance. Stability algorithms and mechanical design ensure reliable operation despite environmental vibrations, wind effects, or minor ground movement that could affect positioning accuracy.

In some embodiments, perch nodes may be implemented as vertical picket systems comprising pole-mounted installations that provide elevated positioning for enhanced communication coverage and sensor placement in areas with limited infrastructure attachment opportunities. Picket installations implement telescoping mechanisms, guy-wire stabilization, and foundation anchoring systems that provide stable vertical platforms for extended operations.

The vertical mounting approach optimizes line-of-sight communication pathways and sensor coverage while minimizing ground-level obstacles and interference. Height adjustment capabilities enable optimization of communication performance and sensor positioning based on local terrain characteristics and operational requirements.

Some perch nodes may comprise specialized wall-mounted devices implement ultra-low-profile attachment systems designed for discreet deployment in sensitive environments where minimal visual signature and reduced detectability are important operational considerations. Wall-mounted systems utilize flat-pack designs, camouflaged housings, and minimal power signatures that blend with existing infrastructure while providing essential communication and sensing capabilities.

The wall-mounted approach enables deployment in urban environments, industrial facilities, and other locations where traditional mounting systems might be conspicuous or inappropriate. Adhesive and mechanical attachment systems provide secure mounting while enabling non-destructive removal when operations conclude.

The perch node technology platform implements universal interfaces and standardized protocols that enable integration into any robotic system, man-portable device, or stationary platform capable of supporting the required power, communication, and mounting requirements. This universal approach maximizes deployment flexibility while maintaining consistent performance characteristics across diverse implementation platforms.

Robotic system integration enables incorporation of perch node capabilities into existing robotic platforms including ground-based robots, climbing robots, and specialized infrastructure inspection systems. The integration approach utilizes standardized communication protocols and power interfaces that minimize modification requirements while providing full perch node functionality.

Man-portable device integration supports incorporation of perch node technology into operator-carried equipment including backpack systems, handheld devices, and portable communication stations. The man-portable approach enables human operators to deploy persistent communication and sensing capabilities in locations where autonomous deployment is not feasible or appropriate.

The modular perch node architecture enables strategic deployment to achieve optimal data communication pathways through complex three-dimensional environments including underground facilities, urban structures, and other challenging operational areas. Path optimization algorithms analyze terrain characteristics, communication requirements, and deployment constraints to determine optimal perch node placement strategies.

Communication pathway modeling utilizes radio frequency propagation analysis, line-of-sight calculations, and multi-hop routing optimization to predict and optimize communication performance before deployment. The modeling approach considers environmental factors including structural interference, atmospheric conditions, and dynamic obstacles that could affect communication reliability.

Adaptive deployment strategies enable real-time optimization of perch node placement based on observed communication performance, changing mission requirements, and evolving operational conditions. The adaptive approach ensures optimal communication coverage while managing deployment resources and operational constraints effectively.

FIG. 7 is a block diagram illustrating an exemplary navigation stack architecture 700 for GPS-denied subterranean operations, according to an embodiment. The navigation stack provides hierarchical processing capabilities that enable autonomous drone positioning and coordination in environments where satellite navigation signals are unavailable or unreliable, utilizing distributed edge computing at individual drone platforms and computationally intensive processing at a fog layer server.

According to an embodiment, the navigation stack comprises a pre-mission layer that provisions drone platforms with essential reference data prior to deployment in GPS-denied environments. Preloaded area maps 701 may comprise detailed floor plans, tunnel layouts, facility schematics, and structural drawings that provide geometric constraints and reference features for navigation algorithms. The preloaded maps can include, but are not limited to, obstacle locations, passage dimensions, intersection coordinates, and landmark positions that serve as navigation anchors during autonomous operations. Digital elevation models 702 may provide terrain elevation data, surface contours, and vertical reference information that enable accurate altitude estimation and vertical positioning relative to known geographic features. Prior submaps 703 may comprise historical mapping data from previous missions, existing facility surveys, and archived reconnaissance information that provide baseline environmental models and known feature locations for correlation with real-time sensor observations.

A UGF-SRZ surface reference 704 provides the unified ground frame with surface-referenced vertical coordinate system that enables consistent positioning measurements above and below ground level. The surface reference may comprise dynamic surface selection policies that choose among cloud-hosted Digital Surface Model and/or Digital Terrain Model (DSM/DTM) tiles, locally mapped surfaces, and algorithmically estimated surfaces based on availability, recency, and confidence levels. Mission parameters 705 may comprise, but are not limited to, operational objectives, coverage requirements, surveillance priorities, safety constraints, and coordination protocols that guide navigation behavior and route planning algorithms throughout the mission execution.

According to an embodiment, an edge device navigation layer executes lightweight processing algorithms on individual drone platforms (e.g., command, subordinate, and/or perch platforms) to provide real-time positioning and environmental awareness capabilities while minimizing computational demands and power consumption. In at least one aspect, multi-sensor dead reckoning 710 implements inertial navigation system fusion combining data streams from inertial measurement units, magnetometers, and barometric altimeters to provide baseline positioning when external reference signals are unavailable. The dead reckoning system can be configured to process acceleration, angular velocity, magnetic heading, and pressure altitude measurements through, for example, extended Kalman filtering algorithms that account for sensor bias, environmental drift, and measurement uncertainty to maintain positioning accuracy over extended periods without external corrections.

Visual odometry 711 can be configured to utilize visual-inertial odometry (VIO) algorithms that process electro-optical camera feeds to extract feature points, track feature motion between sequential frames, and estimate relative pose changes based on visual feature displacement. According to an embodiment, the VIO system generates keyframes at regular intervals containing feature descriptors, pose estimates, and confidence metrics that enable later correlation with global map features. Feature tracking algorithms can be configured to implement corner detection, optical flow estimation, and bundle adjustment techniques to maintain robust visual positioning despite challenging lighting conditions, dust, smoke, or other visual degradation typical of subterranean environments.

LiDAR scan matching 712 processes three-dimensional point cloud data generated by light detection and ranging sensors to create detailed environmental maps and estimate drone position relative to surrounding structures. In an embodiment, the scan matching algorithms can implement iterative closest point (ICP) and normal distributions transform (NDT) techniques to align current point cloud observations with previously mapped environmental features. Point cloud generation processes, for instance, laser return data to create high-resolution three-dimensional representations of tunnel walls, obstacles, infrastructure elements, and geometric features that provide precise positioning references and collision avoidance information.

A local position fusion engine 713 may be present and configured to implement multi-modal sensor fusion algorithms, generally (but not necessarily) utilizing extended Kalman filtering or particle filtering techniques, that combine positioning estimates from dead reckoning 710, visual odometry 711, and LiDAR scan matching 712 to generate optimal position estimates with quantified uncertainty bounds. In various aspects, the fusion engine weights individual sensor contributions based on measurement quality, environmental conditions, and sensor health status to provide robust positioning that adapts to varying operational conditions and sensor availability.

A map alignment and correlation module 714 processes local sensor observations against preloaded reference maps 701, 702, and 703 to identify corresponding features and estimate absolute position within the known facility layout. Feature matching algorithms may be utilized to correlate visual features, geometric structures, and point cloud segments with preloaded map elements to provide position corrections and reduce accumulated positioning drift. In some aspects, the correlation process generates confidence metrics indicating the reliability of map-based position estimates and identifies areas where local observations differ from preloaded references due to environmental changes or map inaccuracies.

Local navigation output 715 generates position coordinates in the unified ground frame including easting (E), northing (N), altitude (U), and surface-referenced Z (SRZ) coordinates that provide consistent positioning information for mission planning, coordination, and control algorithms. The navigation output may comprise, but is not limited to, uncertainty estimates, coordinate confidence levels, and measurement timestamps that enable higher-level systems to assess positioning reliability and adapt operational parameters accordingly.

According to an embodiment, a fog processing layer executes computationally intensive navigation algorithms at a fog layer server positioned near the operational area to provide enhanced positioning accuracy and global map consistency that exceeds the capabilities of individual drone platforms. A global map fusion module 720 processes feature data streams from multiple drone platforms simultaneously to create comprehensive environmental models that incorporate observations from the entire swarm. Multi-agent fusion algorithms align individual drone submaps, resolve coordinate frame differences, and generate unified global maps that provide consistent positioning references for all participating platforms.

A loop closure detection module 721 implements global search algorithms that identify when drone platforms revisit previously mapped areas, enabling the correction of accumulated positioning errors and map distortions. According to some embodiments, the detection system processes feature descriptors, geometric signatures, and environmental characteristics to recognize location revisits despite sensor noise, environmental changes, or approach from different directions. Various place recognition algorithms utilize bag-of-words models, convolutional neural networks, or graph-based matching techniques to identify loop closure candidates from large databases of previously observed locations.

A pose graph optimization module 722 may be present and configured to perform least-squares optimization using algorithms such as, for instance, Gauss-Newton or Levenberg-Marquardt methods to minimize positioning errors across the entire mission trajectory. The optimization process can treat drone poses as graph vertices connected by odometry and loop closure constraints, then iteratively adjusts position estimates to achieve global consistency while preserving local measurement accuracy. Factor graph representations enable efficient optimization of large-scale pose networks while maintaining computational tractability for real-time operation.

UGF-SRZ surface correction module 723 may implement surface selection policies and algorithmic estimation techniques to maintain accurate surface-referenced vertical coordinates throughout the operational area. Surface correction algorithms process terrain class information, environmental conditions, and available reference sources to select optimal surface models from cloud DSM/DTM data, local cursory mapping, or algorithmic estimation based on, for example forest canopy stripping, shifting sand modeling, or urban infrastructure analysis. The correction system maintains surface confidence scoring and publishes updated SRZ references to edge devices as surface models improve.

Map correction and tile output 724 can generate compressed map tiles, navigation corrections, and position updates optimized for transmission to edge devices through bandwidth-constrained communication channels. In some implementations, the output system prioritizes corrections based on operational significance, implements efficient compression algorithms to minimize transmission requirements, and formats updates for rapid integration with edge navigation systems. Map tiles may comprise, but are not limited to, downsampled environmental models, feature updates, and coordinate corrections that enable edge devices to maintain accurate positioning without requiring full map downloads.

According to an embodiment, a feedback and communication layer distributes navigation corrections and map updates from the fog processing layer to individual drone platforms through the established communication hierarchy. A queen drone distribution relay 730 can receive map corrections and navigation updates from the fog layer and redistribute this information to subordinate Worker drones through direct command links. The distribution system can be configured to implement priority-based message routing that ensures critical positioning corrections reach operational platforms rapidly while managing bandwidth constraints and communication reliability.

A worker drone map updater 731 processes navigation corrections received from Queen drone distribution 730 to update local position estimates, refine environmental maps, and improve navigation accuracy. The update system correlates fog-generated corrections with local sensor observations, validates correction consistency, and integrates improvements into ongoing navigation calculations. Position correction algorithms can be configured to adjust current estimates while maintaining smooth trajectory continuity and avoiding discontinuous position jumps that could disrupt flight control systems.

A mesh network synchronizer 732 enables peer-to-peer distribution of navigation updates between drone platforms through the self-healing mesh communication network. Synchronization protocols ensure that navigation improvements discovered by individual platforms are shared throughout the swarm while managing communication bandwidth and avoiding information loops. The mesh synchronization system can be configured to implement conflict resolution algorithms when contradictory updates are received and maintains version control to ensure all platforms operate with consistent navigation references.

Navigation stack architecture 700 provides comprehensive GPS-denied positioning capabilities that enable autonomous drone swarms to operate effectively in subterranean environments while maintaining positioning accuracy, environmental awareness, and coordination capabilities essential for successful mission execution. The hierarchical processing approach balances edge device autonomy with fog layer optimization to achieve navigation performance that exceeds conventional single-platform systems while maintaining operational resilience and fault tolerance.

According to an embodiment, the autonomous drone swarm system implements comprehensive fallback and degradation protocols that provide self-healing capabilities and real-time adaptation to varying computational resources, communication link quality, and power availability. The system automatically adjusts operational parameters and data management strategies based on current resource constraints while maintaining mission continuity and data integrity throughout degraded operational conditions.

When fog layer degradation occurs or Edge-Fog communication links become unavailable, each Queen drone automatically transitions to store-and-forward operational mode that preserves mission-critical data and maintains coordination capabilities despite communication constraints. The store-and-forward system implements append-only, content-addressable logging protocols that create immutable data records with cryptographic integrity verification and temporal ordering guarantees.

Critical telemetry data, mission events, sensor observations, and coordination messages are written to append-only log structures that prevent data modification or deletion while maintaining chronological ordering essential for mission reconstruction and analysis. Content-addressable storage utilizes cryptographic hash functions to generate unique identifiers for each data block, enabling efficient deduplication, integrity verification, and distributed storage across multiple drone platforms.

The store-and-forward system implements hierarchical priority queuing that manages data transmission based on operational criticality and mission requirements. Priority level P0 (Critical) encompasses safety alerts, emergency notifications, equipment failures, and life-threatening conditions requiring immediate transmission when communication becomes available. Priority level P1 (Command) includes mission updates, coordination messages, task assignments, and operational parameter changes essential for continued mission execution. Priority level P2 (Data) comprises sensor telemetry, environmental monitoring, status reports, and situational awareness information supporting decision-making processes. Priority level P3 (Bulk) encompasses map updates, historical data, comprehensive logs, and archival information that enhance capabilities but are not time-critical for immediate operations.

Data integrity and security are maintained through signed manifests that provide cryptographic verification of data authenticity, completeness, and chain of custody throughout storage and transmission processes. Digital signatures utilize public key cryptography to ensure that stored data has not been tampered with and originates from authenticated sources within the swarm network.

Encryption at rest protocols implement Advanced Encryption Standard (AES) 256-bit encryption for all stored data, ensuring that sensitive mission information remains protected even if individual drone platforms are compromised or captured. Key management systems maintain encryption keys through distributed key sharing protocols that prevent single points of failure while enabling authorized access to stored data.

The system implements opportunistic peer synchronization protocols that enable data sharing and replication between drone platforms when communication opportunities arise. Bloom filter differential algorithms efficiently identify data discrepancies between platforms by creating probabilistic data structures that represent stored data sets with minimal memory overhead.

When drones establish communication links, Bloom filter comparisons quickly identify which data blocks are missing from each platform, enabling selective synchronization that minimizes bandwidth utilization while ensuring comprehensive data replication. The synchronization process prioritizes critical data types and recent observations while managing bandwidth constraints and communication windows.

To prevent mission data loss due to individual airframe failures, the system implements erasure coding algorithms that distribute redundant parity information across multiple drone platforms. Erasure coding mathematical techniques generate parity blocks that enable data reconstruction even when multiple drones become unavailable or destroyed during operations.

The erasure coding system calculates optimal redundancy levels based on swarm size, operational risk assessment, and mission criticality requirements. Parity distribution algorithms ensure that redundant data is stored across geographically and operationally distributed platforms to maximize resilience against correlated failures or localized threats.

When backhaul communication is restored, the system utilizes Delay-Tolerant Networking (DTN) protocols, for instance, Bundle Protocol version 7 (BPv7), to orchestrate comprehensive data synchronization and catch-up operations. DTN protocols are specifically designed for environments with intermittent connectivity, high latency, and limited bandwidth, making them ideal for autonomous drone operations in challenging environments.

BPv7 implementation provides store-and-forward message routing that can traverse multiple communication hops and survive extended communication outages while maintaining data integrity and delivery guarantees. The protocol implements custody transfer mechanisms that ensure reliable data delivery despite network disruptions and varying communication quality.

Data synchronization operations implement integrity-checked bandwidth scheduling that optimizes catch-up operations while managing communication resources efficiently. Integrity verification utilizes cryptographic checksums and hash-based validation to ensure that synchronized data has not been corrupted during storage or transmission.

Bandwidth scheduling algorithms prioritize data transmission based on the established priority hierarchy (P0 through P3) while considering available communication capacity, transmission deadlines, and ongoing operational requirements. The scheduling system implements adaptive algorithms that adjust transmission rates and data selection based on real-time network conditions and mission priorities.

To minimize bandwidth utilization and transmission time during catch-up operations, the system can be configured to implement content hash deduplication that eliminates redundant data transmission. Content-addressable storage systems generate unique cryptographic hashes for each data block, enabling identification of duplicate content across different platforms and time periods.

Deduplication algorithms compare content hashes before transmission, sending only unique data blocks while maintaining references to previously transmitted content. This approach significantly reduces bandwidth requirements and synchronization time while ensuring complete data availability across all platforms.

During resource-constrained operations, the system activates degraded-mode policies that optimize resource utilization while preserving essential capabilities. Downsampling algorithms reduce the resolution, frequency, or quality of non-critical data streams including routine environmental monitoring, low-priority sensor feeds, and background telemetry collection.

Age-off procedures automatically remove lowest-priority payloads from local storage when storage capacity becomes limited, prioritizing retention of mission-critical data and recent observations over historical or non-essential information. The age-off system implements configurable retention policies that consider data type, operational significance, and available storage capacity.

The system explicitly avoids in-flight database sharding operations that could compromise data integrity or create consistency challenges during communication disruptions. Instead, resilience is achieved through immutable log structures that provide guaranteed data ordering and integrity without requiring complex distributed database synchronization.

Immutable logs ensure that once data is written, it cannot be modified or deleted, providing reliable audit trails and preventing data corruption during system failures or communication disruptions. The append-only structure simplifies synchronization protocols and enables efficient replication across multiple platforms without consistency conflicts.

Data resilience is enhanced through peer replication strategies that distribute copies of critical data across multiple drone platforms within the swarm. Replication algorithms consider platform reliability, storage capacity, operational roles, and geographic distribution to optimize data placement and availability.

The replication system implements configurable replication factors that determine how many copies of each data type are maintained across the swarm, balancing data availability against storage overhead and bandwidth utilization. Dynamic replication adjustment responds to changing swarm composition and operational conditions.

When communication is restored, priority backhaul coordination ensures that the most critical data receives immediate attention while managing bandwidth constraints and transmission scheduling. The coordination system implements intelligent queuing that considers data age, operational significance, transmission size, and available communication windows.

Backhaul operations utilize available communication modalities including satellite links, terrestrial networks, and peer-to-peer connections to maximize data transmission capacity while maintaining security and integrity requirements. Load balancing algorithms distribute transmission tasks across multiple communication channels when available.

This comprehensive fallback and degradation architecture ensures that the autonomous drone swarm system maintains operational effectiveness and data integrity even during severe communication disruptions, resource constraints, or individual platform failures, while providing efficient recovery mechanisms when normal operations can be restored.

According to an embodiment, a large language model processor implements a fine-tuned transformer architecture specifically adapted for drone mission planning applications. The LLM processor utilizes a base model architecture such as LLaMA-13B or equivalent, with specialized fine-tuning datasets comprising military doctrine, operational procedures, environmental analysis protocols, and drone coordination commands to enable contextually appropriate mission planning for autonomous swarm operations.

The LLM integration comprises multiple processing stages that convert natural language operator inputs into executable drone mission parameters. Natural language parsing algorithms process voice commands, text instructions, or gesture-based inputs to extract mission intent, operational constraints, and tactical objectives. Context analysis algorithms evaluate current swarm status including drone availability, battery levels, sensor capabilities, environmental conditions, and communication connectivity to inform mission planning decisions.

Mission planning algorithms within the LLM processor implement structured output generation that converts analyzed operator intent into specific operational parameters including target coordinates, search patterns, formation configurations, sensor deployment strategies, and communication protocols. The structured output utilizes predefined schemas that ensure compatibility with downstream mission execution systems while maintaining flexibility for diverse operational scenarios.

For example, when processing the natural language command "Survey the eastern tunnel system for hazardous materials," the LLM processor performs intent analysis to identify the mission type (surveillance/reconnaissance), operational area (eastern tunnel system), and detection objective (hazardous materials). Resource analysis evaluates available drones with chemical detection sensors, current battery levels, communication coverage in the specified area, and estimated mission duration. The LLM then generates structured mission parameters including drone assignment specifications (e.g., assign drones with chemical sensors to primary survey roles), flight path optimization (systematic coverage patterns for the eastern tunnel system), sensor configuration (activate chemical detection sensors with appropriate sensitivity thresholds), and safety protocols (maintain communication connectivity and emergency extraction procedures).

The LLM processor implements contextual decision-making algorithms that consider multiple operational factors simultaneously including environmental hazards, swarm resource limitations, mission priorities, and tactical constraints. Contextual analysis utilizes real-time data feeds from swarm sensors, environmental monitoring systems, and mission status updates to ensure mission plans remain appropriate despite changing operational conditions.

Decision-making algorithms implement probabilistic reasoning that evaluates multiple mission options and selects optimal approaches based on success probability, resource efficiency, safety considerations, and mission objective alignment. The probabilistic framework enables the LLM to generate mission plans that adapt to uncertainty and incomplete information typical of complex operational environments.

According to an embodiment, a distributed mapping and localization system implements multiple subterranean-specific configurations that optimize performance for underground operational environments. Communication protocol adaptations account for RF propagation characteristics in enclosed spaces including multipath interference, signal attenuation through structural materials, and limited line-of-sight communication pathways typical of tunnel and underground facility environments.

Sensor fusion algorithms implement subterranean-optimized weighting factors that emphasize sensors most effective in underground environments. Visual odometry algorithms utilize enhanced feature detection optimized for artificial lighting conditions, repetitive structural features, and limited visual landmarks common in underground facilities. LiDAR processing implements specialized algorithms for narrow corridor navigation, corner detection, and structural mapping optimized for tunnel geometries and underground infrastructure.

Navigation system configurations can implement dead reckoning algorithms specifically tuned for subterranean operations including enhanced inertial navigation with drift compensation optimized for extended GPS-denied periods, pressure-based altitude determination using sealed reference chambers to account for atmospheric pressure variations in enclosed spaces, and magnetic compass correction algorithms that account for magnetic interference from underground infrastructure including electrical systems, metal structures, and geological formations.

The collaborative positioning protocols implement mesh network algorithms optimized for underground topology including relay chain optimization for communication through corners and intersections, adaptive transmission power management for enclosed spaces, and position validation using infrastructure-based reference points including permanently installed markers, structural features, and known facility coordinates.

Subterranean-specific environmental monitoring may comprise atmospheric composition analysis optimized for enclosed spaces including oxygen level monitoring, toxic gas detection, and air circulation assessment. Structural integrity monitoring utilizes vibration analysis, acoustic signature detection, and visual inspection protocols optimized for underground infrastructure assessment and safety monitoring.

The fog layer processing system implements specialized algorithms that integrate UGF-SRZ surface corrections with collaborative mapping operations through coordinated processing pipelines. Surface correction integration comprises real-time surface model updates that incorporate new surface data from multiple sources, coordinate transformation algorithms that maintain consistency between individual drone local maps and global UGF-SRZ coordinates, and validation protocols that ensure surface-referenced coordinates remain accurate despite collaborative mapping updates.

When multiple drones contribute mapping data from different elevations and locations, the fog layer processing maintains surface reference consistency through distributed surface modeling algorithms. Multi-agent surface fusion combines surface observations from multiple drones to generate improved surface models, implements conflict resolution when contradictory surface data is received, and maintains temporal consistency as surface conditions change due to weather, construction, or other environmental factors.

The surface correction propagation system distributes updated surface models and coordinate corrections to individual drones through the mesh communication network. Correction distribution algorithms prioritize updates based on operational significance, implement bandwidth-efficient transmission of surface model changes, and ensure all drones maintain consistent UGF-SRZ coordinate references despite independent mapping operations.

Map fusion algorithms implement geometric constraints that ensure collaborative maps remain consistent with UGF-SRZ surface references. Surface-constrained mapping utilizes known surface elevations as geometric constraints during pose graph optimization, implements consistency checking that validates drone-generated maps against established surface models, and provides error correction when mapping results deviate from known surface references.

The coordinate system maintenance protocols ensure that collaborative mapping operations preserve UGF-SRZ coordinate integrity through continuous validation of map coordinates against surface references, automatic correction of drift errors that could compromise surface-referenced positioning, and real-time propagation of coordinate corrections to maintain swarm-wide positioning consistency.

This integrated approach enables seamless operation across surface and subterranean environments by maintaining consistent coordinate references regardless of individual drone location or mapping contributions, while ensuring that collaborative mapping operations enhance rather than compromise the UGF-SRZ coordinate system accuracy and reliability.

Figure 8:
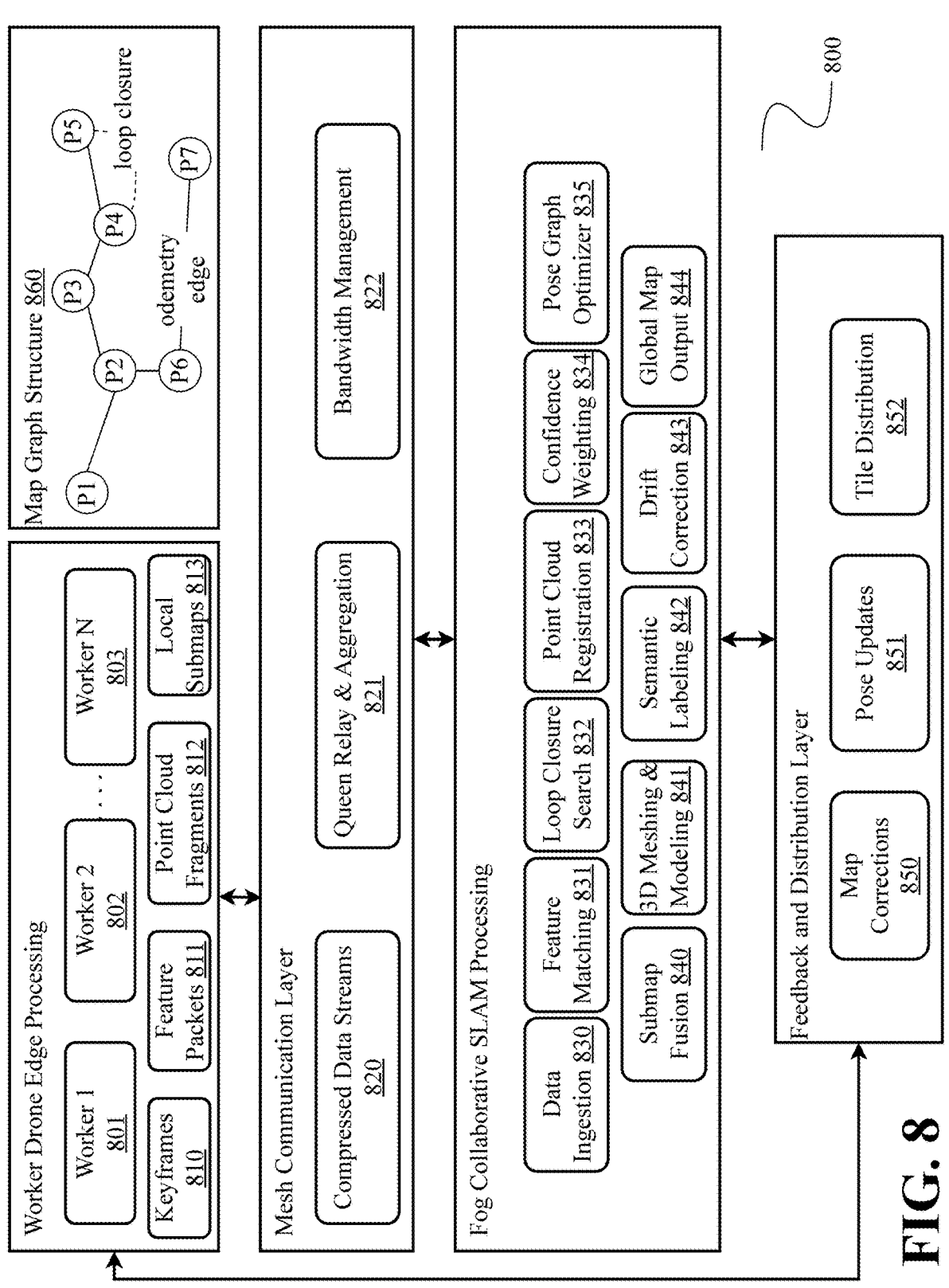
FIG. 8 is a block diagram illustrating an exemplary collaborative SLAM/map graph architecture for multi-agent mapping with fog-based processing, according to an embodiment.

FIG. 8 is a block diagram illustrating an exemplary collaborative SLAM/map graph architecture 800 for multi-agent mapping with fog-based processing, according to an embodiment. The collaborative SLAM system 800 enables multiple subordinate (i.e., Worker) drones to generate comprehensive three-dimensional maps of subterranean environments through distributed edge processing and centralized fog layer optimization, providing enhanced mapping accuracy and global consistency that exceeds individual platform capabilities while maintaining real-time operational performance.

According to an embodiment, the worker drone edge processing layer implements lightweight computational algorithms on individual drone platforms to generate mapping data products while minimizing power consumption and processing overhead. A plurality of subordinate drones comprising Worker 1 801, Worker 2 802, and Worker N 803 each execute identical edge processing algorithms comprising LiDAR scanning for three-dimensional environmental sensing, feature extraction using computer vision algorithms to identify distinctive visual landmarks, keyframe generation at predetermined intervals containing pose estimates and feature collections, and local SLAM processing utilizing visual-inertial odometry and scan matching techniques to maintain short-term positioning accuracy and environmental awareness.

The LiDAR scanning component within each Worker drone may utilize time-of-flight laser measurements to generate point cloud data representing surrounding environmental structures including walls, obstacles, infrastructure elements, and navigable space. Feature extraction algorithms process electro-optical camera feeds using corner detection, edge identification, and distinctive feature recognition techniques such as SIFT (Scale-Invariant Feature Transform) or ORB (Oriented FAST and Rotated BRIEF) to identify visual landmarks suitable for tracking and correlation across multiple observations. Keyframe generation occurs at regular temporal or spatial intervals, capturing pose estimates including position and orientation coordinates, feature descriptor collections containing mathematical representations of detected visual landmarks, and confidence metrics indicating measurement reliability and geometric constraints.

Local SLAM processing implements visual-inertial odometry algorithms that fuse camera-based feature tracking with inertial measurement unit data to estimate drone motion between keyframes. Scan matching algorithms correlate current LiDAR observations with previously mapped environmental features using iterative closest point (ICP) or normal distributions transform (NDT) techniques to refine position estimates and maintain local map consistency. The local SLAM system maintains limited-scope environmental models sufficient for immediate navigation and obstacle avoidance while generating data products suitable for transmission to fog layer processing.

According to an embodiment, the edge processing layer generates specialized data products optimized for efficient transmission and fog layer processing. Keyframes 810 contain pose estimates including, but not limited to, position coordinates (e.g., E, N, U, SRZ), orientation parameters (e.g., roll, pitch, yaw), and associated feature collections with descriptor vectors and spatial coordinates. Confidence metrics can accompany each keyframe indicating, for instance, pose estimation uncertainty, feature detection reliability, and geometric constraint strength based on sensor health, environmental conditions, and measurement geometry.

Feature packets 811 comprise compressed mathematical descriptors representing distinctive visual landmarks extracted from camera imagery. The descriptors may utilize binary or floating-point representations that enable efficient matching and correlation across multiple drone observations while minimizing transmission bandwidth requirements. Feature packets may comprise spatial coordinates relative to the capturing drone's estimated position, scale and orientation parameters for robust matching across varying viewpoints, and confidence scores indicating descriptor quality and distinctiveness.

Point cloud fragments 812 contain compressed three-dimensional environmental data generated by LiDAR sensors and processed through octree compression, voxel downsampling, or progressive mesh encoding to minimize transmission requirements while preserving essential geometric information. The fragments can include, but are not limited to, timestamp information for temporal correlation, local coordinate frame references for geometric alignment, and compression metadata enabling efficient decompression and processing at the fog layer.

Local submaps 813 provide limited-scope environmental models maintained on individual drone platforms for immediate navigation and collision avoidance. The submaps may comprise geometric representations of nearby obstacles, navigable pathways, and reference landmarks within a constrained spatial extent determined by available processing capacity and memory limitations. Local submaps enable autonomous drone operation during communication disruptions while providing reference models for correlating fog layer corrections with local observations.

According to an embodiment, the mesh communication layer implements bandwidth-aware transmission protocols that enable efficient data flow from distributed Worker drones to centralized fog processing while adapting to varying communication conditions and network topology. Compressed data streams 820 utilize adaptive compression algorithms that optimize data transmission based on available bandwidth, transmission priority, and content characteristics. In some aspects, the compression system implements differential encoding for temporal data sequences, geometric quantization for spatial coordinates, and entropy coding for descriptor vectors to achieve maximum compression efficiency while preserving essential information required for collaborative mapping.

A command (i.e., Queen drone) relay and aggregation module 821 processes data streams from multiple subordinate drones within a Hive, performing initial data validation, temporal synchronization, and transmission scheduling to optimize fog layer data ingestion. The relay system implements data buffering during communication disruptions, priority-based transmission queuing that ensures critical mapping data receives preferential treatment, and data integrity verification through checksums and redundancy coding. Command drones aggregate subordinate data streams to reduce communication overhead and provide coordinated data delivery to fog processing systems.

A bandwidth management module 822 implements adaptive protocols that monitor communication channel capacity, transmission latency, and error rates to optimize data flow between edge devices and fog processing. The management system can be configured to adjust compression parameters based on available bandwidth, modify transmission schedules during network congestion, and implement quality-of-service prioritization that ensures critical mapping data maintains connectivity during communication constraints. Emergency protocols provide degraded-mode operation when primary communication channels become unavailable.

According to an embodiment, the fog layer collaborative SLAM processing implements computationally intensive algorithms that exceed individual drone platform capabilities to provide enhanced mapping accuracy and global consistency. A data ingestion module 830 receives and processes data streams from multiple Worker drones simultaneously, implementing temporal synchronization to align observations from distributed platforms, data validation to verify transmission integrity and detect corrupted packets, and multi-agent coordination to manage conflicting observations and maintain processing efficiency across varying data arrival rates.

A feature matching module 831 implements cross-platform correlation algorithms that identify corresponding visual landmarks observed by multiple Worker drones from different viewpoints and temporal intervals. The matching system can utilize descriptor similarity metrics, geometric consistency constraints, and epipolar geometry validation to establish reliable feature correspondences despite viewpoint variations, illumination changes, and temporal displacement. In some embodiments, robust matching algorithms implement RANSAC (Random Sample Consensus) or similar techniques to reject spurious correspondences and maintain matching reliability in challenging environments.

A loop closure search module 832 performs global detection algorithms that identify when Worker drones revisit previously mapped locations, enabling correction of accumulated positioning errors and map distortions. The search system maintains databases of previously observed features and environmental signatures, implements efficient similarity search algorithms using techniques such as bag-of-words models or locality-sensitive hashing, and validates loop closure candidates through geometric consistency verification and multi-modal sensor correlation. Place recognition algorithms utilize both visual features and geometric signatures to achieve robust loop detection despite environmental changes or sensor degradation.

A point cloud registration module 833 implements three-dimensional alignment algorithms including, but not limited to, ICP and NDT techniques to precisely align point cloud fragments from multiple subordinate drones into consistent global coordinates. The registration system processes compressed point cloud data transmitted from edge devices, performs iterative optimization to minimize alignment errors, and generates transformation parameters that enable precise geometric fusion of distributed observations. Advanced registration algorithms implement robust estimation techniques that accommodate outliers and partial overlap between point cloud fragments.

Confidence weighting module 834 implements multi-source reliability assessment that evaluates the quality and trustworthiness of observations from individual Worker drones based on sensor health status, geometric observation constraints, recent calibration history, and measurement uncertainty estimates. The weighting system assigns confidence scores to individual observations, adjusts processing algorithms to emphasize reliable data sources, and implements outlier detection to identify and mitigate the impact of degraded or erroneous measurements. Confidence metrics may propagate through subsequent processing stages to ensure that map accuracy reflects data reliability.

A pose graph optimizer 835 can be configured to implement factor graph-based algorithms that minimize positioning errors across the entire multi-agent trajectory through least-squares optimization techniques such as, for example, Gauss-Newton or Levenberg-Marquardt methods. The optimization system constructs pose graphs with drone positions as vertices connected by odometry measurements and loop closure constraints as edges, then iteratively adjusts position estimates to achieve global consistency while preserving local measurement accuracy. The factor graph representation enables efficient optimization of large-scale pose networks while accommodating real-time operational constraints.

According to an embodiment, various advanced processing components perform sophisticated mapping operations that generate high-quality environmental models and provide enhanced situational awareness capabilities. A submap fusion component 840 implements global alignment algorithms that combine individual Worker submaps into comprehensive environmental models while resolving coordinate frame differences and geometric inconsistencies. The fusion system may utilize overlapping regions between submaps to estimate relative transformations, implements robust alignment techniques that accommodate measurement uncertainties, and generates unified global maps that maintain geometric accuracy and completeness across the entire operational area.

A 3D meshing and modeling component 841 processes registered point cloud data to generate detailed three-dimensional surface representations of the subterranean environment through surface reconstruction algorithms such as Poisson reconstruction, ball-pivoting, or Delaunay triangulation. For example, the meshing system can create watertight surface models suitable for navigation planning and collision detection, implement level-of-detail optimization to provide multi-resolution representations, and generate texture mapping from visual observations to enhance environmental visualization and object recognition capabilities.

A semantic labeling engine 842 implements one or more machine learning algorithms that classify environmental elements into functional categories such as navigable space, obstacles, infrastructure components, and mission-relevant objects. The labeling system can utilize both geometric features extracted from point clouds and visual features from camera observations to perform object classification, implement deep learning models trained on subterranean environmental data, and provide semantic annotations that enable enhanced mission planning and autonomous decision-making capabilities.

A drift correction module 843 implements global consensus algorithms that identify and correct accumulated positioning errors through comparison of multiple independent position estimates and integration of loop closure constraints. The correction system maintains global reference frames that enable consistent positioning across extended operational areas, implements temporal smoothing to provide stable position estimates despite measurement noise, and generates correction vectors that can be distributed to edge devices for local navigation improvement.

Global map output system 844 generates multi-resolution environmental representations optimized for distribution to edge devices and integration with mission planning systems. The output system may create compressed map tiles suitable for transmission through bandwidth-constrained communication channels, implements hierarchical representations that provide appropriate detail levels for different operational scales, and maintains version control to enable incremental updates and consistency verification across distributed platforms.

According to an embodiment, a feedback and distribution layer implements mechanisms for distributing mapping improvements from fog processing back to individual Worker drones through the established communication hierarchy. Map corrections 850 provide updated environmental models, refined landmark positions, and improved coordinate frame references that enable edge devices to enhance local navigation accuracy. The corrections may comprise differential updates that minimize transmission requirements, confidence metrics indicating correction reliability, and temporal validity information specifying correction applicability periods.

Pose updates 851 distribute improved position estimates and trajectory corrections that enable subordinate drones to refine their navigation accuracy and coordinate more effectively with other swarm members. The updates may include, but are not limited to, position corrections with uncertainty bounds, velocity and acceleration adjustments for trajectory smoothing, and reference frame transformations that enable consistent positioning across the swarm network. Priority-based distribution ensures that critical corrections reach operational platforms rapidly while managing communication bandwidth constraints.

Tile distribution 852 implements efficient transmission of compressed map segments that enable subordinate drones to update their local environmental models with improved global accuracy. In some embodiments, the distribution system utilizes differential compression to minimize transmission requirements, implements caching mechanisms to avoid redundant data transmission, and provides subscription-based delivery that enables Worker drones to request specific map regions based on current operational requirements and available storage capacity.

Collaborative SLAM/map graph architecture 800 demonstrates how the autonomous drone swarm system provides comprehensive environmental mapping capabilities that exceed individual platform limitations through distributed edge processing and centralized fog optimization, enabling accurate navigation and coordination in GPS-denied subterranean environments while maintaining real-time operational performance and communication efficiency essential for autonomous swarm operations.

Referring to FIG. 8, a map graph structure 860 demonstrates an exemplary pose graph representation used in collaborative SLAM operations, where pose nodes represent discrete drone positions at keyframe intervals connected by constraint edges that encode geometric relationships and measurement observations.

The map graph comprises pose nodes P1 through P7 representing sequential drone positions captured during keyframe generation, with each node containing position coordinates (E, N, U, SRZ), orientation parameters (roll, pitch, yaw), and associated confidence metrics. Odometry edges connect consecutive pose nodes and represent motion estimates derived from multi-sensor dead reckoning, visual odometry, and LiDAR scan matching between keyframe intervals. These edges encode relative transformation measurements including translation, rotation, and uncertainty covariances that constrain the optimization process.

The loop closure edge (shown as a dashed line connecting P5 back to P4) represents a detected revisit to a previously mapped location, identified through global feature matching and place recognition algorithms. Loop closure constraints provide critical geometric constraints that enable correction of accumulated drift errors and maintain global map consistency across extended trajectories.

The pose graph optimization process treats this structure as a factor graph where poses are variables and edges are factors encoding measurement constraints. The optimization minimizes the overall graph error through least-squares techniques such as Gauss-Newton or Levenberg-Marquardt methods, iteratively adjusting pose estimates to achieve global consistency while preserving local measurement accuracy. This distributed pose graph representation enables the fog layer to process observations from multiple subordinate drones simultaneously, fusing individual trajectories into a globally consistent map while maintaining computational efficiency suitable for real-time collaborative SLAM operations in GPS-denied subterranean environments.

Figure 9:
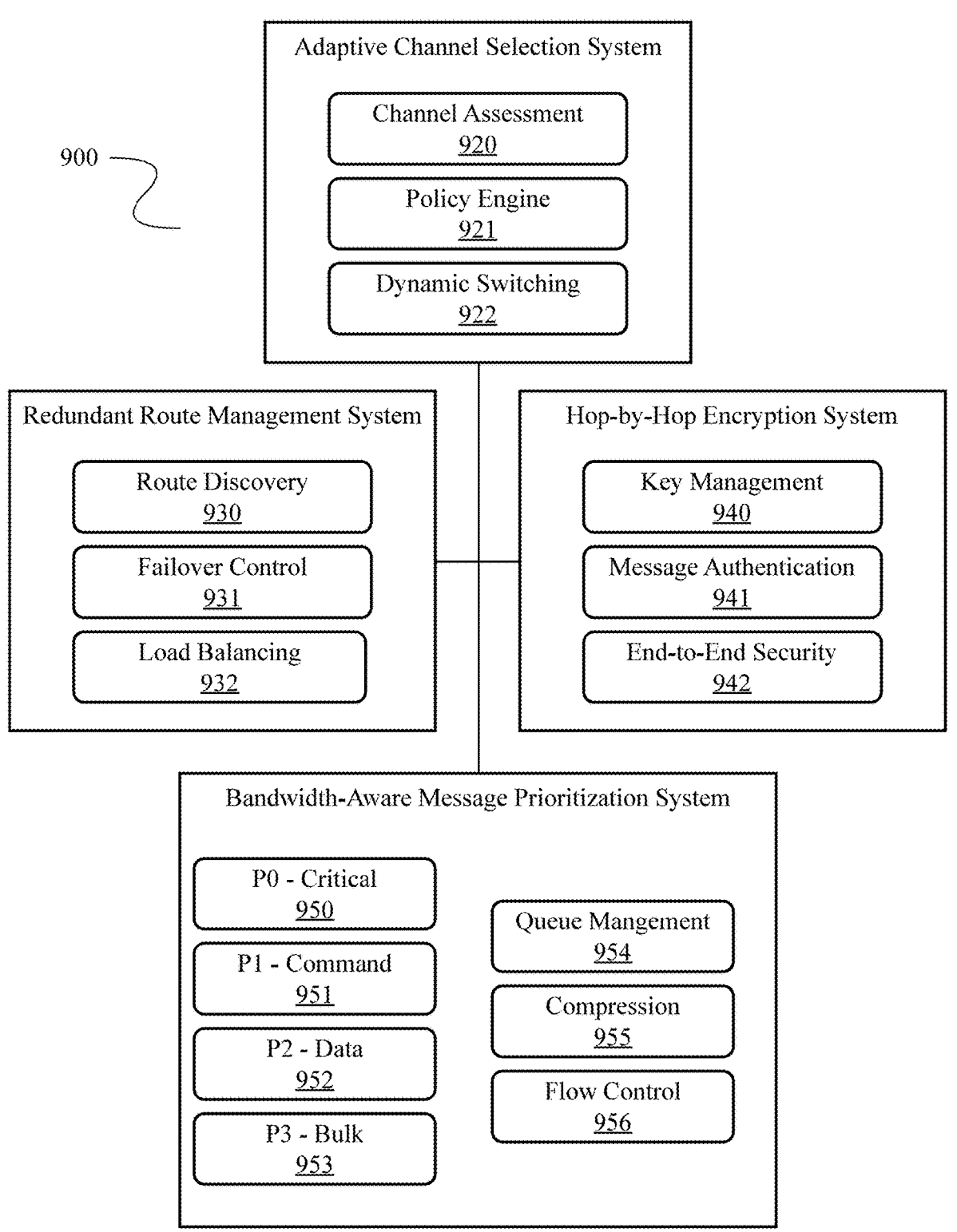
FIG. 9 is a block diagram illustrating an exemplary communications architecture for obstructed topologies, demonstrating adaptive multi-modal mesh networking capabilities designed to maintain reliable coordination and data transmission in challenging operational environments where conventional communication systems would fail, according to an embodiment.

FIG. 9 is a block diagram illustrating an exemplary communications architecture for obstructed topologies, demonstrating adaptive multi-modal mesh networking capabilities designed to maintain reliable coordination and data transmission in challenging operational environments where conventional communication systems would fail, according to an embodiment. The communications system addresses the unique challenges of subterranean or otherwise GPS-constrained operations including physical obstructions that block line-of-sight communications, RF shadowing and multipath propagation effects, structural interference from walls and infrastructure, and dynamic obstacles that create time-varying communication conditions.

According to an embodiment, the mesh network topology implements a distributed communication architecture comprising multiple node types that collectively provide redundant communication pathways and fault-tolerant connectivity throughout complex operational environments. Multiple command (i.e., Queen) drones serve as primary command and coordination nodes, each implementing enhanced communication capabilities including multi-modal transceiver systems, message routing and relay coordination, bandwidth management and quality-of-service prioritization, and inter-Hive communication protocols that enable coordination between multiple autonomous swarms operating within the same operational area.

A plurality of subordinate (i.e., Worker) drones implement distributed communication nodes that provide mesh network connectivity while maintaining primary mission functions including autonomous navigation, sensor data collection, and task execution. Each subordinate drone incorporates multi-modal communication transceivers compatible with command drone systems, mesh routing protocols that enable automatic pathway discovery and message forwarding, and adaptive power management that optimizes communication performance while preserving battery capacity for extended autonomous operations.

A plurality of perch nodes function as adhesion Workers that adhere to walls, ceilings, pipes, or other infrastructure elements to provide persistent communication relay capabilities in areas where mobile platforms cannot maintain continuous presence. The perch nodes implement stationary communication relay functions with enhanced antenna positioning for optimal signal propagation, extended battery capacity or external power connections for persistent operation, and specialized mounting systems that enable secure attachment to various infrastructure surfaces while maintaining communication equipment functionality.

According to an embodiment, the adaptive multi-modal communication architecture implements multiple transmission technologies that provide complementary capabilities optimized for different operational conditions and requirements. Low frequency radio frequency (LF RF) communication provides robust primary connectivity through solid thick communication links that demonstrate high-power, long-range communication suitable for penetrating obstacles and maintaining connectivity despite structural interference. In some aspects, LF RF systems utilize software-defined radio transceivers that implement frequency-hopping spread spectrum protocols for anti-jamming protection, adaptive power control that adjusts transmission strength based on link quality and operational requirements, and error correction coding that maintains data integrity despite multipath propagation and signal degradation typical of subterranean environments.

Optical beaconing communication provides high-bandwidth, secure line-of-sight communication utilizing modulated laser or LED transmission systems. The optical communication system implements automatic beam steering mechanisms that enable dynamic targeting and acquisition between mobile platforms, atmospheric compensation algorithms that maintain communication effectiveness despite environmental factors including, but not limited to, dust, smoke, or vapor, and covert operation capabilities that minimize electromagnetic signature and provide resistance to electronic surveillance and jamming attempts.

Acoustic signaling communication enables through-wall and around-corner communication in environments where RF and optical systems are blocked by physical obstructions. The acoustic system utilizes sound wave propagation through air, water, or solid materials to transmit digital data, implements frequency diversity and error correction to maintain data integrity despite acoustic interference and multipath effects, and provides backup communication capabilities when primary RF and optical channels become unavailable due to environmental conditions or equipment failures.

Multi-hop relay communication demonstrates the system's capability to establish communication pathways through multiple intermediate nodes when direct communication between source and destination becomes impossible. The multi-hop system implements automatic route discovery protocols that identify available intermediate nodes and optimal routing pathways, dynamic routing adjustment that adapts to changing network topology as nodes move or become unavailable, and store-and-forward capabilities that enable message transmission despite temporary communication interruptions or network segmentation.

According to an embodiment, an adaptive channel selection system provides intelligent communication mode selection based on real-time assessment of environmental conditions, link quality, and operational requirements. A channel assessment module 920 implements continuous monitoring algorithms that evaluate signal quality, interference levels, and environmental conditions across all available communication modalities. The assessment system measures signal-to-noise ratio (SNR), bit error rates, path loss characteristics, and interference patterns to maintain current understanding of communication channel performance and reliability.

Policy engine 921 implements decision-making algorithms that select optimal communication channels based on mission requirements, security considerations, power constraints, and performance metrics. The policy engine evaluates communication priorities including message urgency, bandwidth requirements, security classification levels, and power consumption constraints to determine appropriate communication modes for each message transmission. Advanced policy algorithms incorporate machine learning techniques that adapt channel selection based on historical performance data and environmental pattern recognition.

Dynamic switching 922 provides real-time communication mode transitions that optimize performance and maintain connectivity despite changing operational conditions. The switching system implements seamless handoff protocols that transfer ongoing communications between different modalities without data loss, automatic failover mechanisms that detect communication failures and immediately activate backup channels, and load balancing algorithms that distribute communication traffic across available channels to optimize overall network performance and prevent channel saturation.

According to an embodiment, redundant route management ensures continued communication connectivity despite individual node failures, communication link degradation, or network topology changes. Route discovery 930 implements distributed algorithms that identify multiple independent pathways between source and destination nodes throughout the mesh network. The discovery system utilizes flooding protocols, distance-vector algorithms, or link-state protocols to maintain current topology maps and identify optimal routing pathways based on hop count, link quality, latency, and bandwidth considerations.

Failover control 931 provides automatic detection and response to communication failures including individual node failures, link degradation, and network partitioning events. The failover system implements health monitoring protocols that continuously assess node availability and link quality, rapid detection algorithms that identify failures within seconds of occurrence, and automatic rerouting procedures that establish alternative communication pathways while maintaining ongoing message transmission with minimal interruption.

Load balancing 932 distributes communication traffic across multiple available pathways to optimize network performance, prevent bottlenecks, and maintain quality-of-service levels during high-traffic periods. The load balancing system implements traffic analysis algorithms that monitor bandwidth utilization across all network links, adaptive routing protocols that direct messages through underutilized pathways, and congestion control mechanisms that manage transmission rates during network overload conditions.

According to an embodiment, hop-by-hop encryption provides comprehensive security protection for all communications transmitted through the mesh network architecture. Key management 940 implements distributed cryptographic key generation, distribution, and rotation protocols that maintain secure communications while adapting to changing network topology and node availability. The key management system utilizes AES-256 encryption standards, implements perfect forward secrecy through ephemeral key generation, and provides secure key exchange protocols that enable new nodes to join the network while maintaining security for existing communications.

Message authentication 941 ensures communication integrity and prevents unauthorized message injection or modification through cryptographic authentication codes and digital signatures. The authentication system implements hash-based message authentication codes (HMAC) that verify message integrity, timestamp validation that prevents replay attacks, and sender authentication that confirms message origin and prevents spoofing attempts by unauthorized parties.

End-to-end security 942 provides comprehensive protection for sensitive communications that require security beyond hop-by-hop encryption, implementing application-layer encryption that protects message content throughout the entire transmission pathway. The end-to-end system utilizes public key cryptography for secure session establishment, implements perfect forward secrecy for long-term security protection, and provides message authentication and integrity verification that ensures communications cannot be modified or forged by intermediate nodes.

According to an embodiment, bandwidth-aware message prioritization optimizes communication efficiency and ensures critical messages receive appropriate transmission priority during bandwidth-constrained operations. Priority class P0—Critical 950 handles safety and emergency communications including collision warnings, equipment failures, emergency evacuation commands, and life-threatening situation alerts that require immediate transmission regardless of bandwidth limitations or network congestion.

Priority class P1—Command 951 manages task assignment and coordination messages including mission updates, formation changes, target designation commands, and operational parameter modifications that enable continued autonomous coordination and mission execution. Priority class P2—Data 952 handles sensor telemetry, navigation updates, status reports, and environmental monitoring information that supports situational awareness and decision-making but can tolerate moderate transmission delays during network congestion.

Priority class P3—Bulk 953 manages map updates, software downloads, historical data transfers, and other large data transfers that provide enhanced capabilities but are not time-critical for immediate operational success. The bulk priority class implements background transmission scheduling that utilizes available bandwidth without interfering with higher-priority communications.

Queue management 954 implements adaptive buffer management and transmission scheduling that optimizes message delivery based on available bandwidth, priority levels, and network conditions. The queue management system utilizes weighted fair queuing algorithms that provide guaranteed bandwidth allocation for high-priority messages, implements adaptive buffer sizing that accommodates varying message sizes and transmission rates, and provides queue overflow protection that prevents memory exhaustion during high-traffic periods.

Compression engine 955 reduces bandwidth requirements through adaptive data compression algorithms that optimize encoding based on message content, available processing capacity, and transmission constraints. The compression system implements lossless compression for critical data that requires perfect fidelity, utilizes lossy compression for sensor data and imagery where moderate quality reduction is acceptable, and provides real-time compression optimization that adapts compression levels based on available bandwidth and processing capacity.

Flow control 956 manages transmission rates and congestion prevention through adaptive algorithms that monitor network capacity and adjust message transmission timing to prevent network overload. The flow control system implements sliding window protocols that optimize transmission efficiency, provides congestion detection and avoidance algorithms that prevent network saturation, and utilizes backpressure mechanisms that temporarily reduce transmission rates during peak traffic periods while maintaining overall communication effectiveness.

The communications architecture illustrated in FIG. 9 demonstrates how the autonomous drone swarm system maintains reliable coordination and data transmission capabilities in obstructed topologies through adaptive multi-modal networking, redundant routing, comprehensive security, and intelligent message prioritization that collectively enable effective autonomous operations in challenging environments where conventional communication systems would fail, including subterranean facilities, urban canyons, dense forests, and other GPS-denied operational areas with significant RF propagation challenges and line-of-sight obstructions.

Figure 12:
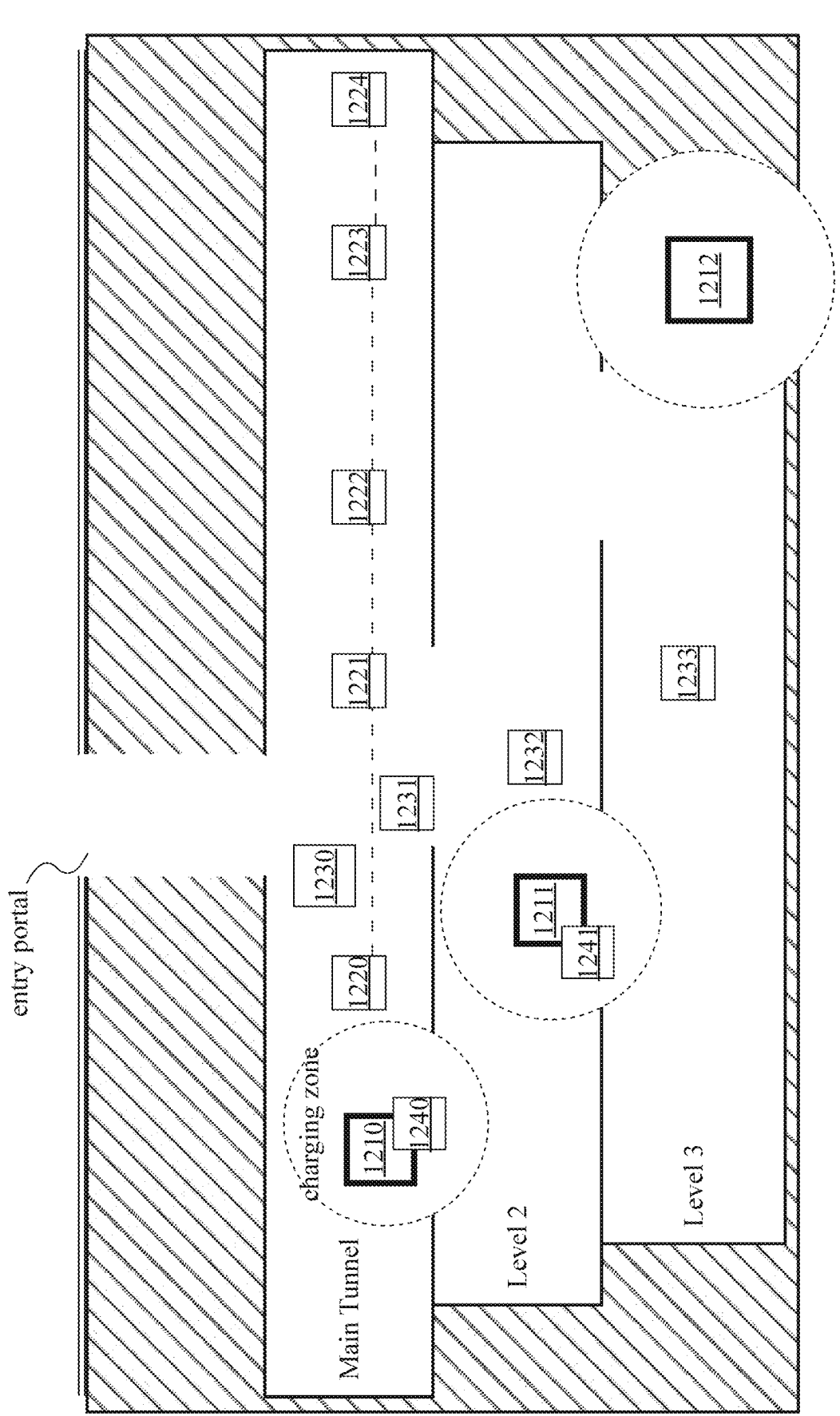
FIG. 12 is a system diagram illustrating an exemplary power and logistics underground infrastructure for autonomous drone swarm operations, according to an embodiment.

FIG. 12 is a system diagram illustrating an exemplary power and logistics underground infrastructure for autonomous drone swarm operations, according to an embodiment. This exemplary architecture demonstrates comprehensive energy management capabilities that enable sustained subterranean missions through intelligent power distribution, strategic charging infrastructure, and coordinated resource allocation. The power and logistics system provides essential support infrastructure that extends operational endurance while maintaining mission effectiveness despite the power constraints and logistical challenges typical of GPS-denied subterranean environments.

According to an embodiment, the subterranean operational environment demonstrates a multi-level underground facility comprising main tunnel level 1, tunnel level 2, and tunnel level 3 connected by vertical shafts and access passages that enable drone movement between operational areas while providing strategic locations for power and communication infrastructure deployment. The underground environment includes entry portal connections to surface-based fog layer servers and command systems, enabling coordination between underground operations and external support infrastructure.

The tunnel system architecture provides multiple operational zones that require distributed power management and communication support across varying depths and geographic locations. Vertical shaft connections enable efficient drone movement between tunnel levels while providing pathways for power distribution cables, communication links, and emergency evacuation routes. Access shaft configurations support equipment deployment and maintenance operations while enabling strategic positioning of charging infrastructure and communication relay systems.

A power management control system serves as the central coordination hub for all energy-related operations throughout the underground environment, implementing comprehensive energy budgeting algorithms, real-time battery monitoring across all drone platforms, and intelligent rotation scheduling that optimizes operational capacity while preventing power-related mission failures. The power management system maintains continuous surveillance of individual drone battery levels, charging system status, power distribution network health, and environmental factors that could impact power consumption or charging efficiency.

Energy budgeting algorithms within the power management system calculate optimal power allocation strategies based on mission requirements, operational duration, environmental conditions, and available charging infrastructure. The system implements predictive analysis that estimates power consumption rates for different mission phases and environmental conditions, enabling proactive power management decisions that prevent unexpected power depletion. Battery health monitoring tracks individual cell performance, charging cycle history, and degradation patterns to optimize charging schedules and predict replacement requirements.

According to an embodiment, portable charger beacon 1210, portable charger beacon 1211, and portable charger beacon 1212 provide strategically positioned charging infrastructure throughout the underground environment, each establishing defined charging zones (illustrated as dashed line circles extending around each portable charger beacon) that enable multiple drones to receive power simultaneously while maintaining operational flexibility. The portable charger beacons may implement self-contained power systems including high-capacity battery packs, efficient charging circuits, and wireless power transfer capabilities that enable drone charging without physical connection requirements.

Portable charger beacon 1210 positioned in main tunnel level 1 provides primary charging capabilities for drones operating in upper-level areas, implementing fast-charging protocols that minimize charging time while maintaining battery health and longevity. The beacon can include wireless charging pads, inductive charging systems, and emergency backup power that ensures continued charging capability despite power distribution disruptions.

Portable charger beacon 1211 located in tunnel level 2 supports intermediate-depth operations through extended-range charging capabilities and enhanced power storage that accommodates longer charging queues and higher power demand. The beacon implements adaptive charging algorithms that optimize charging rates based on individual drone battery conditions, mission urgency, and available power capacity.

Portable charger beacon 1212 positioned in tunnel level 3 provides deep-operation charging support through high-efficiency charging systems and extended backup power that enables continued operations during extended missions or communication disruptions. The beacon includes emergency beacon functionality that provides navigation reference points and communication relay capabilities in addition to charging services.

The charging zones indicated by dashed circles around each portable charger beacon demonstrate effective charging range and capacity, enabling multiple drone platforms to receive power simultaneously while maintaining safe separation distances and coordination protocols. Charging zone management prevents overcrowding and ensures equitable access to charging resources while maintaining mission continuity through coordinated charging schedules.

According to an embodiment, the breadcrumb relay network comprising breadcrumb relay 1220, breadcrumb relay 1221, breadcrumb relay 1222, breadcrumb relay 1223, and breadcrumb relay 1224 establishes persistent communication pathways throughout the underground environment while providing power-efficient communication support that extends operational range without depleting drone battery capacity. The breadcrumb relay system implements low-power communication nodes that maintain mesh network connectivity despite line-of-sight obstructions, structural interference, and extended distances typical of subterranean operations.

Breadcrumb relay 1220 through breadcrumb relay 1224 create communication chain connectivity indicated by dashed lines that demonstrate mesh network topology and redundant communication pathways. Each relay node implements multi-modal communication capabilities including radio frequency, optical signaling, and acoustic communication that adapt to local environmental conditions and interference patterns. The relay network provides store-and-forward capabilities that enable message transmission despite temporary communication disruptions or network segmentation.

Power management for breadcrumb relays may utilize extended-life battery systems, energy harvesting capabilities, and power-saving protocols that enable persistent operation throughout extended missions. The relay network implements adaptive power management that adjusts transmission power, communication frequency, and processing intensity based on network demand and available power capacity. Emergency power backup ensures continued operation during power distribution failures or extreme environmental conditions.

According to an embodiment, active operational drones demonstrate real-time power management through continuous battery level monitoring and intelligent task allocation. Queen drone 1230 with 90% battery capacity serves as the primary command and coordination platform while maintaining sufficient power reserves for extended leadership responsibilities and emergency response requirements. The Queen drone implements enhanced power management that prioritizes mission-critical functions while optimizing power consumption for sustained operations.

Worker drone 1231 with 85% battery capacity, Worker drone 1232 with 70% battery capacity, and Worker drone 1233 with 75% battery capacity demonstrate distributed operational capability with varying power levels that require coordinated power management and rotation scheduling. The individual battery level indicators enable real-time power assessment and proactive rotation decisions that maintain operational capacity while preventing unexpected power failures.

Power level diversity across active drones enables staggered return scheduling that maintains continuous operational capability while ensuring adequate charging time for power restoration. The system implements dynamic task allocation that considers individual drone power levels, mission requirements, and charging infrastructure availability to optimize operational effectiveness while preserving power reserves for critical mission phases.

Charging drone 1240 and charging drone 1241 demonstrate active charging operations that restore power capacity while maintaining network connectivity and coordination with operational platforms. The charging drones implement communication protocols that enable continued participation in mesh network operations while receiving power, ensuring that charging operations do not compromise coordination effectiveness or mission continuity.

Charging status indicators provide real-time charging progress information that enables precise rotation timing and power management decisions. The charging system implements fast-charging protocols that minimize charging time while maintaining battery health, enabling rapid rotation cycles that maximize operational capacity while ensuring adequate power restoration.

According to an embodiment, a staggered return schedule implements systematic rotation protocols that maintain operational capacity while ensuring adequate charging time for power restoration. For instance, phase 1 operations covering 0-2 hours maintain Worker drones 1240 and 1241 in charging status while operational drones continue mission execution. Phase 2 operations covering 2-4 hours rotate Worker drone 1231 and Worker drone 1232 to charging status while previously charged drones resume operational duties.

Phase 3 operations covering 4-6 hours rotate Worker drone 1233 and Queen drone 1230 to charging status while maintaining mission continuity through newly charged platforms. The continuous 33% capacity reserve ensures that adequate operational capability remains available despite charging rotations, equipment failures, or emergency response requirements. Rotation scheduling adapts to mission requirements, environmental conditions, and individual drone power consumption rates to optimize operational effectiveness.

An energy budgeting system implements comprehensive power allocation protocols that ensure mission success while preventing power-related failures through intelligent resource management. Critical reserve requirements maintain 20% minimum battery capacity across all operational platforms to ensure emergency response capability and safe extraction under adverse conditions. Return threshold protocols initiate charging rotation when individual drone battery levels reach 30% capacity, providing adequate safety margins while maximizing operational time.

Mission reserve allocation maintains 15% contingency power for unexpected mission extensions, environmental challenges, or equipment failures that could increase power consumption beyond planned levels. Emergency extraction reserve maintains 10% minimum capacity for immediate withdrawal under emergency conditions, ensuring that all platforms retain sufficient power for safe egress regardless of mission status or environmental conditions.

An emergency power backup provides comprehensive contingency power systems that prevent mission failure due to power distribution disruptions, equipment failures, or extended mission duration requirements. Portable battery pack systems provide emergency power for critical systems including communication equipment, navigation systems, and safety protocols when primary power becomes unavailable. Solar panel deployment capabilities enable power generation in surface-accessible areas or areas with artificial lighting that could support photovoltaic power generation.

Emergency beacon power systems provide backup power for communication beacons, navigation references, and emergency signaling systems that enable rescue operations and emergency coordination when primary systems fail. External power integration capabilities enable connection to facility power systems, generator systems, or other external power sources when available and appropriate for mission requirements.

According to an embodiment, the power and logistics system implements dynamic power management through continuous monitoring, predictive analysis, and adaptive resource allocation that responds to changing mission requirements and environmental conditions. Battery level monitoring across all platforms enables real-time power assessment and proactive management decisions that prevent unexpected power failures while optimizing operational effectiveness. Power consumption analysis tracks individual drone power usage patterns, environmental factors that impact consumption, and mission phase requirements to improve power management accuracy and efficiency.

Charging infrastructure optimization ensures that portable charger beacons are positioned to provide maximum coverage while minimizing deployment complexity and maintenance requirements. The charging system implements load balancing that distributes charging demand across available infrastructure while preventing overload conditions that could compromise charging effectiveness. Emergency charging protocols provide rapid power restoration capabilities when immediate power restoration is required for mission continuation or emergency response.

Communication power management optimizes breadcrumb relay network operation through adaptive power allocation, efficient routing protocols, and power-saving communication modes that extend network operation while maintaining adequate connectivity. The relay network implements emergency communication modes that prioritize critical messages while reducing power consumption during power-constrained operations.

Figure 14:
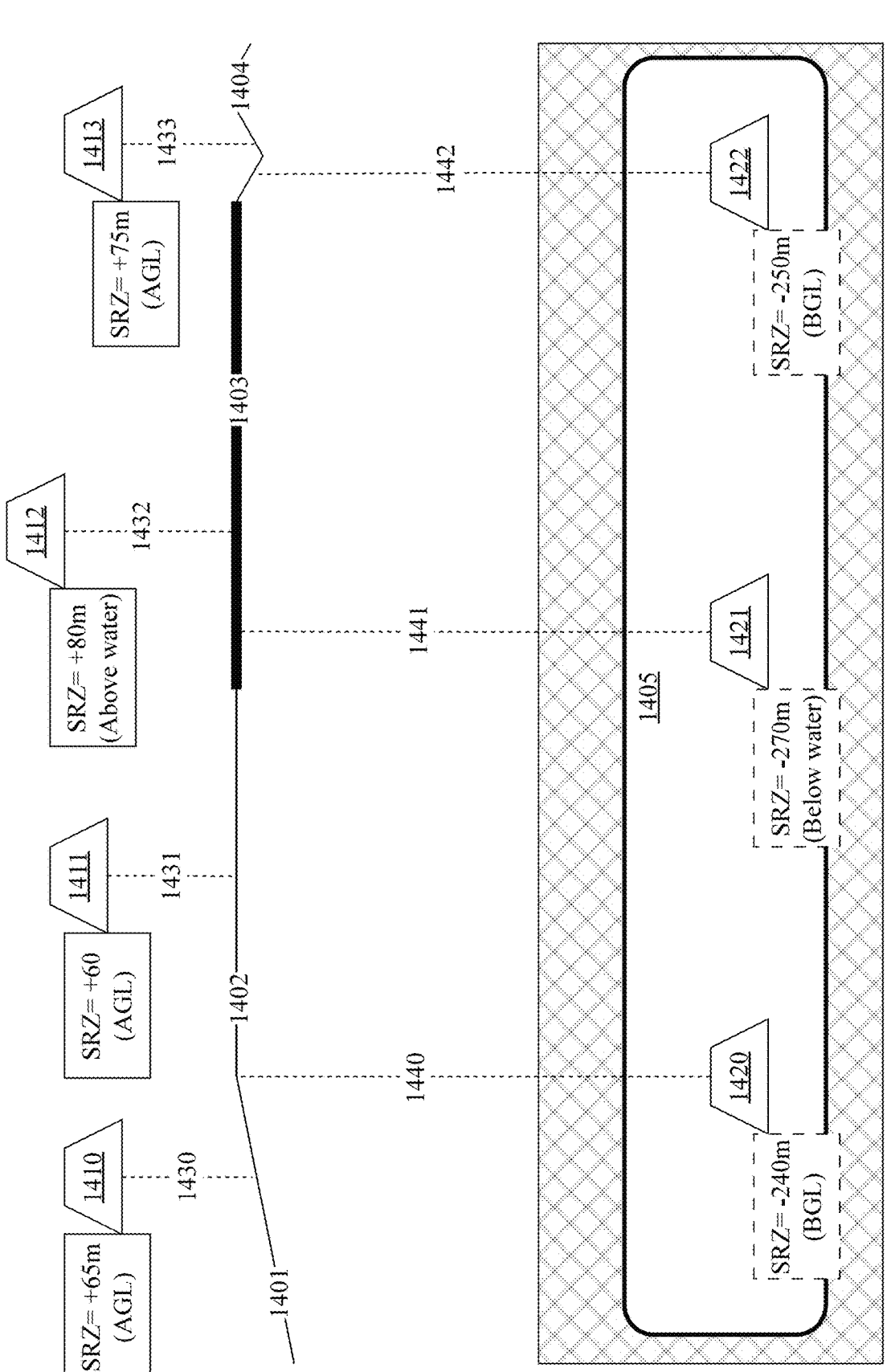
FIG. 14 is a block diagram illustrating an exemplary UGF-SRZ coordinate system for autonomous drone swarm operations, demonstrating surface model selection policies, vertical ray projection methodologies, and signed coordinate value assignments that enable consistent positioning measurements above and below ground level, according to an embodiment.

FIG. 14 is a block diagram illustrating an exemplary UGF-SRZ coordinate system for autonomous drone swarm operations, demonstrating surface model selection policies, vertical ray projection methodologies, and signed coordinate value assignments that enable consistent positioning measurements above and below ground level, according to an embodiment. The UGF-SRZ coordinate system provides comprehensive spatial reference capabilities that unify traditional "Above Ground Level" (AGL) and "Below Ground Level" (BGL) measurements into a single, mathematically consistent coordinate framework suitable for seamless operation across surface and subterranean environments.

According to an embodiment, the coordinate system operates across multiple terrain segments comprising surface terrain segment 1401 representing sloped topography with variable elevation characteristics, flat terrain segment 1402 providing stable horizontal surface reference, water surface segment 1403 implementing dynamic surface modeling based on tide and stage readings, and varied topography segment 1404 demonstrating complex terrain with elevation changes. Underground tunnel infrastructure 1405 provides representative subterranean operational environment where traditional GPS-based positioning systems become unavailable and alternative coordinate reference systems become essential for autonomous navigation and coordination.

The system implements a surface model selection policy comprising multiple hierarchical selection criteria that dynamically choose optimal surface reference sources based on data quality, temporal currency, and operational requirements. A DTM/DSM priority component utilizes high-resolution satellite and aerial-derived Digital Terrain Model and Digital Surface Model data when available, providing authoritative surface reference with sub-meter accuracy and comprehensive geographic coverage. A water surface component implements specialized surface modeling for aquatic environments utilizing stage readings, tide measurements, and radar altimetry to establish dynamic water surface references that account for temporal variations in water level. A cursory mapping component enables Hive-led local LiDAR sweeps when authoritative surface data becomes unavailable or outdated, providing real-time surface acquisition through distributed drone sensor collection and collaborative mapping protocols. A below-grade fallback component maintains Fog-maintained grade references for operational scenarios where only coarse surface approximations are available, ensuring continued coordinate system functionality despite limited surface data availability. A confidence scoring component implements mathematical confidence assessment where $c_{surface} \in [0,1]$, providing quantitative reliability metrics that enable appropriate safety margin scaling and uncertainty propagation throughout navigation and coordination algorithms.

According to an embodiment, the system demonstrates operational capability through multiple drone platforms operating at varying elevations and geographic locations. Surface drone 1410 operates above sloped terrain demonstrating positive SRZ value calculation where the drone altitude exceeds the surface elevation at the corresponding planimetric coordinates. Surface drone 1411 positioned above flat terrain segment 1402 illustrates consistent SRZ calculation across uniform topography, while surface drone 1412 operating above water surface segment 1403 demonstrates specialized coordinate calculation for aquatic environments where surface reference derives from dynamic water level rather than static terrain elevation. Surface drone 1413 positioned above varied topography segment 1404 shows coordinate system adaptability to complex terrain characteristics, and further surface drones may be present to coordinate calculation across transition terrain where surface model selection may require dynamic switching between different reference sources.

A plurality of underground drones 1420, underground drone 1421, and underground drone 1422 demonstrate subterranean coordinate system operation within underground tunnel infrastructure 1405 where satellite navigation signals become unavailable and surface-referenced positioning provides essential spatial reference capabilities. These underground platforms illustrate negative SRZ value calculation where drone positions fall below the overhead surface elevation, providing consistent coordinate framework that enables seamless integration between surface and subterranean operations while maintaining mathematical consistency and operational compatibility with surface-based coordination systems.

According to an embodiment, the coordinate system implements vertical ray projection methodology through multiple ray projection components that establish geometric relationships between drone positions and overhead surface references. Vertical ray 1430 projects from surface drone 1410 to the corresponding overhead surface point on terrain segment 1401, demonstrating direct geometric relationship calculation between drone position and surface reference. Vertical rays 1430, 1431, 1432, and 1433 provide similar geometric projection from their respective surface drones to overhead surface points, illustrating consistent projection methodology across varying terrain types and surface characteristics. Underground vertical rays 1440, 1441, and 1442 extend from underground drones through intervening terrain to overhead surface references, demonstrating coordinate system capability to maintain surface reference relationships despite physical separation and obstacle interference between drone positions and surface reference points.

The UGF-SRZ coordinate system mathematical framework may implement the fundamental calculation $SRZ = U - H_{surface}(E,N,t)$ where U represents the drone's altitude in traditional geodetic coordinates, E and N represent easting and northing planimetric coordinates, and $H_{surface}(E,N,t)$ represents the surface elevation at the corresponding planimetric location at time t. Positive SRZ values indicate drone positions above the selected surface reference, traditionally corresponding to "Above Ground Level" measurements, while negative SRZ values indicate positions below the surface reference, traditionally corresponding to "Below Ground Level" measurements. This mathematical framework provides unified coordinate representation that eliminates ambiguity between surface and subsurface positioning while enabling consistent navigation algorithms and coordination protocols across diverse operational environments.

According to an embodiment, the coordinate system provides operational advantages including consistent spatial reference that enables seamless transition between surface and subterranean operations, mathematical unification that eliminates coordinate system discontinuities at surface boundaries, confidence-based surface selection that adapts to data availability and quality constraints, and dynamic surface model updating that maintains coordinate accuracy despite changing environmental conditions or improved data availability. The system supports all operational modes from tactical short-duration missions requiring immediate coordinate reference to strategic long-duration operations requiring sustained coordinate consistency across extensive geographic areas and varying operational environments, while maintaining compatibility with existing navigation systems and coordination protocols through standardized coordinate transformation and reference frame conversion capabilities.

Figure 18:
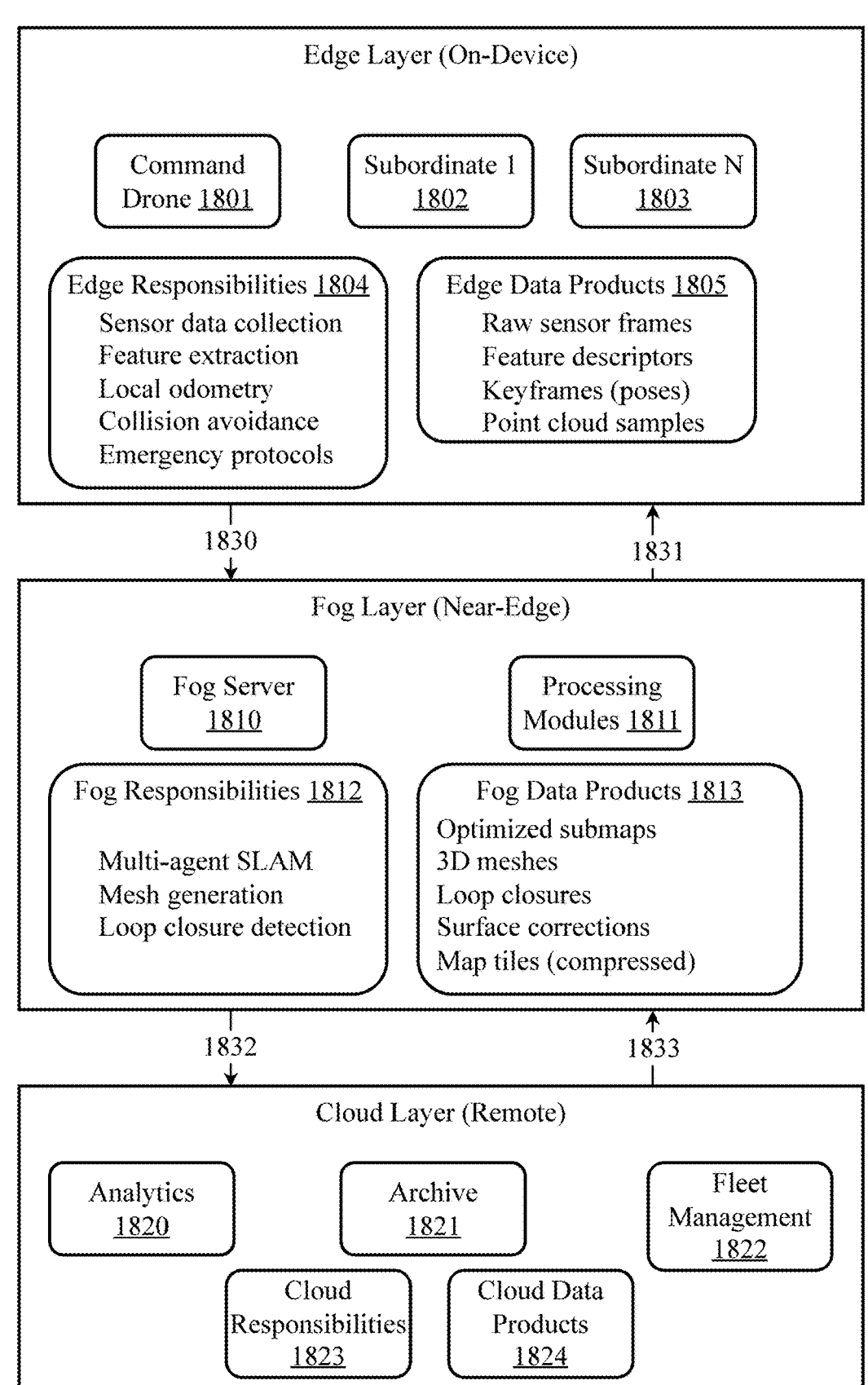
FIG. 18 is a system architecture diagram illustrating an exemplary Edge-Fog-Cloud partitioning framework for autonomous drone swarm operations that distributes computational responsibilities, data processing, and storage functions across three hierarchical computing tiers to optimize performance, resource utilization, and mission continuity in GPS-denied environments, according to an embodiment.

FIG. 18 is a system architecture diagram illustrating an exemplary Edge-Fog-Cloud partitioning framework for autonomous drone swarm operations that distributes computational responsibilities, data processing, and storage functions across three hierarchical computing tiers to optimize performance, resource utilization, and mission continuity in GPS-denied environments, according to an embodiment. The partitioning architecture enables scalable autonomous operations by matching processing requirements with appropriate computational resources while maintaining real-time performance for safety-critical functions, intermediate processing for complex algorithms, and long-term analytics for mission optimization and fleet management.

According to an embodiment, the Edge Layer comprises drone platforms 1801, 1802, and 1803 that execute real-time processing functions with strict latency and power constraints imposed by autonomous flight operations. Command drone 1801 implements enhanced processing capabilities including artificial intelligence coordination algorithms, natural language command processing, and swarm-wide task allocation while maintaining real-time flight control and collision avoidance. Subordinate drones 1802 and 1803 execute specialized sensor processing including feature extraction, local odometry calculation, and environmental monitoring while streaming processed data products to higher computational tiers for integration and optimization.

Edge layer responsibilities 1804 encompass time-critical functions that require immediate response including, but not limited to, sensor data collection from multi-modal sensor arrays, feature extraction using computer vision algorithms optimized for low-power processors, keyframe generation at predetermined intervals containing pose estimates and environmental observations, local odometry calculation using visual-inertial algorithms and LiDAR scan matching, collision avoidance through real-time obstacle detection and path planning, and emergency protocol execution including automatic landing and safety system activation. These responsibilities prioritize mission safety and operational continuity while minimizing computational overhead and power consumption essential for sustained autonomous flight operations.

Edge data products 1805 comprise lightweight data structures optimized for transmission bandwidth and processing efficiency including, but not limited to, raw sensor frames captured at reduced resolution and frame rates appropriate for bandwidth constraints, feature descriptors using binary or compressed representations that maintain matching accuracy while minimizing data size, keyframes containing pose estimates with uncertainty bounds and associated visual features, and point cloud samples from LiDAR sensors processed through octree compression or voxel downsampling to reduce transmission requirements. Edge processing implements minimal buffering measured in minutes rather than hours, focusing on immediate operational needs while relying on higher tiers for persistent data storage and complex analysis.

According to an embodiment, the Fog Layer implements near-edge computing capabilities through fog server 1810 and processing modules 1811 positioned in proximity to operational areas to provide enhanced computational resources while maintaining acceptable communication latency. Fog server 1810 utilizes high-performance computing platforms including, but not necessarily limited to, GPU acceleration for parallel processing, dedicated memory for large-scale data structures, and high-speed storage for intermediate data products, enabling complex algorithms that exceed edge device capabilities while maintaining real-time or near-real-time responsiveness for mission-critical applications.

Fog layer responsibilities 1812 may comprise computationally intensive algorithms that benefit from enhanced processing resources including multi-agent SLAM fusion that combines observations from multiple drone platforms into unified environmental models, point cloud registration using iterative closest point and normal distributions transform algorithms for precise geometric alignment, three-dimensional mesh generation through surface reconstruction algorithms that create detailed environmental representations, loop closure detection using global search algorithms that identify previously visited locations for error correction, UGF-SRZ surface correction through dynamic surface model selection and algorithmic surface estimation, and mission state management that maintains comprehensive situational awareness and coordination data for autonomous decision-making.

Fog data products 1813 may comprise intermediate-level data structures that balance detail with transmission efficiency including optimized submaps that provide enhanced resolution compared to edge products while maintaining manageable data sizes, three-dimensional meshes generated through surface reconstruction algorithms that enable detailed environmental visualization and analysis, loop closure constraints identified through place recognition and geometric validation that enable trajectory optimization, surface corrections for UGF-SRZ coordinate systems that improve positioning accuracy through integration of authoritative surface data, and compressed map tiles optimized for transmission to edge devices while preserving essential navigation information. Fog layer storage capabilities extend to hours or days, enabling persistent data availability for mission continuity and post-mission analysis.

According to an embodiment, the Cloud Layer provides enterprise-level services through analytics platform 1820, archival systems 1821, and fleet management 1822 that utilize unlimited computational and storage resources to support long-term mission optimization, cross-mission learning, and fleet-wide coordination. Analytics platform 1820 implements machine learning model training using aggregated mission data, statistical analysis of operational performance across multiple missions, and predictive analytics that optimize future mission planning and resource allocation. Archival systems 1821 provide permanent data storage with redundancy and backup capabilities that ensure mission data preservation for regulatory compliance, post-mission analysis, and historical reference.

Cloud layer responsibilities 1823 may comprise strategic functions that benefit from unlimited computational resources and global perspective including cross-mission analytics that identify operational patterns and optimization opportunities across multiple deployments, machine learning model training and updates using federated learning techniques that improve autonomous capabilities without compromising operational security, long-term archival of mission data with appropriate retention policies and access controls, fleet coordination across multiple operational areas and mission types, global map reconciliation that maintains consistency across overlapping operational areas and temporal deployments, and regulatory compliance through automated reporting and audit trail maintenance that ensures adherence to applicable safety and operational standards.

Cloud data products 1824 may comprise comprehensive data structures that support strategic analysis and long-term operational improvement including complete mission archives with full-resolution sensor data and detailed operational logs, trained artificial intelligence models optimized for specific operational environments and mission types, global maps that integrate observations from multiple missions to provide comprehensive environmental coverage, analytics reports that identify operational trends and optimization opportunities, and compliance data formatted for regulatory reporting and audit requirements. Cloud storage provides permanent archival capabilities with enterprise-grade reliability and security.

According to an embodiment, data flow pathways 1830, 1831, 1832, and 1833 implement bidirectional communication protocols that optimize information exchange between computational tiers while managing bandwidth constraints and latency requirements. Edge-to-Fog transmission 1830 streams features and keyframes through compressed data formats that preserve essential information while minimizing bandwidth utilization, utilizing priority-based transmission protocols that ensure safety-critical data receives immediate processing while non-essential information is transmitted during available bandwidth periods. Fog-to-Edge feedback 1831 provides map tiles and positioning corrections through efficient compression algorithms that enable real-time navigation updates while managing transmission overhead and processing requirements on resource-constrained edge devices.

Fog-to-Cloud transmission 1832 implements batch upload protocols that transfer processed meshes and archival data during scheduled intervals or when bandwidth availability permits, utilizing differential compression that transmits only incremental changes to reduce transmission requirements while maintaining data completeness. Cloud-to-Fog updates 1833 distribute trained models and configuration updates through secure channels with verification protocols that ensure data integrity and prevent unauthorized modifications while maintaining backward compatibility with existing operational systems.

Bandwidth management policies can implement priority-based transmission protocols that ensure mission-critical communications receive appropriate resource allocation including Priority 0 (Critical) for safety and emergency data requiring immediate transmission regardless of bandwidth constraints, Priority 1 (Command) for mission updates and coordination messages requiring real-time processing and response, Priority 2 (Data) for sensor telemetry and status information that supports situational awareness but tolerates moderate transmission delays, and Priority 3 (Bulk) for map updates and archival data that utilizes background transmission when bandwidth availability permits without interfering with higher-priority communications.

Compute allocation policies may distribute processing responsibilities based on latency requirements and computational complexity, allocating edge processing to functions requiring less than 1 TOPS computational capacity with, for instance, sub-100 millisecond latency constraints for real-time safety-critical operations, fog processing to algorithms requiring 10-100 TOPS capacity with sub-1 second latency tolerance for heavy processing and optimization functions, and cloud processing to unlimited computational capacity with latency tolerance exceeding 1 second for analytics and archival functions that do not impact real-time operations.

Adaptive policies can implement dynamic resource management that responds to changing operational conditions including bandwidth-aware compression that adjusts data compression ratios based on available transmission capacity, quality-of-service routing that prioritizes transmission pathways based on message priority and network conditions, load balancing algorithms that distribute processing tasks across available computational resources, congestion avoidance protocols that prevent network overload through predictive traffic management, priority-based queuing that ensures critical messages receive appropriate processing priority, dynamic compression ratios that optimize data transmission based on content importance and bandwidth availability, and graceful degradation modes that maintain essential functionality despite resource constraints or system failures.

According to an embodiment, synchronization timelines establish regular communication intervals that optimize data freshness while managing bandwidth utilization including, for example, Edge-to-Fog streaming at 100 millisecond intervals for continuous sensor data transmission, Fog-to-Edge map updates at 1-10 second intervals based on environmental change rates and navigation requirements, Fog-to-Cloud batch uploads at hourly intervals for archival data and processed results, Cloud-to-Fog model updates at daily or weekly intervals based on training completion and validation requirements, and emergency synchronization protocols that override normal scheduling for immediate transmission of safety-critical information or mission-threatening conditions.

Fallback mode protocols may be implemented to ensure mission continuity despite communication or processing failures including Fog disconnect fallback that activates edge autonomous mode using cached maps and local processing capabilities, Cloud disconnect fallback that enables fog standalone operation using local processing and storage resources, bandwidth-limited fallback that implements enhanced compression and priority-based transmission protocols, compute overload fallback that implements task shedding and priority-based processing allocation, storage overflow fallback that activates aging policies and temporary data reduction protocols, emergency fallback that implements store-and-forward protocols for mission-critical data preservation, and recovery protocols that implement differential synchronization to restore normal operations when connectivity and resources become available.

Failure scenario management implements comprehensive graceful degradation strategies that maintain mission effectiveness despite system component failures or resource constraints. Network disconnection protocols enable edge isolated operation using local odometry and cached map data, fog isolated operation using batch processing and store-and-forward protocols, and cloud isolated operation enabling fog autonomous functionality with local processing and storage capabilities. Resource overload management implements CPU overload mitigation through priority task scheduling, memory management through least-recently-used cache eviction, storage management through data aging policies, and bandwidth management through adaptive compression protocols. Mission continuity protocols ensure essential functions maintain real-time operation while non-critical processing is deferred, quality degradation occurs with operator notification, and automatic recovery activates when resources become available.

Performance characteristics define operational parameters across computational tiers including, for example, Edge Layer specifications of sub-10 millisecond latency, limited computational capacity, minutes-duration storage, battery-constrained power consumption, mission-critical reliability requirements, real-time response advantages, and resource constraint limitations. Fog Layer specifications may comprise sub-100 millisecond latency, high computational capacity, hours-to-days storage duration, AC power availability, high availability reliability requirements, heavy processing advantages, and local coverage area limitations. Cloud Layer specifications include latency exceeding 1 second, unlimited computational capacity, permanent archival storage, grid or renewable power sources, enterprise-grade reliability, global scale advantages, and high latency limitations that restrict real-time applications.

Figure 1:
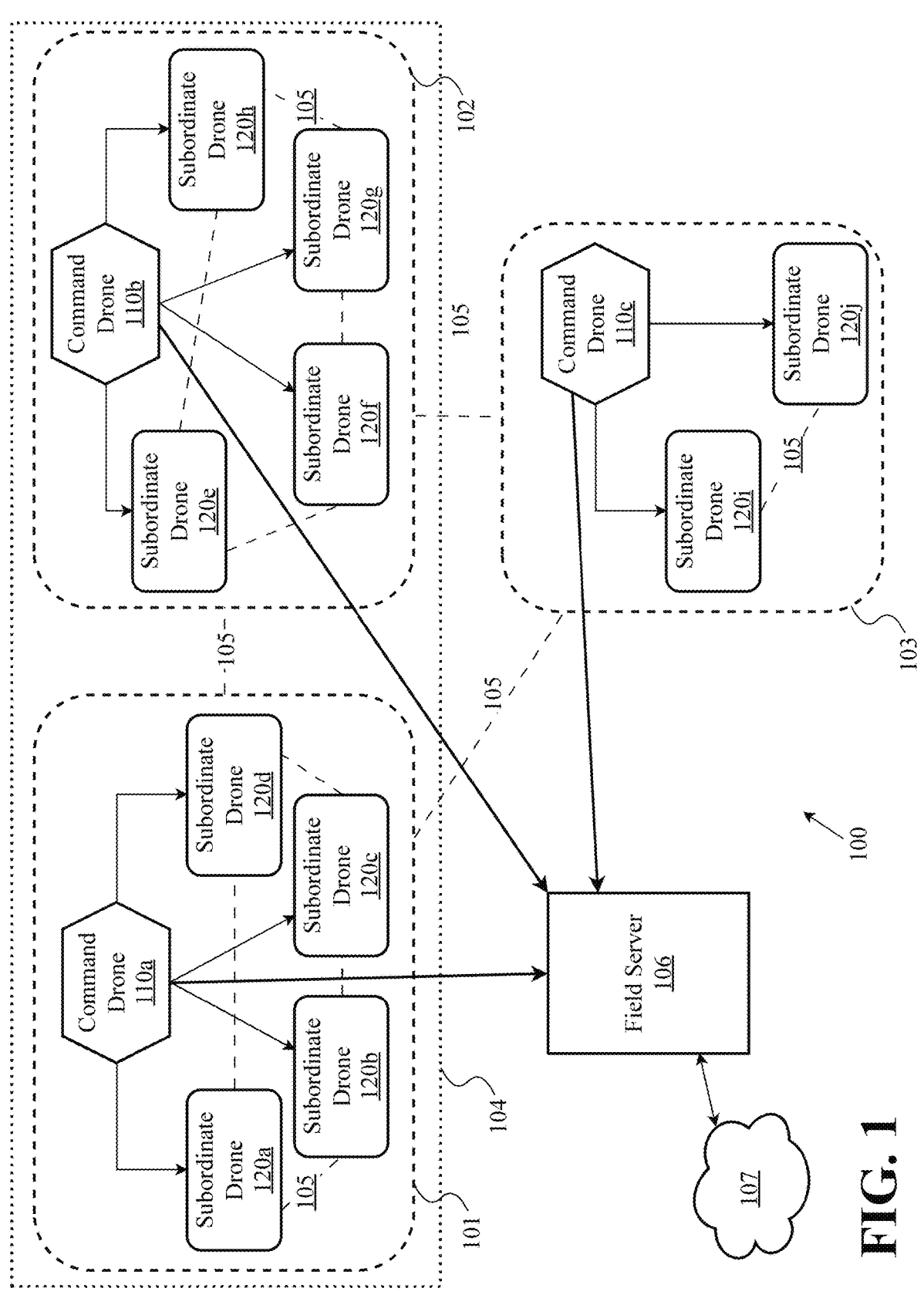
FIG. 1 is a block diagram illustrating an exemplary system architecture for an autonomous drone swarm system with AI-driven coordination, according to an embodiment.

FIG. 1 is a block diagram illustrating an exemplary system architecture for an autonomous drone swarm system with AI-driven coordination 100, according to an embodiment. The system comprises a plurality of autonomous operational units designated as Hives 101, 102, and 103, which may be networked together to form a larger coordinated unit designated as a Squadron 104. Each Hive represents a self-contained autonomous drone swarm unit capable of independent operation while maintaining coordination capabilities with other Hives within the Squadron.

Hive 101 comprises a command drone 110a functioning as the primary coordination node for the Hive, operatively connected to and coordinating a plurality of subordinate drones 120a, 120b, 120c, and 120d. Similarly, Hive 102 includes command drone 110b coordinating subordinate drones 120e, 120f, 120g, and 120h, while Hive 103 comprises command drone 110c coordinating subordinate drones 120i and 120j. This hierarchical architecture enables scalable deployment configurations wherein each command drone serves as a local coordination node for one or more subordinate drones. The amount of subordinate drones deployed in a hive can vary based on mission requirements and operational constraints.

The system further includes a mesh network infrastructure indicated by communication links 105, which establish redundant communication pathways between all drones within the Squadron. These communication links enable both intra-Hive communication between command drones and their respective subordinate drones, as well as inter-Hive communication between different command drones and between subordinate drones of different Hives. The mesh network topology provides fault-tolerant communication capabilities such that failure of any individual communication link or drone does not compromise the overall network connectivity of the Squadron.

Field server 106 is operatively connected to receive data transmissions from the plurality of command drones 110a, 110b, and 110c, serving as a fog computing layer for intermediate data processing and storage. Field server 106 can be configured to aggregate telemetry data, mission status information, and intelligence gathered by the distributed drone swarm, providing local processing capabilities that reduce bandwidth requirements for cloud connectivity while enabling continued operations in communication-constrained environments.

Cloud connectivity 107 extends the system architecture to enable comprehensive data analysis, long-term data storage, and integration with broader command and control systems. The cloud layer provides advanced analytical capabilities, mission planning support, and coordination with other military or civilian operational systems. This multi-layered architecture from edge computing on individual drones, through fog computing at the field server level, to cloud computing for comprehensive analysis, ensures robust and scalable data processing capabilities across varying operational environments and communication conditions.

As illustrated, autonomous drone swarm system 100 demonstrates scalability from small-scale single Hive operations involving one command drone and a few subordinate drones, to large-scale Squadron deployments involving multiple Hives with dozens of coordinated autonomous drones. This scalability enables deployment flexibility to match mission requirements, available resources, and operational constraints, while maintaining the autonomous coordination capabilities and fault-tolerant communication architecture throughout all deployment scales.

Figure 2:
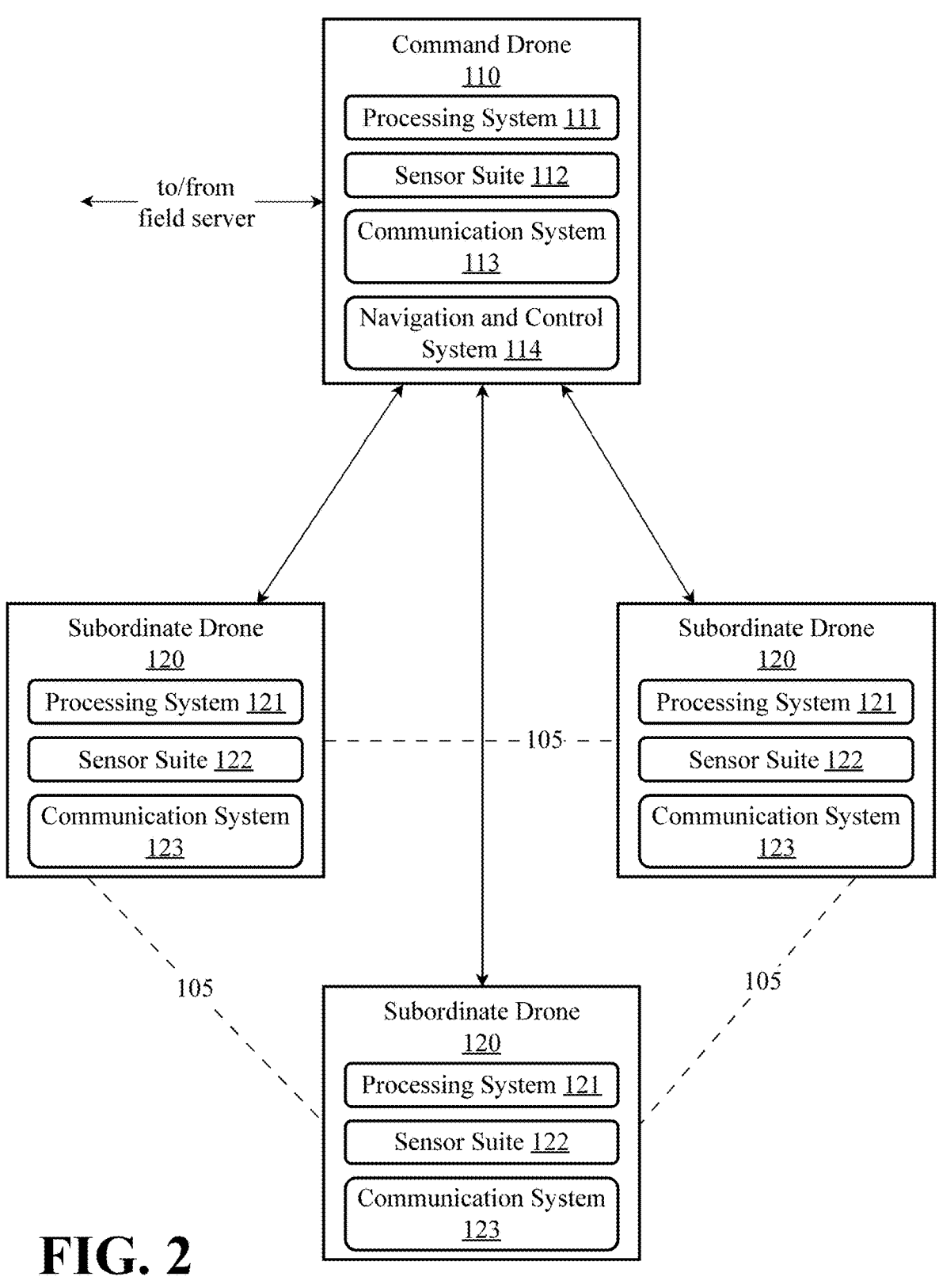
FIG. 2 is a block diagram illustrating the command drone and subordinate drones of autonomous drone swarm system in more detail, according to an embodiment.

FIG. 2 is a block diagram illustrating the command drone 110 and subordinate drones 120 of autonomous drone swarm system 100 in more detail, according to an embodiment. The figure provides an exemplary view of the modular component integration within ruggedized drone airframes, demonstrating configurable hardware and software systems that enable autonomous swarm coordination and operation. Each drone may be operably connected to each other via one or more communication links 105 comprising a plurality of communication modalities.

According to an embodiment, command drone 110 incorporates various primary subsystems that collectively provide the computational, sensory, communication, and navigation capabilities necessary for swarm coordination and mission execution. Processing system 111 comprises a high-performance computing module configured for real-time edge processing, a large language model processor implementing, for example, a fine-tuned LLaMA-13B or equivalent neural network architecture, and a containerized orchestration system (e.g., Kubernetes or similar) enabling modular software deployment and management. The processing system 111 employs artificial intelligence integration including natural language processing for operator command interpretation, autonomous mission planning algorithms, and multi-agent coordination. Processing system 111 is specifically configured to handle these AI-driven computational demands while maintaining power consumption within acceptable limits for sustained aerial operations.

The autonomous drone swarm system leverages a comprehensive suite of advanced artificial intelligence technologies that enable coordination, agentic decision-making, and adaptive mission execution across diverse operational environments. The integrated AI architecture comprises multiple specialized artificial intelligence subsystems including multi-modal agentic computer vision processing, large language model natural language processing with agentic response capabilities, audio artificial intelligence with agentic environmental analysis, and adaptive AI frameworks designed for future agentic technology integration. These AI components are integrated into optimized processing systems configured for real-time, on-board computation while maintaining power efficiency requirements essential for sustained aerial operations.

The system implements multi-modal agentic computer vision artificial intelligence capabilities that power critical operational functionalities including object detection, obstacle avoidance, environmental mapping, target recognition systems, and communication systems. The agentic computer vision AI enables autonomous navigation through complex, dynamic environments with precision positioning and collision avoidance capabilities, where agents execute evasive maneuvers and tactical adjustments based on external visual stimuli and mission parameters that exceed human operator reaction times and environmental assessment capabilities.

Agentic object detection algorithms automatically identify and classify vehicles, personnel, equipment, and infrastructure elements within the operational environment, with AI agents executing immediate threat assessment protocols and tactical responses based on detected objects and mission parameters. Environmental mapping through multi-modal agentic computer vision creates detailed three-dimensional terrain models that integrate with navigation systems, where AI agents execute route optimization and tactical positioning decisions based on terrain analysis and mission requirements.

Agentic target recognition algorithms implement advanced pattern recognition and classification capabilities that automatically identify objects of interest, potential threats, and mission-relevant targets, with AI agents executing engagement protocols, tracking procedures, and alert notifications based on target identification and rules of engagement parameters. The multi-modal computer vision system integrates electro-optical, infrared, and other imaging modalities, enabling agentic responses that adapt sensor selection and processing algorithms based on environmental conditions and target characteristics.

Agentic obstacle avoidance algorithms process real-time visual data to detect and avoid static and dynamic obstacles, where AI agents execute immediate course corrections, formation adjustments, and tactical maneuvering based on obstacle detection and mission preservation requirements. The agentic computer vision AI enables autonomous operation in visually challenging environments including low-light conditions, adverse weather, and cluttered urban environments, with agents adapting visual processing algorithms and navigation strategies based on environmental stimuli and operational constraints.

The system incorporates large language model artificial intelligence, specifically implementing the LLaMA-13B model architecture in some embodiments, to drive agentic natural language processing capabilities that enable intuitive human-machine interaction and autonomous mission planning. The LLM integration with agentic response capabilities enables operators to provide mission commands and objectives using natural language inputs, where AI agents execute command interpretation, mission parameter extraction, and operational planning based on operator instructions and current mission context.

The agentic large language model processes operator inputs to interpret mission intent, analyze operational constraints, and generate structured mission parameters, with AI agents executing immediate mission plan generation and resource allocation based on interpreted commands and available operational resources. Agentic natural language understanding capabilities enable the system to process complex, multi-part instructions, where AI agents execute task prioritization, resource assignment, and tactical coordination based on extracted requirements and mission parameters.

Agentic mission planning algorithms within the LLM generate comprehensive operational plans that consider available resources, environmental conditions, threat assessments, and tactical objectives, with AI agents executing continuous plan optimization and adaptation based on changing external stimuli and operational feedback. The agentic LLM system implements contextual awareness algorithms that analyze current operational conditions, mission history, and environmental factors, enabling AI agents to execute contextually appropriate responses and mission adaptations based on situational changes and mission requirements. In some embodiments, drones may be configured with sonar capable components.

Agentic decision support capabilities provide real-time analysis and recommendations for mission commanders, with AI agents executing automated assessment of tactical situations, resource allocation optimization, and tactical positioning recommendations based on current operational parameters, threat assessments, and mission objectives derived from external stimuli and operator guidance.

The system integrates multi-modal agentic audio artificial intelligence technologies including speech-to-text (STT) and text-to-speech (TTS) models that facilitate voice-based interaction and environmental audio analysis capabilities. Speech-to-text processing enables real-time conversion of operator voice commands into digital instructions, where AI agents execute immediate command interpretation and mission parameter extraction based on voice input and current operational context.

Text-to-speech capabilities enable the system to provide audio feedback, status updates, and alert notifications to operators using natural language audio output, with AI agents executing contextual response generation and priority-based notification delivery based on operational conditions and mission status. Multi-modal agentic environmental audio analysis capabilities monitor ambient sound signatures, where AI agents execute threat classification, equipment identification, and tactical response protocols based on acoustic stimuli and mission parameters.

The agentic audio AI system implements acoustic signature recognition algorithms that can identify specific audio patterns including vehicle engines, weapon systems, communication equipment, and human speech, with AI agents executing immediate threat assessment protocols and tactical responses based on acoustic detection and operational rules of engagement. Agentic noise filtering and signal processing algorithms enable effective audio analysis in high-noise operational environments, where AI agents adapt filtering parameters and processing algorithms based on environmental audio conditions and mission requirements.

Audio-based agentic coordination enables real-time communication analysis and response generation, where AI agents execute communication relay protocols, emergency alert generation, and tactical coordination messaging based on detected audio communications and mission parameters.

The artificial intelligence technologies are integrated into processing systems specifically optimized for real-time, on-board computation that balances AI processing capabilities with power efficiency requirements essential for sustained aerial operations. Edge computing architectures enable complex AI processing to occur locally on drone platforms without dependence on external computing resources or constant communication connectivity, ensuring autonomous operation capability in communications-denied environments.

Processing optimization algorithms dynamically allocate computational resources based on mission priorities, environmental conditions, and available power capacity to maximize AI performance while maintaining flight duration and operational effectiveness. The system implements distributed agentic AI processing across the swarm network, enabling complex AI tasks to be shared among multiple drone platforms when computational demands exceed individual platform capabilities, with AI agents executing load balancing and task distribution based on processing capacity and mission priorities.

Power management integration ensures that agentic AI processing adapts to available battery capacity and mission duration requirements, with AI agents automatically adjusting AI algorithm complexity, processing frequency, and computational intensity based on power status and mission parameters to optimize the balance between AI capability and operational endurance. Thermal management systems maintain optimal processing temperatures for AI hardware during sustained operations while managing power consumption and cooling requirements.

The system architecture is specifically engineered for adaptability to future artificial intelligence and sensor technology advancements, implementing modular agentic AI frameworks that can incorporate new AI models and processing capabilities as they become available. The adaptive architecture enables integration of emerging sensor technologies including Laser Fidelity (LiFi) and Light Fidelity communication systems by developing tailored agentic AI models to process their unique data streams and communication protocols, where AI agents execute communication optimization and data processing based on signal characteristics and mission requirements.

Future agentic AI development capabilities include bio-inspired processing systems such as radar-like echolocation algorithms modeled on biological systems like bat navigation, enabling enhanced obstacle detection and navigation in low-visibility environments where AI agents execute sonar-based navigation and obstacle avoidance based on acoustic return signals and mission parameters. The modular agentic AI architecture supports rapid integration of new AI models for emerging sensor types, communication methods, and operational capabilities without requiring fundamental system redesign or hardware replacement.

Agentic machine learning framework integration enables continuous AI model improvement through operational experience, allowing AI agents to adapt and optimize AI performance based on real-world operational data, mission outcomes, and environmental feedback. The system maintains backward compatibility with existing AI models while enabling upgrade paths for enhanced agentic AI capabilities as technology advances, with AI agents executing model validation and performance optimization based on operational testing and mission effectiveness metrics. In some embodiments, drones may be further configured with sonar capable components operable by drone systems.

Software-defined AI processing enables remote AI model updates and capability enhancements through secure communication links, ensuring that deployed systems can benefit from AI advancement without physical system modification. Containerized AI model deployment supports multiple AI frameworks and enables rapid testing and deployment of new AI capabilities while maintaining system stability and operational reliability.

The comprehensive AI technology suite integrates with other system components including the hierarchical Queen-Worker coordination architecture, multi-modal communication systems, and fault-tolerant operation protocols. Queen drones implement enhanced AI processing capabilities that coordinate swarm-wide AI operations, manage distributed AI processing tasks, and provide AI-enhanced mission planning and coordination capabilities for subordinate drones.

Worker drones implement optimized AI processing for individual task execution, environmental monitoring, and coordination with Queen drone AI systems while maintaining autonomous AI capability for independent operation when communication with Queen drones is unavailable. The distributed AI architecture enables the swarm to maintain sophisticated AI capabilities despite individual drone failures through automatic AI task redistribution and dynamic AI processing allocation.

AI system integration with sensor fusion algorithms enhances environmental awareness and target detection by combining AI processing across multiple sensor modalities and data streams. The AI systems coordinate with navigation algorithms, communication protocols, and mission execution systems to provide comprehensive autonomous operation capabilities that exceed human operator processing capacity while maintaining human command authority over strategic and tactical decision-making.

External system integration enables AI capabilities to interface with military command systems, civilian emergency response networks, and commercial operational platforms through standardized AI interfaces and data formats. The AI architecture supports integration with cloud-based AI services for enhanced processing capability when communication connectivity permits while maintaining autonomous AI operation when external AI resources are unavailable.

According to an embodiment, sensor suite 112 of command drone 110 comprises a comprehensive, modular array of sensing modalities integrated to provide multi-spectral environmental awareness and target identification capabilities. In some embodiments, the sensor suite comprises one or more of electro-optical and infrared cameras providing high-resolution visual and thermal imaging, a LiDAR and photogrammetry system enabling three-dimensional environmental mapping and obstacle detection, radio frequency sensors configured for electronic warfare detection and communication signal analysis, thermal imaging systems optimized for night operations and heat signature identification, and chemical detection sensors capable of identifying nuclear, biological, and chemical threats. The sensor suite 112 further comprises modular payload bays with standardized interfaces enabling mission-specific sensor package integration and rapid reconfiguration for varying operational requirements.

According to an embodiment, communication system 113 of command drone 110 implements a multi-modal communication architecture providing redundant and resilient communication capabilities across multiple transmission mediums. The communication system may comprise self-pulsating laser diode arrays configured for high-bandwidth directional communication with automatic beam steering and atmospheric compensation capabilities, software-defined radio transceivers enabling flexible frequency allocation and anti-jamming protocols, and computer vision-based visual communication systems utilizing drone-mounted lighting arrays for pattern-based information transmission. All communication channels within system 113 implement AES-256 encryption protocols and support mesh networking topologies with self-healing capabilities to maintain network connectivity despite individual component failures or environmental interference.

According to an embodiment, navigation and control system 114 provides autonomous flight capabilities and precision positioning for command drone 110 and subordinate drones. In various embodiments, the system may incorporate one or more of global positioning system (GPS) and global navigation satellite system (GNSS) receivers with anti-jamming capabilities, inertial navigation systems enabling continued operation in GPS-denied environments, magnetometer and barometric altimeter systems for enhanced positioning accuracy, and autonomous flight control systems with integrated obstacle avoidance algorithms. Navigation system 114 may further comprise precision landing and takeoff capabilities enabling automated deployment and recovery operations, collaborative navigation protocols utilizing swarm positioning data, and emergency return-to-base procedures for fault conditions or mission termination scenarios.

In various embodiments, the autonomous drone swarm system incorporates a multi-layered navigation architecture that combines traditional positioning methods with novel on-board computation and collaborative positioning innovations specifically designed for the hierarchical Queen-Worker swarm architecture. While the system utilizes established positioning technologies including GPS/GNSS receivers with anti-jamming capabilities and inertial navigation systems (INS) for GPS-denied environments, the drone swarm system further implements landmark detection and deconfliction for resection, wherein each vehicle identifies natural and artificial landmarks via onboard vision/RF sensors, scores landmark observability and distinctiveness, rejects ambiguous or conflicting candidates using consensus checks across the swarm, and performs geometric resection (e.g., intersecting bearing lines and/or range-constrained rays) to compute an absolute or drift-bounded fix. In addition, time/rate bearing computation and location calculation are executed by estimating instantaneous bearing and bearing-rate ($d\theta/dt$) to tracked landmarks or beacons from successive measurement frames, fusing these with platform kinematics in an extended/unscented Kalman filter to solve for position and heading, and propagating uncertainty to enable robust dead-reckoning between absolute updates. Queen nodes coordinate landmark catalogs, deconfliction policies, and covariance-aware measurement sharing, while Worker nodes contribute local detections and bearing-rate tracks, thereby enabling precise autonomous navigation without reliance on external positioning signals.

The system implements an on-board computation and correction methodology wherein each drone, both command and subordinate platforms, is preloaded with detailed local maps of the operational area prior to mission deployment. These local maps may comprise terrain elevation data, obstacle locations, landmark positions, and geographic reference points that serve as navigation anchors for autonomous position calculation. Upon mission initiation, each drone establishes a last known reliable position using available positioning systems, then continuously updates its location through real-time telemetry data processing without dependence on external navigation signals.

The on-board computation algorithms process comprehensive telemetry data including, but not limited to, altitude measurements from barometric and radar altimetry, speed and acceleration data from inertial measurement units, bearing and heading information from magnetometer and gyroscopic systems, and environmental factors such as wind speed and direction for drift correction calculations. Advanced algorithmic processing integrates this multi-source telemetry data with preloaded map information to calculate precise positioning coordinates, enabling accurate navigation even in GPS-unavailable environments such as underground facilities, urban canyons with satellite signal blockage, or electromagnetically contested operational areas where external positioning signals are jammed or unreliable.

In various embodiments, the navigation system implements collaborative positioning enhancement enabled through the multi-modal mesh communication network described herein. Drones continuously share computed position data and real-time telemetry measurements across the encrypted mesh network, enabling distributed data fusion and correction algorithms that enhance swarm-wide positioning accuracy beyond individual drone capabilities. When individual drones encounter positioning uncertainties or conflicting navigation data, the collaborative system provides position verification and correction through comparison with neighboring drone positions and collective telemetry analysis.

The collaborative navigation algorithms may implement distributed consensus protocols that weight position data based on confidence levels, recent calibration status, and cross-validation with multiple drone positions within the swarm network. This approach enables the swarm to maintain accurate relative positioning even when absolute positioning becomes unavailable, ensuring coordinated formation flying, collision avoidance, and tactical maneuvering without external navigation support. The mesh network collaboration particularly enhances navigation reliability during extended operations in signal-denied environments by providing continuous position cross-checking and drift correction across the entire swarm.

The navigation capabilities described herein are specifically tailored to support the hierarchical Queen-Worker swarm architecture, with differentiated navigation responsibilities and capabilities optimized for command and subordinate drone roles. Queen drones can implement enhanced navigation processing capabilities including, but not limited to, master position calculations, swarm-wide navigation coordination, and integration with mission planning algorithms that optimize drone positioning for tactical and operational objectives. Queen drones can serve as navigation reference nodes for subordinate drones, providing position verification, drift correction, and navigation guidance when individual Worker drones encounter navigation difficulties.

Worker drones implement streamlined navigation processing optimized for formation flying, tactical maneuvering, and coordination with Queen drone navigation commands while maintaining autonomous navigation capabilities for individual task execution. The hierarchical navigation architecture enables efficient resource utilization by concentrating advanced navigation processing at Queen drones while maintaining distributed navigation capability throughout the swarm. Navigation task distribution protocols automatically adjust navigation responsibilities based on drone availability, with Worker drones capable of assuming enhanced navigation roles when Queen drones become unavailable, ensuring navigation continuity despite individual drone failures.

The navigation system builds upon established principles of dead reckoning navigation, including position calculation based on last known reliable position combined with subsequent movement measurements. However, the present system extends this approach significantly through integration of preloaded local maps that provide geographic reference anchors, comprehensive multi-source telemetry processing that incorporates environmental correction factors, and collaborative mesh network positioning that enables swarm-wide navigation enhancement.

The combination of on-board map integration, comprehensive telemetry processing, and collaborative swarm navigation represents a novel approach specifically designed for autonomous swarm operations that exceeds existing capabilities in GPS-denied environments. The hierarchical Queen-Worker integration provides navigation optimization and fault tolerance not present in conventional navigation systems, while the multi-modal mesh network collaboration enables distributed navigation processing that enhances accuracy and reliability beyond individual platform capabilities. These innovations collectively enable the autonomous drone swarm system to maintain precise navigation and coordination capabilities in operational environments where conventional GPS-dependent navigation systems would fail.

The on-board computation system implements several algorithmic approaches for position calculation and correction. For example, map-referenced position calculation algorithms correlate real-time sensor data with preloaded map features to provide absolute position updates when geographic landmarks can be detected through one or more of electro-optical, infrared, or LiDAR and photogrammetry sensors. Telemetry fusion algorithms process multiple data streams including, but not limited to, barometric altitude, inertial acceleration, magnetic heading, and wind vector measurements to calculate position changes with compensation for environmental factors and measurement errors.

In some embodiments, collaborative positioning algorithms implement distributed Kalman filtering across the mesh network, enabling each drone to improve its position estimates through incorporation of neighboring drone telemetry and position data. The system maintains position confidence metrics that indicate navigation accuracy and reliability, enabling automatic switching between navigation methods based on environmental conditions and available reference sources. Emergency navigation protocols provide backup positioning methods including, but not limited to, visual landmark recognition, terrain matching algorithms, and manual position input capabilities that ensure navigation continuity under extreme operational conditions.

The navigation systems integrate with other system components including the artificial intelligence mission planning algorithms that optimize drone positioning for tactical objectives, the fault-tolerant operation protocols that maintain navigation capability despite individual drone failures, and the multi-modal communication system that enables collaborative navigation data sharing. The navigation system supports all operational modes from tactical short-duration missions requiring precise formation flying to strategic long-duration operations requiring sustained navigation accuracy across large geographic areas.

Navigation data integration with sensor fusion algorithms enhances environmental awareness and target detection capabilities by providing precise platform positioning for sensor correlation and target location calculation. The navigation system can coordinate with power management protocols to optimize navigation processing based on available battery capacity, adjusting navigation update rates and algorithm complexity to balance accuracy with power consumption requirements. Integration with external system connectivity enables navigation data sharing with military command systems, civilian emergency response networks, and commercial operational centers as mission requirements dictate.

In some implementations of an embodiment, the subordinate drone(s) 120 comprises similar subsystems optimized for distributed processing and specialized mission execution while maintaining compatibility with command drone coordination protocols. In some embodiments, processing system 121 comprises a lightweight processing unit specifically optimized for edge computing applications, computer vision processors dedicated to obstacle avoidance and environmental awareness functions, audio processing capabilities enabling environmental sound analysis and acoustic threat detection, and local artificial intelligence inference capabilities supporting autonomous decision-making within the constraints of subordinate drone operational parameters. Processing system 121 can employ AI algorithms for distributed coordination with the command drone's artificial intelligence systems, enabling intelligent swarm behavior.

The autonomous drone swarm system implements a hierarchical edge computing architecture that optimizes data processing efficiency and communication bandwidth utilization through intelligent data flow management between Worker drones, Queen drones, and field servers. Data streams flow directly from subordinate Worker drones to the command Queen drone, which employs advanced edge computing capabilities to analyze incoming data in real time and selectively transmit only operationally relevant information back to the field server and broader command networks.

This edge computing approach provides significant operational advantages by performing computationally intensive data analysis at the Queen drone level rather than transmitting raw data streams to remote processing systems. The Queen drone's edge computing capabilities enable immediate local processing of sensor data, video feeds, and intelligence information, reducing communication bandwidth requirements while providing faster response times for time-critical operational decisions. The system maintains the capability to transmit full raw data when specifically requested or when operational priorities dictate comprehensive data preservation.

Worker drones establish direct, high-bandwidth data connections to their coordinating Queen drone, streaming comprehensive sensor data including full motion video (FMV), electro-optical imagery, infrared thermal data, LiDAR and photogrammetry three-dimensional mapping information, audio recordings, chemical detection readings, and other multi-modal sensor outputs. This direct data streaming architecture enables the Queen drone to maintain complete situational awareness of Worker drone sensor collection while providing the computational resources necessary for real-time data analysis and intelligence extraction.

The direct streaming protocol implements prioritized data transmission algorithms that automatically adjust data stream quality, compression levels, and transmission frequency based on available communication bandwidth, operational priorities, and Queen drone processing capacity. Worker drones can dynamically modify their data streaming parameters based on Queen drone feedback and mission requirements, ensuring optimal balance between data completeness and communication efficiency throughout mission execution.

Worker drone data streams may comprise metadata and contextual information including precise geolocation data, timestamp information, sensor configuration parameters, and environmental conditions that enable the Queen drone's edge computing systems to correlate and analyze data across multiple Worker platforms simultaneously. This comprehensive data streaming approach enables multi-source intelligence fusion and collaborative analysis that exceeds the capabilities of individual drone platforms operating independently.

The Queen drone implements edge computing capabilities specifically optimized for real-time analysis of incoming Worker drone data streams, employing advanced artificial intelligence algorithms, multi-modal sensor fusion techniques, and intelligent data prioritization systems. Edge computing processing at the Queen drone level enables immediate analysis of full motion video feeds, automated target detection and tracking, pattern recognition across multiple sensor modalities, and real-time threat assessment without dependence on external computing resources or communication connectivity.

Real-time analysis capabilities include automated object detection and classification across video feeds from multiple Worker drones, enabling the Queen drone to identify and track targets of interest, potential threats, and mission-relevant objects across the entire swarm's sensor coverage area. Multi-source data correlation algorithms can combine sensor inputs from multiple Worker drones to provide enhanced target identification accuracy, environmental assessment capabilities, and situational awareness that exceeds individual platform limitations.

The Queen drone's edge computing systems may implement intelligent data filtering and relevance assessment algorithms that automatically identify operationally significant information within incoming data streams, including, but not limited to, threat detections, target identifications, environmental changes, and mission-critical observations. This automated relevance assessment enables the Queen drone to prioritize data transmission to field servers based on operational significance, time sensitivity, and mission objectives while maintaining local storage of comprehensive data for detailed analysis when communication bandwidth permits.

Following real-time edge computing analysis, the Queen drone selectively transmits operationally relevant information to field servers and/or command networks, significantly reducing communication bandwidth requirements while ensuring that mission-critical intelligence reaches decision-makers immediately. The selective transmission protocol can be configured to prioritize high-value intelligence including target coordinates, threat assessments, mission status updates, and time-sensitive operational information while maintaining the option to transmit full raw data streams when specifically requested or when operational conditions permit.

In some aspects, intelligent bandwidth optimization algorithms automatically adjust transmission parameters based on available communication capacity, operational priorities, and field server processing requirements. The Queen drone maintains awareness of field server capabilities and communication network status, enabling dynamic adjustment of data transmission formats, compression levels, and update frequencies to optimize information delivery without overwhelming communication systems or processing capabilities.

The selective transmission system may implement configurable priority matrices that enable operators to specify data types, intelligence categories, and information priorities that should receive preferential transmission treatment. Configurable emergency protocols ensure that critical threat information, immediate tactical intelligence, and safety-related alerts receive highest priority transmission regardless of communication limitations or bandwidth constraints.

The system provides operator control over data prioritization, enabling mission commanders to specify information types, data streams, and intelligence categories (among other possible parameters) that should receive preferential processing and transmission treatment based on current mission objectives and operational requirements. Operators can dynamically adjust prioritization parameters throughout mission execution, ensuring that data processing and transmission adapt to changing tactical conditions and evolving intelligence requirements.

In some implementations, raw full motion video (FMV) transmission capabilities enable operators to request complete, unprocessed video feeds from specific Worker drones or geographic areas when detailed analysis or real-time monitoring requires full-resolution imagery. The system maintains the flexibility to transmit raw FMV streams while continuing edge computing analysis and selective information transmission, ensuring that operators receive both immediate intelligence products and comprehensive raw data when mission requirements dictate.

Operator prioritization controls extend to all sensor data types including electro-optical imagery, infrared thermal feeds, LiDAR and photogrammetry mapping data, audio recordings, chemical detection readings, and environmental monitoring information. Priority settings can be configured based on, for example, geographic areas, time windows, threat conditions, or specific mission phases, enabling dynamic adaptation of data processing and transmission to match operational tempo and intelligence requirements.

The prioritization system implements user-friendly interfaces that enable operators to modify data priorities using natural language commands, graphical interfaces, or pre-configured priority profiles that match common operational scenarios. Real-time feedback provides operators with immediate awareness of data processing status, transmission queue management, and communication bandwidth utilization, enabling informed decisions about data prioritization and resource allocation.

One or more adaptive compression algorithms automatically optimize data transmission based on content type, operational priorities, and available bandwidth, ensuring maximum information density within communication constraints. The system may implement intelligent caching and buffering capabilities that enable continued operation during communication disruptions while automatically synchronizing with field servers when connectivity is restored.

Communication redundancy protocols ensure that critical information reaches field servers through multiple transmission pathways, including direct Queen-to-server communications, relay through other Queen drones, and emergency communication protocols that guarantee delivery of mission-critical intelligence even during communication system degradation.

Integration with artificial intelligence systems enables agentic analysis and decision-making at the edge computing level, supporting autonomous mission adaptation and tactical response without requiring external authorization or processing delays. The edge computing architecture supports all operational modes from tactical short-duration missions requiring immediate intelligence delivery to strategic long-duration operations requiring sustained autonomous analysis and selective information transmission.

Sensor suite 122 of subordinate drone 120 may comprise a plurality of sensing modalities and sensor hardware. In a preferred embodiment, sensor suite 122 comprises compact electro-optical camera systems providing visual surveillance and target identification capabilities, lightweight chemical detection sensors enabling distributed threat detection across the swarm, audio sensors configured for environmental monitoring and acoustic signature analysis, and mission-specific payload sensors that can be configured based on operational requirements. Sensor suite 122 is designed with reduced size, weight, and power consumption compared to command drone sensor suite 112, while maintaining essential sensing capabilities necessary for subordinate drone mission execution and coordination with the broader swarm.

According to an embodiment, a communication system 123 of subordinate drone 120 implements communication protocols and hardware compatible with command drone communication system 113, enabling seamless integration within the mesh network topology. The system may comprise scaled versions of the multi-modal communication capabilities, supporting laser, radio frequency, and visual communication channels with appropriate encryption and networking protocols. In some aspects, communication system 123 further includes data relay capabilities enabling subordinate drones to serve as communication nodes for extended range operations and mesh network redundancy.

In various embodiments, the autonomous drone swarm system incorporates a multi-layered navigation architecture that combines traditional positioning methods with novel on-board computation and collaborative positioning innovations specifically designed for the hierarchical Queen-Worker swarm architecture. While the system utilizes established positioning technologies including GPS/GNSS receivers with anti-jamming capabilities and inertial navigation systems (INS) for GPS-denied environments, the system utilizes an integrated on-board computation and correction system that enables precise autonomous navigation without reliance on external positioning signals.

The system implements an on-board computation and correction methodology wherein each drone, both command and subordinate platforms, is preloaded with detailed local maps of the operational area prior to mission deployment. These local maps may comprise terrain elevation data, obstacle locations, landmark positions, and geographic reference points that serve as navigation anchors for autonomous position calculation. Upon mission initiation, each drone establishes a last known reliable position using available positioning systems, then continuously updates its location through real-time telemetry data processing without dependence on external navigation signals.

The on-board computation algorithms process telemetry data including, but not limited to, altitude measurements from barometric and radar altimetry, speed and acceleration data from inertial measurement units, bearing and heading information from magnetometer and gyroscopic systems, and environmental factors such as wind speed and direction for drift correction calculations. Advanced algorithmic processing integrates this multi-source telemetry data with preloaded map information to calculate precise positioning coordinates, enabling accurate navigation even in GPS-unavailable environments such as underground facilities, urban canyons with satellite signal blockage, or electromagnetically contested operational areas where external positioning signals are jammed or unreliable.

In various embodiments, the navigation system implements collaborative positioning enhancement enabled through the multi-modal mesh communication network described herein. Drones continuously share computed position data and real-time telemetry measurements across the encrypted mesh network, enabling distributed data fusion and correction algorithms that enhance swarm-wide positioning accuracy beyond individual drone capabilities. When individual drones encounter positioning uncertainties or conflicting navigation data, the collaborative system provides position verification and correction through comparison with neighboring drone positions and collective telemetry analysis.

The collaborative navigation algorithms may implement distributed consensus protocols that weight position data based on confidence levels, recent calibration status, and cross-validation with multiple drone positions within the swarm network. This approach enables the swarm to maintain accurate relative positioning even when absolute positioning becomes unavailable, ensuring coordinated formation flying, collision avoidance, and tactical maneuvering without external navigation support. The mesh network collaboration particularly enhances navigation reliability during extended operations in signal-denied environments by providing continuous position cross-checking and drift correction across the entire swarm.

The navigation capabilities described herein are specifically tailored to support the hierarchical Queen-Worker swarm architecture, with differentiated navigation responsibilities and capabilities optimized for command and subordinate drone roles. Queen drones can implement enhanced navigation processing capabilities including, but not limited to, master position calculations, swarm-wide navigation coordination, and integration with mission planning algorithms that optimize drone positioning for tactical and operational objectives. Queen drones can serve as navigation reference nodes for subordinate drones, providing position verification, drift correction, and navigation guidance when individual Worker drones encounter navigation difficulties.

Worker drones implement streamlined navigation processing optimized for formation flying, tactical maneuvering, and coordination with Queen drone navigation commands while maintaining autonomous navigation capabilities for individual task execution. The hierarchical navigation architecture enables efficient resource utilization by concentrating advanced navigation processing at Queen drones while maintaining distributed navigation capability throughout the swarm. Navigation task distribution protocols automatically adjust navigation responsibilities based on drone availability, with Worker drones capable of assuming enhanced navigation roles when Queen drones become unavailable, ensuring navigation continuity despite individual drone failures.

The navigation system builds upon established principles of dead reckoning navigation, including position calculation based on last known reliable position combined with subsequent movement measurements. However, the present system extends this approach significantly through integration of preloaded local maps that provide geographic reference anchors, comprehensive multi-source telemetry processing that incorporates environmental correction factors, and collaborative mesh network positioning that enables swarm-wide navigation enhancement.

The combination of on-board map integration, comprehensive telemetry processing, and collaborative swarm navigation represents a novel approach specifically designed for autonomous swarm operations that exceeds existing capabilities in GPS-denied environments. The hierarchical Queen-Worker integration provides navigation optimization and fault tolerance not present in conventional navigation systems, while the multi-modal mesh network collaboration enables distributed navigation processing that enhances accuracy and reliability beyond individual platform capabilities. These innovations collectively enable the autonomous drone swarm system to maintain precise navigation and coordination capabilities in operational environments where conventional GPS-dependent navigation systems would fail.

The on-board computation system implements several algorithmic approaches for position calculation and correction. Map-referenced position calculation algorithms correlate real-time sensor data with preloaded map features to provide absolute position updates when geographic landmarks can be detected through one or more of electro-optical, infrared, or LiDAR and photogrammetry sensors. Telemetry fusion algorithms process multiple data streams including, but not limited to, barometric altitude, inertial acceleration, magnetic heading, and wind vector measurements to calculate position changes with compensation for environmental factors and measurement errors.

In some embodiments, collaborative positioning algorithms implement distributed Kalman filtering across the mesh network, enabling each drone to improve its position estimates through incorporation of neighboring drone telemetry and position data. The system maintains position confidence metrics that indicate navigation accuracy and reliability, enabling automatic switching between navigation methods based on environmental conditions and available reference sources. Emergency navigation protocols provide backup positioning methods including, but not limited to, visual landmark recognition, terrain matching algorithms, and manual position input capabilities that ensure navigation continuity under extreme operational conditions.

The navigation systems integrate seamlessly with other system components including the artificial intelligence mission planning algorithms that optimize drone positioning for tactical objectives, the fault-tolerant operation protocols that maintain navigation capability despite individual drone failures, and the multi-modal communication system that enables collaborative navigation data sharing. The navigation system supports all operational modes from tactical short-duration missions requiring precise formation flying to strategic long-duration operations requiring sustained navigation accuracy across large geographic areas.

Navigation data integration with sensor fusion algorithms enhances environmental awareness and target detection capabilities by providing precise platform positioning for sensor correlation and target location calculation. The navigation system coordinates with power management protocols to optimize navigation processing based on available battery capacity, adjusting navigation update rates and algorithm complexity to balance accuracy with power consumption requirements. Integration with external system connectivity enables navigation data sharing with military command systems, civilian emergency response networks, and commercial operational centers as mission requirements dictate.

The detailed component architecture illustrated in FIG. 2 demonstrates the modular integration approach utilized throughout the autonomous drone swarm system, wherein standardized interfaces between subsystems enable flexible configuration, simplified maintenance, and scalable manufacturing. The ruggedized airframe construction provides environmental protection rated to IP66 standards, shock and vibration resistance, and temperature operation ranges suitable for diverse operational environments. The modular payload bay design enables rapid reconfiguration of both command and subordinate drones for mission-specific requirements while maintaining the core autonomous coordination and communication capabilities essential to swarm operations.

FIG. 3 is a block diagram illustrating an artificial intelligence integration architecture, according to an embodiment. As shown, the AI framework comprises three interconnected subsystems (but may comprise more or less depending upon the mission parameters and use case) that collectively enable autonomous swarm coordination, natural language command processing, and intelligent environmental analysis. The drone AI integration processing system 300 implements various software and algorithmic systems that can operate within the processing systems 111 and 121, providing intelligent decision-making capabilities.

According to an embodiment, large language model processing 330 may be configured as the primary artificial intelligence component of command drone 110, implementing advanced natural language understanding and mission planning capabilities. LLM processing subsystem 330 incorporates a fine-tuned large language model (e.g., based on the LLaMA-13B architecture or equivalent neural network implementation) configured to interpret diverse forms of human operator input including, but not limited to, voice commands, text instructions, and gesture recognition signals. The natural language processing component converts high-level operator directives into structured mission parameters and specific task assignments suitable for autonomous execution by the drone swarm. LLM processing 330 may further comprise contextual awareness algorithms that analyze current environmental conditions, available swarm resources, and ongoing mission status to generate contextually appropriate mission plans and tactical adaptations.

According to an embodiment, LLM processing 330 implements a hybrid retrieval-augmented generation (RAG) and cache-augmented generation (CAG) architecture that enables both real-time processing in connected environments and offline functionality in contested or signal-denied operational areas. The RAG pipeline retrieves real-time intelligence data, mission updates, and environmental information from external sources and incorporates this dynamic information into mission planning and decision-making processes. The CAG pipeline maintains cached doctrinal knowledge, standard operating procedures, and mission templates stored locally on the drone platforms, enabling continued intelligent operation even when communication with external command systems is unavailable.

According to an aspect, LLM processing system 330 further includes contextual awareness algorithms that analyze current environmental conditions, available swarm resources, and ongoing mission status to generate contextually appropriate mission plans and tactical adaptations. Decision support algorithms within LLM processing 330 provide real-time analysis and recommendations for mission commanders, including, but not limited to, automated assessment of unit readiness, resource allocation optimization, and tactical positioning recommendations. For example, the system can generate insights such as "Third Platoon optimal for overwatch position at grid 36T FJ 1234 5678 based on current ammunition levels and terrain analysis" or "Recommend repositioning Second Squad to flanking position due to detected enemy movement pattern.

According to an implementation of an embodiment, the mission planning algorithms within LLM processing 330 employ hierarchical task decomposition methodologies to convert abstract mission objectives into specific, executable tasks suitable for delegation to subordinate drones 120. The system maintains dynamic mission models that can be updated in real-time based on changing environmental conditions, operator input modifications, or unexpected operational challenges. Integration with the container orchestration system (e.g., Kubernetes or similar) enables modular deployment and scaling of AI processing workloads across available computational resources within the swarm, optimizing processing efficiency while maintaining responsiveness to time-critical mission requirements.

In some embodiments, LLM processing 330 incorporates specialized fine-tuning on military doctrinal texts including Army Doctrine Publication (ADP) 7-0 for training operations and Field Manual (FM) 3-0 for operational guidance, ensuring that generated recommendations and mission plans align with established military doctrine and best practices. This doctrinal grounding enables the system to provide tactically sound recommendations that support commander decision-making while maintaining consistency with military training and operational standards.

According to an embodiment, multi-agent coordination subsystem 331 designed as a flexible, pluggable platform capable of integrating a comprehensive range of advanced swarm coordination algorithms based on mission requirements, operational environments, and performance optimization needs. Rather than relying on a single coordination methodology, subsystem 331 provides a modular algorithmic framework that enables dynamic selection and integration of multiple coordination approaches including, but not limited to, graph-based consensus methods, cross-entropy optimization techniques, centroid-based dynamic partitioning algorithms, federated learning coordination models, and reinforcement learning frameworks. In This pluggable integration architecture enables coordination subsystem 331 to adapt its algorithmic approach based on specific operational parameters including swarm size, mission complexity, environmental constraints, communication limitations, and performance requirements. The flexible platform supports integration of emerging coordination algorithms as they become available, ensuring that the system remains at the forefront of swarm coordination technology while maintaining backward compatibility with existing algorithmic implementations.

The modular coordination framework implements standardized interfaces and application programming interfaces that enable rapid integration of new coordination algorithms without requiring fundamental system redesign or hardware modification. Algorithm selection and switching can occur dynamically during mission execution based on real-time performance assessment, environmental changes, or operational requirements, providing unprecedented adaptability in autonomous swarm coordination capabilities.

According to an embodiment, the system is configured to support multi-agent deep deterministic policy gradient (MADDPG) integration. The MADDPG implementation within the pluggable framework enables each drone to make autonomous tactical decisions based on local observations and learned coordination policies while maintaining coordination with overall swarm objectives and mission parameters. The framework supports dynamic task redistribution, adaptive formation control, and collaborative decision-making that optimizes individual drone capabilities within collective mission requirements.

Integration of MADDPG within the pluggable coordination architecture enables seamless switching to alternative algorithms when operational conditions favor different coordination approaches, such as graph-based methods for communication-constrained environments or cross-entropy optimization for complex task assignment scenarios. The modular implementation ensures that MADDPG capabilities remain available while enabling exploration of enhanced coordination methods as mission requirements evolve.

According to an embodiment, the coordination subsystem integrates graph-based consensus algorithms that provide robust communication and coordination capabilities particularly suited for communication-constrained environments and large-scale swarm operations. Multi-layer graph-based consensus control algorithms enable scalable coordination across extensive drone networks by implementing hierarchical coordination structures that maintain efficiency and responsiveness despite increasing swarm complexity.

Connectivity-maintenance algorithms within the graph-based framework ensure robust communication pathways throughout the swarm network, automatically adapting network topology and communication protocols to maintain coordination effectiveness despite individual drone failures, communication disruptions, or environmental interference. The graph-based approach provides mathematical guarantees for consensus achievement and coordination stability that are particularly valuable for mission-critical operations requiring high reliability and predictable coordination behavior.

Graph-based consensus methods excel in scenarios requiring distributed decision-making across large drone formations, coordinated area coverage with minimal overlap, and formation control that must adapt to changing environmental constraints while maintaining specific geometric relationships. The integration enables automatic selection of graph-based coordination when mission parameters favor distributed consensus approaches over centralized coordination methods.

According to an embodiment, the pluggable coordination framework incorporates adaptive cross-entropy optimization methods specifically designed for complex task assignment and resource allocation scenarios where traditional optimization approaches may struggle with computational complexity or dynamic environmental conditions. Cross-entropy methods provide robust optimization capabilities for multi-objective task assignment problems that consider drone capabilities, mission priorities, environmental constraints, and resource limitations simultaneously.

Adaptive cross-entropy algorithms enable dynamic task reassignment based on changing mission conditions, drone availability, and performance feedback, ensuring optimal resource utilization throughout mission execution. The cross-entropy approach excels in scenarios involving complex mission planning with multiple competing objectives, resource-constrained operations requiring optimal allocation decisions, and dynamic environments where task priorities may change based on emerging threats or opportunities.

Integration of cross-entropy optimization within the coordination subsystem enables automatic algorithm selection when mission parameters involve complex optimization problems that benefit from probabilistic optimization approaches rather than deterministic coordination methods. The adaptive nature of cross-entropy methods provides robust performance across diverse operational scenarios while maintaining computational efficiency suitable for real-time coordination requirements.

According to an embodiment, the coordination subsystem integrates centroid-based area partitioning algorithms that provide spatial coordination capabilities for exploration missions, area coverage operations, and surveillance tasks requiring optimal geographic distribution of drone resources. Centroid-based dynamic partitioning enables automatic division of operational areas among available drones while maintaining optimal coverage patterns and minimizing coordination overhead.

Dynamic partitioning algorithms automatically adapt area assignments based on drone performance, environmental conditions, mission priority changes, and resource availability, ensuring optimal spatial coverage throughout mission execution. The centroid-based approach provides mathematical optimization of coverage efficiency while maintaining coordination simplicity that reduces communication requirements and computational overhead compared to more complex spatial coordination methods.

Centroid-based algorithms excel in scenarios requiring systematic area exploration, persistent surveillance with optimal coverage patterns, search and rescue operations across large geographic areas, and environmental monitoring requiring comprehensive spatial sampling. The integration enables automatic selection of centroid-based coordination when mission parameters favor spatial optimization over temporal coordination priorities.

According to an embodiment, the pluggable coordination framework incorporates advanced federated learning coordination models that enable distributed machine learning and coordination improvement across the drone swarm without requiring centralized training data or processing resources. Federated learning coordination enables each drone to contribute to collective intelligence improvement while maintaining data privacy and reducing communication bandwidth requirements for coordination enhancement.

Federated learning models enable continuous improvement of coordination algorithms based on operational experience, environmental adaptation, and mission outcome analysis, ensuring that coordination effectiveness improves over time through collective learning experiences. The distributed learning approach enables coordination algorithm optimization based on real-world operational data while maintaining individual drone autonomy and reducing dependence on external training resources.

Integration of federated learning within the coordination subsystem enables automatic coordination algorithm improvement through operational experience, adaptive coordination strategies that evolve based on environmental conditions and mission success metrics, and distributed intelligence development that enhances swarm coordination capabilities without compromising operational security or requiring external connectivity.

According to an embodiment, the coordination subsystem integrates reinforcement learning frameworks that enable joint optimization of communication protocols and coordination actions, providing enhanced coordination effectiveness through learned communication strategies and adaptive action selection. Reinforcement learning approaches enable the swarm to develop optimal communication patterns and coordination behaviors based on mission outcomes and environmental feedback.

Joint communication and action learning algorithms enable automatic optimization of communication protocols based on environmental conditions, mission requirements, and coordination effectiveness, ensuring that communication resources are utilized optimally while maintaining coordination performance. The reinforcement learning approach enables development of specialized coordination behaviors adapted to specific operational environments, mission types, and performance requirements.

Reinforcement learning integration provides capabilities for adaptive coordination strategy development based on mission success metrics, environmental adaptation through learned behaviors that optimize coordination effectiveness in specific operational conditions, and communication protocol optimization that balances coordination requirements with bandwidth limitations and security considerations.

The pluggable coordination architecture may implement algorithm selection and dynamic switching capabilities that enable automatic optimization of coordination approaches based on real-time operational conditions, mission requirements, and performance feedback. Algorithm selection algorithms automatically evaluate current operational parameters against coordination algorithm capabilities to select optimal coordination methods for specific operational scenarios.

Dynamic switching protocols enable transition between coordination algorithms during mission execution when operational conditions change, mission requirements evolve, or performance optimization opportunities arise. The switching protocols maintain coordination continuity and mission effectiveness throughout algorithmic transitions while enabling optimization of coordination approaches based on emerging operational requirements.

Performance monitoring and assessment algorithms continuously evaluate coordination effectiveness across available algorithmic options, enabling automatic algorithm selection based on empirical performance data rather than theoretical optimization criteria. This approach ensures that coordination algorithm selection adapts to real-world operational conditions and mission-specific requirements rather than relying solely on predetermined algorithmic preferences.

The pluggable coordination algorithm architecture integrates seamlessly with the hierarchical Queen-Worker coordination structure, multi-modal communication systems, and fault-tolerant operation protocols while providing enhanced flexibility and adaptability across diverse operational scenarios. The modular approach enables coordination algorithm optimization without compromising core system capabilities or requiring fundamental architectural modifications.

Integration with artificial intelligence systems enables coordination algorithm selection based on mission analysis, environmental assessment, and performance prediction, ensuring optimal coordination approaches for specific operational requirements. The pluggable framework supports coordination across all operational modes from tactical short-duration missions requiring rapid coordination response to strategic long-duration operations requiring sustained coordination efficiency and adaptability.

The flexible coordination architecture provides significant advantages for diverse mission profiles, varying operational environments, and evolving coordination requirements while maintaining the autonomous coordination and fault-tolerant operation capabilities that characterize the overall system design. This versatility ensures that the drone swarm system remains effective across the full spectrum of operational scenarios while providing a foundation for integration of future coordination algorithm developments.

In some embodiments, multi-agent coordination 331 includes dynamic task redistribution algorithms that continuously monitor individual drone performance, capability status, and environmental conditions to optimize task assignments across the swarm. When individual drones become unavailable due to equipment failure, communication loss, or other operational constraints, coordination system 331 automatically redistributes assigned tasks to available drones while maintaining mission continuity and effectiveness. The coordination algorithms can implement swarm behavior optimization protocols that balance individual drone capabilities with collective mission requirements, ensuring optimal sensor coverage, communication relay efficiency, and overall mission success probability.

Federated learning protocols within multi-agent coordination 331 enable distributed AI model training and coordination across the swarm network, allowing individual drones to contribute to collective intelligence while maintaining operational security and minimizing communication bandwidth requirements. For example, when multiple subordinate drones 120 encounter similar terrain features or target types during a mission, each drone's local AI inference system processes the encountered data and generates model weight updates based on its individual observations. Rather than transmitting raw sensor data or imagery, each drone transmits only the compressed model parameter updates to command drone 110, which aggregates these updates to improve the overall swarm's target recognition accuracy and environmental awareness capabilities. This federated approach enables the entire swarm to benefit from localized learning experiences while preserving bandwidth and maintaining operational security, as raw intelligence data never leaves individual drones. The federated learning implementation enables continued coordination and performance improvement even in communication-constrained or contested environments where traditional centralized coordination approaches would fail.

Sensor fusion and environmental analysis subsystem 332 integrates data streams from the comprehensive sensor suites 112 and 122, employing advanced AI algorithms to create comprehensive environmental awareness and actionable intelligence. The sensor fusion subsystem 332 implements multi-modal data integration algorithms that combine electro-optical imagery, infrared thermal data, LiDAR and photogrammetry three-dimensional mapping, radio frequency signal analysis, and chemical detection information into unified environmental models supporting tactical decision-making and mission execution.

According to an aspect, sensor fusion components 332 incorporates intelligent data prioritization algorithms that automatically identify and highlight critical information for relay to command centers and field operators/fog servers. The system processes multiple data streams simultaneously and determines information priority based on tactical significance, time sensitivity, and mission objectives. For example, the system automatically prioritizes detection of enemy vehicle movements over routine environmental monitoring data, ensuring that mission-critical intelligence receives immediate attention and transmission priority.

According to an embodiment, an environmental analysis component of subsystem 332 employs real-time three-dimensional environmental mapping algorithms utilizing one or more of LiDAR and photogrammetry point cloud data, photogrammetry mesh generation, and digital elevation model (DEM) processing to create detailed terrain models supporting navigation, positioning, and tactical analysis. Terrain analysis algorithms implement one or more terrain detection methodologies identifying optimal vantage points, overwatch positions, and tactical positioning opportunities based on elevation, line-of-sight characteristics, cover availability, and communication signal propagation properties. For example, a particular terrain analysis algorithm that can be implemented in some embodiments of subsystem 332 comprises a multi-candidate viewpoint filtering algorithm for terrain viewshed selection. The multi-candidate viewpoint filtering algorithm may comprise the steps of: using the Empty Circles based K-means algorithm to determine initial centers for candidate viewpoint clustering; using a viewpoint evaluation metric (e.g., Weighted Coverage Overlap Metric) to divide the viewshed of candidate points into coverage contribution points and overlap contribution points, computes WCOM based on this division, and stores the values in a min-heap; and adding and deleting the viewpoints from clusters by adjusting the sets of coverage contribution points and overlap contribution points.

According to an embodiment, target recognition and classification algorithms within sensor fusion 332 employ computer vision neural networks trained for identifying and classifying objects, personnel, vehicles, and potential threats within the operational environment. The target recognition system supports automated threat assessment protocols and provides real-time intelligence updates to mission commanders and integrated command and control systems. In some implementations, performance metrics for the target recognition algorithms target ROUGE-2 scores of 0.40 or higher for summary generation accuracy, ensuring reliable capture and communication of key mission elements and tactical intelligence. Nuclear, biological, and chemical (NBC) threat detection algorithms may be deployed on the drone platforms to analyze sensor data from specialized detection systems to identify and classify potential NBC threats, providing early warning capabilities and supporting force protection requirements. In some embodiments, the system maintains comprehensive threat libraries and can automatically correlate detected signatures with known threat patterns, providing rapid threat identification and recommended response procedures. Integration with mobile interfaces (e.g., tablets, mobile devices, computing systems, etc.) ensures that threat information and tactical intelligence can be accessed and utilized by field commanders through familiar and reliable interface systems. Computer vision supports not only obstacle avoidance and light-based communication, but also high-confidence target recognition, threat prioritization, and dynamic mission re-tasking based on real-time scene interpretation.

AI integration system 300 enables the distributed processing approach utilized throughout the autonomous drones swarm system, wherein AI processing workloads are distributed across available computational resources within the swarm based on current processing demands, communication connectivity, and individual drone capabilities. Edge computing capabilities enable critical AI functions to continue operating despite communication disruptions or network segmentation, ensuring continued autonomous operation and mission effectiveness. The modular AI architecture supports dynamic reconfiguration and scaling based on mission requirements, available resources, and operational constraints, providing flexibility and adaptability essential for diverse operational scenarios and evolving tactical requirements.

FIG. 4 is a block diagram illustrating an exemplary communication architecture for the multi-modal communication systems, encryption protocols, and mesh network topology that enable resilient coordination and data transmission throughout the autonomous drone swarm system, according to an embodiment. The communication architecture 400 provides redundant communication pathways utilizing multiple transmission modalities to ensure continued operation in contested, signal-denied, or environmentally challenging operational environments where conventional single-mode communication systems would fail.

The multi-modal communication framework comprises three distinct but integrated communication channels that collectively provide comprehensive connectivity across the drone swarm network. According to an aspect, a laser communication system 441 is present and configured to implement high-bandwidth directional communication utilizing self-pulsating laser diode arrays mounted on each drone platform. In some embodiments, laser communication system 441 may be implemented as a light fidelity (Li-Fi) wireless communication system that transmits data using the visible light spectrum. Laser communication system 441 may comprise automatic beam steering mechanisms that enable dynamic targeting and acquisition of communication partners based on relative positioning and communication requirements. Atmospheric compensation algorithms within laser communication system 441 adjust transmission parameters to account for varying weather conditions, atmospheric density variations, and environmental interference factors that could degrade optical communication performance. Laser communication system 441 provides the highest bandwidth communication channel within the multi-modal framework, enabling high-resolution imagery transmission, detailed mission data sharing, and real-time coordination information exchange between drones within line-of-sight ranges.

According to an embodiment, a radio frequency (RF) communication system 442 is present and configured as a multi-modal radio frequency communication architecture that integrates diverse communication technologies to provide comprehensive connectivity across varying mission requirements, operational environments, and spectrum conditions. The modular RF communication system 442 incorporates software-defined radio (SDR) capabilities, Low Power Wide Area Network (LPWAN) protocols, Long Range Wide Area Network (LoRaWAN) for extended telemetry, WiFi and Bluetooth for local high-throughput networking, and LaserFi/LiFi optical communication for secure line-of-sight operations in electromagnetically sensitive environments. Communication system 400 may connect to and facilitate communications via a plurality of mobile and/or cellular communication networks including, but not limited to, 4G LTE, 5G, global system for mobile communications (GSM), code division multiple access (CDMA), and mobile ad hoc networks (MANET).

The integrated multi-modal approach ensures communication redundancy and resilience that exceeds single-mode communication systems, providing multiple independent communication pathways that maintain coordination effectiveness despite individual communication channel failures, jamming attempts, or environmental interference. Each communication modality contributes specific operational advantages while integrating seamlessly within the overall mesh network topology and fault-tolerant communication architecture.

A software-defined radio (SDR) implementation provides the foundation for adaptive communication capabilities, enabling flexible frequency allocation, dynamic protocol switching, and sophisticated anti-jamming measures across multiple frequency bands and communication standards. SDR capabilities include frequency-hopping spread spectrum protocols that provide resistance to jamming and interception attempts while maintaining reliable communication across extended ranges and challenging environmental conditions.

Dynamic protocol adaptation algorithms automatically select optimal communication protocols based on current spectrum conditions, interference levels, and mission security requirements, ensuring optimal communication performance despite changing operational environments. The SDR framework supports multiple simultaneous communication protocols, enabling the swarm to maintain connectivity across diverse frequency bands and communication standards while adapting to emerging threats and operational requirements.

Anti-jamming capabilities within the SDR implementation include adaptive frequency selection that automatically avoids contested or jammed frequency bands, power management protocols that optimize transmission power based on communication requirements and signature management needs, and protocol switching that transitions between communication methods when primary channels become unavailable or compromised.

LPWAN protocols provide extended range communication capabilities optimized for power-efficient operation during sustained missions where battery conservation is critical for operational endurance. The LPWAN implementation enables communication across distances exceeding conventional radio frequency ranges while maintaining minimal power consumption that supports extended operational periods without compromising communication effectiveness.

LPWAN integration supports low-data-rate telemetry and coordination messaging that maintains essential coordination capabilities during power-constrained operations, emergency communication protocols that provide backup connectivity when primary communication systems become unavailable, and long-range relay capabilities that enable communication beyond line-of-sight limitations through multi-hop networking protocols.

The LPWAN framework integrates seamlessly with power management systems to optimize communication scheduling based on available battery capacity, mission duration requirements, and communication priority levels, ensuring that essential coordination capabilities are maintained throughout extended operations while preserving power resources for mission-critical activities.

Long range wide area network capabilities provide specialized low-power, long-range telemetry communication that excels in scenarios requiring persistent status monitoring, environmental data collection, and coordination messaging across extensive geographic areas with minimal power consumption. LoRaWAN integration enables the drone swarm to maintain telemetry connectivity across ranges up to several kilometers while operating on minimal power budgets that support sustained surveillance and monitoring operations.

LoRaWAN protocols support adaptive data rate optimization that automatically adjusts transmission parameters based on signal quality, distance requirements, and power availability, ensuring optimal balance between communication range, data throughput, and battery conservation. The LoRaWAN implementation provides robust communication in challenging RF environments through spread spectrum techniques and error correction protocols that maintain connectivity despite interference and signal degradation.

Integration with mission planning algorithms enables automatic LoRaWAN activation for extended-duration operations requiring persistent telemetry, environmental monitoring missions where continuous data collection is essential, and strategic operations where long-range coordination must be maintained with minimal electromagnetic signature. LoRaWAN capabilities provide critical backup communication for scenarios where primary communication systems may be compromised or unavailable.

The communication architecture integrates WiFi and Bluetooth capabilities that provide high-throughput, short-range networking for scenarios requiring rapid data exchange, local coordination, and integration with external systems. WiFi implementation supports high-bandwidth data transmission for applications including real-time video streaming, comprehensive sensor data sharing, and rapid mission data upload during maintenance and operational transition periods.

Bluetooth integration provides secure, low-power local networking that enables device pairing for maintenance operations, sensor calibration procedures, and integration with operator control devices including tablets, smartphones, and specialized command interfaces. The Bluetooth implementation supports mesh networking protocols that enable multi-drone local coordination and data sharing within confined operational areas.

WiFi and Bluetooth capabilities enable rapid integration with existing network infrastructure during operations near friendly facilities, emergency communication with civilian networks during disaster response operations, and high-speed data transfer for mission briefing, sensor calibration, and operational coordination when high-bandwidth local connectivity is available.

Dynamic network selection algorithms automatically identify and connect to appropriate WiFi networks based on security protocols, operational authorization, and mission requirements, while Bluetooth discovery and pairing protocols enable automatic device recognition and secure connection establishment for authorized devices and systems.

In some embodiments, the communication system integrates advanced Laser Fidelity (LaserFi) and Light Fidelity (LiFi) optical communication technologies that provide secure, high-bandwidth communication capabilities specifically designed for electromagnetically sensitive environments where traditional RF communication may be restricted, detected, or compromised. LaserFi implementation utilizes modulated laser communication that provides extremely high bandwidth data transmission across line-of-sight distances while maintaining minimal electromagnetic signature.

LiFi capabilities employ visible and near-infrared light modulation for secure communication that is virtually undetectable to conventional electronic surveillance systems while providing substantial data transmission capabilities for coordination, sensor data sharing, and tactical communication requirements. The optical communication systems include atmospheric compensation algorithms that maintain communication effectiveness despite environmental factors including atmospheric turbulence, weather conditions, and visibility limitations.

Optical communication excels in scenarios requiring covert operations where electromagnetic signature management is critical, communications security operations where conventional RF communication may be compromised, and high-security environments where optical isolation provides enhanced protection against electronic warfare and interception attempts. The LaserFi/LiFi systems provide secure alternative communication pathways that supplement RF communication capabilities while offering unique operational advantages for specialized mission requirements.

Automatic beam steering and target acquisition algorithms enable dynamic optical communication link establishment between mobile drone platforms, while adaptive modulation protocols optimize data transmission based on atmospheric conditions, distance requirements, and communication quality assessment.

The multi-modal communication architecture implements one or more communication selection and adaptive switching algorithms that automatically optimize communication methods based on real-time operational conditions, mission requirements, and performance assessment. Communication selection algorithms evaluate available communication options against current operational parameters including range requirements, bandwidth needs, power constraints, security requirements, and electromagnetic signature management priorities.

Adaptive switching protocols enable seamless transition between communication modalities when operational conditions change, primary communication channels become unavailable, or mission requirements evolve during execution. The switching protocols maintain coordination continuity throughout communication transitions while optimizing communication effectiveness for current operational scenarios.

Mission-adaptive communication protocols automatically configure communication parameters based on operational mode selection, with tactical operations emphasizing rapid response and high-bandwidth coordination, operational missions balancing communication effectiveness with power conservation, and strategic deployments optimizing long-range connectivity and signature management for sustained operations.

Environmental adaptation algorithms continuously monitor communication channel performance, interference levels, and environmental conditions to proactively adjust communication strategies before degradation affects coordination effectiveness. The adaptive approach ensures optimal communication performance across diverse operational environments while maintaining resilience against environmental challenges and hostile interference.

The communication architecture provides robust capabilities for operation in contested spectrum environments where hostile jamming, interference, and electronic warfare may compromise conventional communication systems. Multi-modal redundancy ensures that jamming of individual communication channels does not eliminate coordination capabilities, while frequency diversity across multiple communication modalities provides resistance to broadband jamming attempts.

Automatic spectrum analysis and interference detection algorithms continuously monitor communication channels across all modalities to identify optimal communication opportunities and avoid contested frequency bands. Dynamic frequency selection enables rapid adaptation to changing spectrum conditions while maintaining coordination effectiveness and mission continuity.

Anti-jamming protocols may comprise automatic power adjustment to overcome interference, adaptive modulation that optimizes signal quality despite jamming attempts, and communication channel hopping that rapidly switches between available communication modalities to maintain connectivity despite hostile electronic warfare operations. The integrated approach provides comprehensive protection against sophisticated jamming techniques while maintaining operational effectiveness.

The multi-modal RF communication system integrates with the hierarchical Queen-Worker coordination architecture, distributed edge computing capabilities, and fault-tolerant operation protocols while providing enhanced communication flexibility and adaptability across diverse operational scenarios. Communication modality selection integrates with artificial intelligence systems to optimize communication strategies based on mission analysis, environmental assessment, and performance prediction.

Integration with power management systems enables communication optimization based on available battery capacity and mission duration requirements, while coordination with navigation systems provides location-aware communication optimization that considers geographic constraints and communication pathway limitations. The modular communication architecture supports all operational modes from tactical short-duration missions requiring rapid coordination to strategic long-duration operations requiring sustained communication effectiveness across extensive geographic areas.

The comprehensive communication capabilities enhance the autonomous coordination and fault-tolerant operation characteristics of the overall system while providing unprecedented communication flexibility that adapts to diverse mission requirements, operational environments, and technological constraints encountered across military, civilian, and commercial applications.

According to an embodiment, a visual communication system 443 is present and configured to implement computer vision-based optical communication utilizing drone-mounted lighting arrays and pattern recognition algorithms. In some implementations, visual communication system 443 employs structured light patterns and temporal modulation sequences that can be detected and decoded by computer vision systems on receiving drones, enabling communication in scenarios where radio frequency emissions must be minimized for operational security. In one embodiment, binary pattern recognition utilizes alternating LED flash sequences with predetermined timing intervals, where short flashes represent binary '0' values and long flashes represent binary '1' values, enabling transmission of digital data through temporal light modulation. In another embodiment, spatial pattern recognition employs geometric light patterns such as triangular, circular, or rectangular formations created by arrays of LEDs, where different geometric shapes correspond to specific command codes or status messages. In a further embodiment, color-based pattern recognition utilizes multi-spectral LED arrays capable of producing distinct color combinations, where specific color sequences or simultaneous color combinations encode different types of information such as drone identification, status updates, or coordination commands. The pattern recognition algorithms can distinguish communication signals from environmental lighting conditions and decode transmitted information despite varying atmospheric conditions and viewing angles. The visual communication system 443 provides a covert communication capability particularly valuable for operations requiring minimal electromagnetic signature while maintaining essential coordination capabilities. In a further embodiment, visual communication system 443 can be configured to read and process QR codes to receive and or transmit instructions or information between and among drone platforms. Visual communication system 443 is configured to include any computer vision interpretation of the environment or communication between and/or among drones.

According to an embodiment, a network topology system 444 implements a self-healing mesh network architecture that automatically adapts to changing network conditions, drone availability, and communication pathway disruptions. A mesh network topology 444 establishes redundant communication pathways between all drones within the swarm, ensuring that failure of any individual communication link or drone platform does not compromise overall network connectivity. Dynamic routing algorithms within network topology system 444 continuously evaluate available communication pathways and automatically redirect data transmission through optimal routes based on current bandwidth availability, signal quality, and operational priorities.

According to an aspect, mesh network topology 444 comprises various automatic failover mechanisms that seamlessly transition between communication modalities when individual channels become unavailable due to environmental conditions, equipment failure, or active interference. For example, when laser communication 441 becomes unavailable due to atmospheric conditions or line-of-sight obstructions, the network topology 444 automatically redirects communication traffic through radio frequency 442 or visual communication 443 channels without interrupting ongoing data transmission or coordination activities. The self-healing characteristics of the mesh network enable continued operation even when multiple communication channels or drone platforms become unavailable, providing resilience essential for mission-critical operations.

Network protocols 445 implement comprehensive security and coordination mechanisms that ensure secure, authenticated, and efficient communication across the drone swarm network. AES-256 encryption protocols are applied across all communication channels 441, 442, and 443, providing military-grade security for all data transmission within the swarm network. The encryption implementation may include dynamic key management systems that regularly update encryption keys and maintain secure key distribution across the network without requiring centralized key management infrastructure that could represent a single point of failure.

A zero-trust security architecture within network protocols 445 implements continuous authentication and authorization mechanisms that verify the identity and authorization status of all network participants for each communication transaction. Multi-factor authentication protocols require multiple forms of credential verification before granting access to network resources or sensitive mission data. In some aspects, behavioral analysis algorithms within the zero-trust architecture continuously monitor communication patterns and automatically detect anomalous behavior that could indicate compromised network participants or active cyber-attacks.

According to an embodiment, Reliable, Replicated, Redundant, and Fault-Tolerant (RAFT) consensus algorithms within network protocols 445 provide distributed coordination mechanisms for leader election and fault tolerance when command drones 110 become unavailable. The RAFT implementation enables subordinate drones 120 to automatically select replacement command authority from available drone platforms, ensuring continued mission coordination despite leadership failures. Consensus protocols ensure that all network participants agree on leadership changes and maintain consistent operational state information across the distributed swarm network.

Emergency communication protocols within network protocols 445 provide backup communication procedures for catastrophic network failures or extreme operational conditions. These protocols may comprise, but are not limited to, predetermined rally points, autonomous return-to-base procedures, and minimal-bandwidth emergency coordination mechanisms that enable basic swarm coordination even when primary communication systems are completely unavailable. The emergency protocols ensure that individual drones can continue mission-essential functions and maintain basic coordination capabilities under the most challenging operational conditions.

Integration capabilities within the communication architecture enable connectivity with external military and civilian command and control systems. In some implementations, ATAK (Android Team Awareness Kit) integration provides standardized interfaces for military command systems, enabling the drone swarm to share intelligence data and receive mission updates through existing military communication networks. Standardized communication protocols enable integration with civilian emergency response systems, air traffic control networks, and other operational coordination systems as mission requirements dictate.

According to an embodiment, the communication architecture integrates WiFi 446 and Bluetooth 447 capabilities that provide high-throughput, short-range networking for scenarios requiring rapid data exchange, local coordination, and integration with external systems. WiFi implementation supports high-bandwidth data transmission for applications including real-time video streaming, comprehensive sensor data sharing, and rapid mission data upload during maintenance and operational transition periods. Additionally, the architecture can be further configured to support Low Power Wide Area Network (LPWAN) integration 448. LPWAN protocols provide extended range communication capabilities optimized for power-efficient operation during sustained missions where battery conservation is critical for operational endurance. The LPWAN implementation enables communication across distances exceeding conventional radio frequency ranges while maintaining minimal power consumption that supports extended operational periods without compromising communication effectiveness. LPWAN integration supports low-data-rate telemetry and coordination messaging that maintains essential coordination capabilities during power-constrained operations, emergency communication protocols that provide backup connectivity when primary communication systems become unavailable, and long-range relay capabilities that enable communication beyond line-of-sight limitations through multi-hop networking protocols.

This exemplary communication architecture 400 demonstrates the comprehensive approach to resilient communication utilized throughout the autonomous drone swarm system, wherein multiple redundant communication modalities, advanced security protocols, and self-healing network topologies collectively ensure continued coordination and data transmission capabilities across diverse operational environments and challenging conditions. The modular communication architecture supports dynamic reconfiguration based on mission requirements, threat conditions, and available resources, providing the communication flexibility and resilience essential for autonomous swarm operations. More or less of these components may be present in various embodiments of communication system 400.

Figure 5:
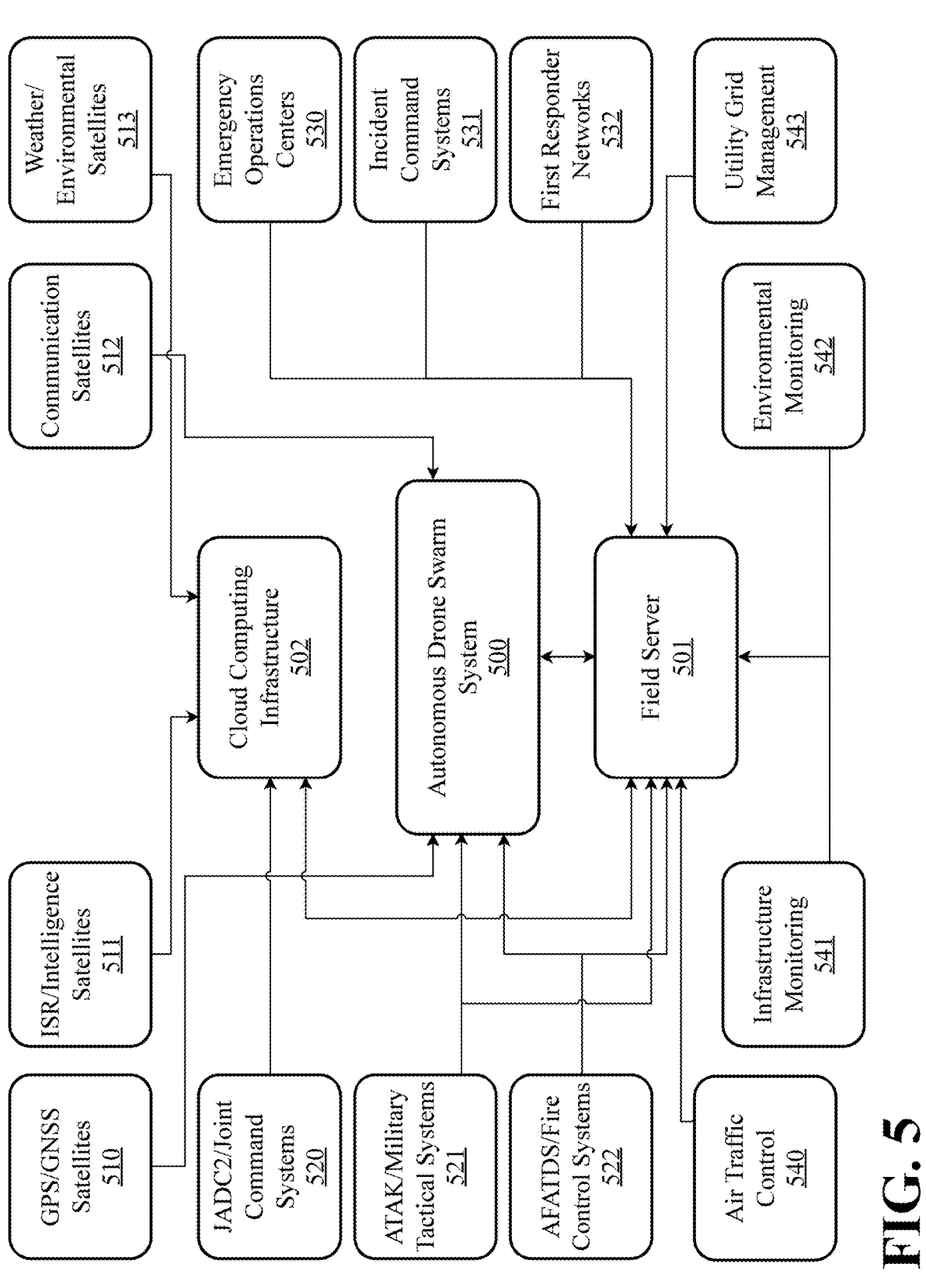
FIG. 5 is a block diagram illustrating exemplary external system connectivity and data exchange capabilities of the autonomous drone swarm system, according to an embodiment.

FIG. 5 is a block diagram illustrating exemplary external system connectivity and data exchange capabilities of the autonomous drone swarm system, according to an embodiment. The diagram demonstrates the system's ability to integrate with diverse external platforms across military, civilian, and commercial domains, providing seamless data exchange and coordination capabilities that enhance operational effectiveness while enabling deployment across multiple market segments and operational scenarios. According to an implementation of an embodiment, a central autonomous drone swarm system 500 serves as the primary coordination hub that manages all external system interfaces while maintaining autonomous operational capabilities. The system implements standardized communication protocols, secure authentication mechanisms, and adaptive data formatting that enables integration with diverse external systems without compromising operational security or autonomous coordination capabilities. Swarm system 500 comprises dedicated communication interfaces for satellite connectivity, military command system integration, civilian emergency response coordination, and commercial system interoperability.

A field server 501 functions as an intermediate fog computing layer that provides local processing capabilities and can be configured to serve as a communication gateway between the distributed drone swarm and external systems. Field servers can be configured to aggregate swarm telemetry and computer vision inferences to perform fog-layer optimization and model calibration, enabling closed-loop learning and swarm behavior refinement during extended operations. According to an aspect, field server 501 implements data aggregation, format conversion, and communication relay functions that optimize bandwidth utilization while providing backup communication capabilities when direct external system connectivity becomes unavailable. The field server architecture enables continued operation in communication-constrained environments while maintaining essential external system integration when connectivity permits. Cloud computing infrastructure 502 provides enhanced analytical capabilities, long-term data storage, and integration with enterprise-level command and control systems. The cloud integration 502 enables comprehensive mission analysis, predictive maintenance coordination, and integration with broader operational planning systems while supporting the hybrid RAG/CAG architecture described herein. Cloud connectivity enhances the system's decision-making capabilities while maintaining autonomous operation when cloud connectivity becomes unavailable.

Satellite system integration encompasses a plurality of satellite platforms that provide navigation, intelligence, communication, environmental data services, and/or the like. GPS/GNSS satellites 510 provide precision navigation and timing services that enable accurate positioning and coordination across the drone swarm network. The GPS integration may comprise anti-jamming capabilities and backup navigation systems that maintain positional accuracy despite electronic warfare interference or satellite signal degradation. ISR/intelligence satellites 511 provide theater-level intelligence feeds that enhance the swarm's situational awareness and mission planning capabilities. The intelligence satellite integration enables correlation of drone-collected intelligence with national-level intelligence assets, providing comprehensive threat assessment and target identification capabilities that exceed organic sensor limitations. Communication satellites 512 extend the swarm's communication range and provide backup communication capabilities that enable beyond-line-of-sight coordination and integration with global command networks. Weather/environmental satellites 513 can provide meteorological data and environmental monitoring information that supports mission planning, safety protocols, and environmental adaptation algorithms. The environmental satellite integration enables predictive weather analysis, atmospheric condition assessment, and environmental hazard detection that enhances mission safety and operational effectiveness.

Military command system integration provides seamless connectivity with existing military command and control infrastructure. Joint all-domain command and control (JADC2)/Joint command systems 520 integration enables the drone swarm to participate in joint all-domain operations while providing real-time intelligence and coordination support to joint force commanders. The JADC2 integration may comprise standardized data formats, secure communication protocols, and interoperability with existing military planning and execution systems. ATAK/military tactical systems 521 integration provides direct connectivity with tactical-level military communication systems, enabling real-time coordination with ground forces and tactical commanders. The ATAK integration supports mission planning, real-time intelligence sharing, and coordination with military operations while maintaining compatibility with existing military communication procedures and security protocols. Advanced filed artillery tactical data system (AFATDS)/fire control systems 522 integration enables direct coordination with artillery and fire support systems, providing target designation, battle damage assessment, and fire coordination capabilities. The fires integration may comprise automated target nomination, digital call-for-fire generation, and real-time battle damage assessment that enhances fires effectiveness while reducing coordination time and minimizing collateral damage risks.

Civilian emergency response system integration enables deployment in disaster response, emergency management, and public safety scenarios. Emergency operations centers (EOC) 530 integration provides coordination with federal, state, and local emergency management agencies while supporting comprehensive disaster response coordination. The EOC integration includes standardized emergency management protocols, interoperability with existing emergency communication systems, and compliance with civilian emergency response procedures. Incident command systems (ICS) 531 integration enables direct support to incident commanders during emergency response operations including natural disasters, terrorist incidents, and mass casualty events. The ICS integration provides real-time intelligence, communication relay support, and situational awareness enhancement for emergency response personnel while maintaining compatibility with established incident command procedures. First responder networks 532 integration provides direct coordination with police, fire, and emergency medical services through existing first responder communication systems. The first responder integration may comprise emergency communication protocols, real-time intelligence sharing, and coordination support that enhances first responder safety and operational effectiveness during emergency response operations.

Commercial system integration enables deployment across diverse commercial applications while providing integration with existing commercial infrastructure and management systems. Air traffic control (ATC) 540 integration ensures safe operation within controlled airspace while providing coordination with commercial aviation systems and compliance with federal aviation regulations. The ATC integration may comprise automatic identification and reporting, airspace deconfliction, and emergency coordination procedures. Infrastructure monitoring 541 systems integration enables coordination with utility companies, transportation agencies, and infrastructure management organizations for comprehensive infrastructure protection and monitoring. The infrastructure integration includes automated reporting, predictive maintenance coordination, and emergency response support for critical infrastructure protection. Environmental monitoring 542 systems integration provides coordination with environmental agencies, research organizations, and conservation groups for comprehensive environmental data collection and analysis. The environmental integration may comprise automated data sharing, research coordination, and environmental protection support that enhances environmental stewardship and conservation efforts. Utility grid management 543 integration enables coordination with electrical power systems, natural gas networks, and other utility infrastructure for utility protection and monitoring. The utility integration includes automated threat detection, infrastructure assessment, and emergency response coordination that enhances utility system resilience and public safety.

The external system integration architecture implements multiple connection pathways that optimize data flow, processing efficiency, and operational resilience based on the specific requirements and capabilities of each external system category. The connection architecture provides both direct and indirect integration pathways that ensure optimal performance while maintaining security and operational flexibility. Satellite system connections utilize multiple integration pathways based on data type and processing requirements. For instance, GPS/GNSS satellites 510 establish direct connections to individual drone platforms within swarm system 500 for real-time navigation and timing services, while also providing positioning data to the field server 501 for mission planning and coordination support. ISR/intelligence satellites 511 primarily connect through cloud computing infrastructure 502 for comprehensive data processing and correlation with other intelligence sources, while also providing direct feeds to the field server 501 for immediate tactical intelligence processing. Communication satellites 512 may provide direct connectivity to drone swarm system 500 for extended range communications and also connect through field server 501 for communication relay and bandwidth management. Weather/environmental satellites 513 may connect primarily through cloud infrastructure 502 for comprehensive meteorological analysis while providing direct feeds to the field server 501 for immediate weather updates that affect ongoing operations.

Military command system integration implements secure, standardized military communication protocols with multiple redundant pathways. JADC2/joint command systems 520 can connect primarily through the cloud computing infrastructure 502 for strategic planning and comprehensive operational coordination, while maintaining direct connections to the field server 501 for tactical coordination and mission updates. ATAK/military tactical systems 521 can establish direct connections to drone swarm system 500 for real-time tactical communication and also connect through the field server 501 for mission coordination and intelligence sharing. AFATDS/fire control systems 522 connect directly to drone swarm system 500 for immediate fire coordination and target designation, while also interfacing through field server 501 for comprehensive fires planning and battle damage assessment coordination.

Civilian emergency response system connections prioritize rapid information sharing and coordination support for emergency operations. Emergency operations centers 530 may connect primarily through field server 501 for comprehensive emergency coordination while maintaining cloud infrastructure 502 connectivity for long-term planning and resource coordination. Incident command systems 531 may establish direct connections to drone swarm system 500 for immediate tactical support during emergency incidents, supplemented by field server 501 connectivity for broader coordination and resource management. First responder networks 532 maintain direct connections to drone swarm system 500 for real-time intelligence and communication support, while also connecting through field server 501 for coordination with broader emergency response efforts.

Commercial system integration provides flexible connectivity options that accommodate diverse commercial operational requirements and existing infrastructure. Air traffic control 540 systems can maintain direct connections to drone swarm system 500 for real-time airspace coordination and safety monitoring, while also connecting through field server 501 for flight planning and airspace management coordination. Infrastructure monitoring 541 systems can connect through field server 501 for data aggregation and analysis, with cloud infrastructure 502 connectivity for long-term trend analysis and predictive maintenance planning. Environmental monitoring 542 systems utilize field server 501 connections for real-time environmental data collection and cloud infrastructure 502 connectivity for comprehensive environmental analysis and research coordination. Utility grid management 543 systems can connect through field server 501 for operational coordination and monitoring, supplemented by cloud infrastructure 502 connectivity for grid analysis and optimization planning.

According to some embodiments, field server 501 serves as the primary integration hub for most external systems, providing data format conversion, security protocol translation, and bandwidth optimization that enables seamless integration despite diverse external system architectures and communication protocols. The field server implements standardized application programming interfaces (APIs) that accommodate different external system requirements while maintaining consistent data exchange protocols with drone swarm system 500. Direct connections between external systems and the drone swarm system 500 may be reserved for time-critical communications that require minimal latency, such as tactical military communications, emergency response coordination, and air traffic control safety functions.

Cloud computing infrastructure 502 connections provide enhanced analytical capabilities and long-term data storage for external systems that benefit from comprehensive data processing and historical analysis. The cloud integration enables correlation of drone-collected data with external system databases, predictive analysis based on historical trends, and comprehensive reporting that supports strategic planning and operational optimization. Cloud connections also provide backup communication pathways and data redundancy that enhance overall system resilience. Security protocols are implemented consistently across all external system connections, with encryption standards and authentication requirements adapted to the specific security requirements of each external system category. Military system connections implement the highest security standards including, but not limited to, classified data handling and secure communication protocols, while civilian and commercial connections utilize appropriate security measures that balance operational security with functional requirements and regulatory compliance. The multi-pathway connection architecture provides operational resilience by ensuring that external system integration can continue despite individual connection failures or communication disruptions. Automatic failover protocols may be implemented that redirect data flows through alternative pathways when primary connections become unavailable, while priority-based routing ensures that mission-critical communications maintain connectivity during high-traffic or degraded communication conditions. This exemplary connection architecture enables the autonomous drone swarm system to operate effectively within diverse operational ecosystems while maintaining the flexibility and adaptability essential for successful deployment across military, civilian, and commercial applications.

This exemplary external system integration enables the autonomous drone swarm system to operate effectively across military, civilian, and commercial domains while providing seamless integration with existing operational infrastructure. The standardized integration approach ensures compatibility with diverse external systems while maintaining the autonomous coordination capabilities and operational flexibility essential for effective swarm operations across multiple operational scenarios and market applications.

Detailed Description of Exemplary Aspects

The methods and processes described herein are illustrative examples and should not be construed as limiting the scope or applicability of the autonomous drone swarm platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the autonomous drone swarm platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

Figure 10:
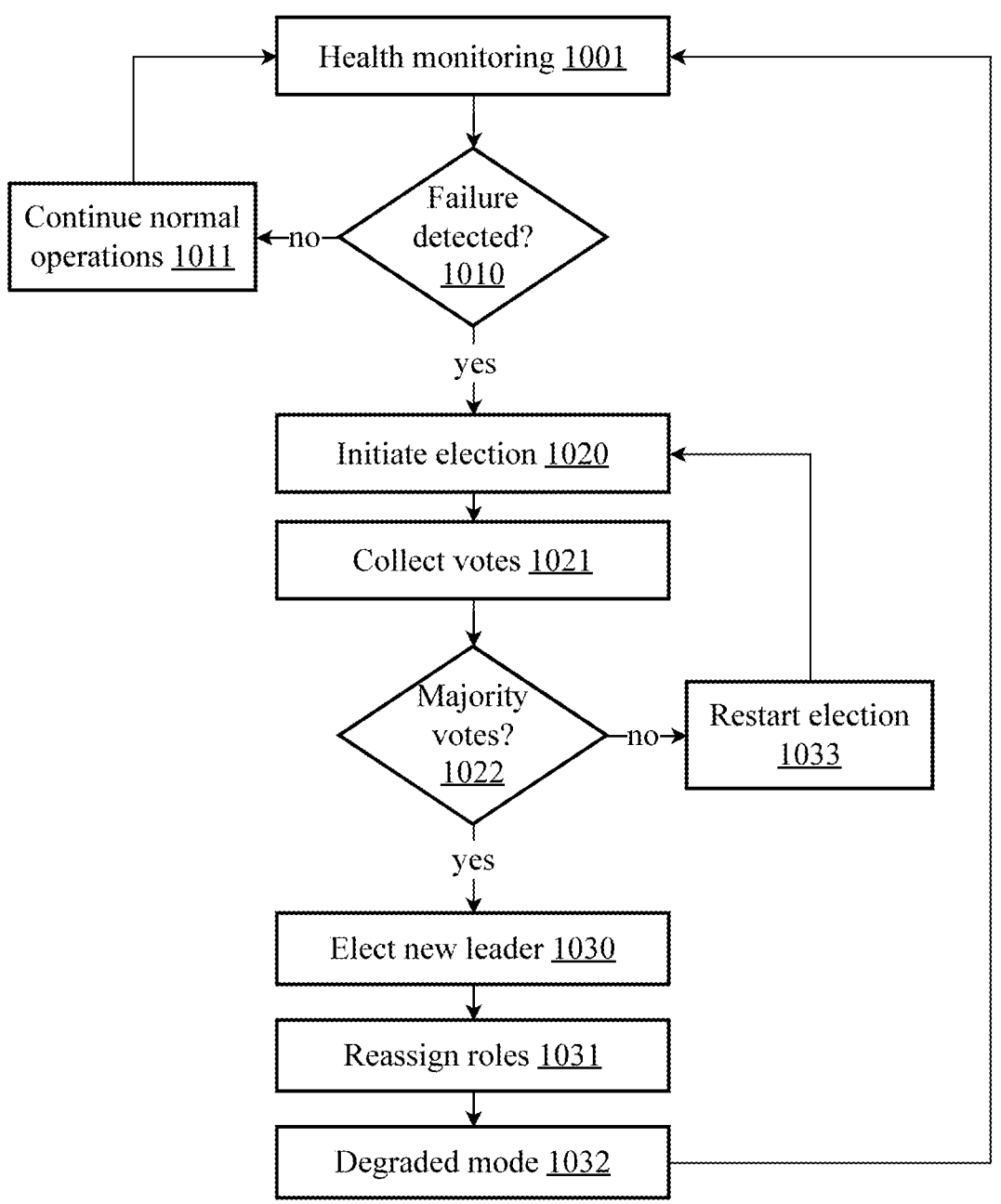
FIG. 10 is a method flow diagram illustrating an exemplary leader election and fault recovery process for autonomous drone swarm systems operating in GPS-denied environments, according to an embodiment.

FIG. 10 is a method flow diagram illustrating an exemplary leader election and fault recovery process for autonomous drone swarm systems operating in GPS-denied environments, according to an embodiment. The method implements RAFT-like consensus protocols combined with comprehensive health monitoring to ensure continued swarm coordination despite individual drone failures, communication disruptions, or environmental challenges that could compromise mission effectiveness.

According to an embodiment, the fault recovery process initiates with continuous health monitoring at step 1001 that implements comprehensive surveillance of critical system parameters across all drone platforms within the swarm network. The health monitoring system continuously evaluates hardware status including processor performance, memory utilization, sensor functionality, and actuator responsiveness to detect potential equipment failures before they impact mission performance. Battery level monitoring tracks power consumption rates, remaining capacity, and charging system status to predict power-related failures and enable proactive power management decisions. Communication link quality assessment monitors signal strength, packet loss rates, transmission delays, and connectivity status across all multi-modal communication channels to identify potential communication failures that could isolate individual drones from the swarm network.

Navigation accuracy monitoring evaluates positioning system performance including GPS signal quality when available, inertial navigation system drift, visual odometry accuracy, and LiDAR scan matching reliability to detect navigation degradation that could compromise coordination effectiveness. Mission performance metrics track task completion rates, response times to commands, error frequencies, and coordination effectiveness to identify behavioral anomalies that may indicate impending failures. The health monitoring system implements configurable threshold parameters that adapt to operational conditions, mission criticality, and environmental factors to provide early warning of potential failures while minimizing false positive alerts that could trigger unnecessary recovery procedures.

The health monitoring process feeds into failure detection decision point 1010 that evaluates collected health metrics against predetermined threshold values and trend analysis algorithms to determine whether intervention is required. The failure detection system implements multi-factor analysis that considers the severity of detected anomalies, the rate of degradation, the potential impact on mission success, and the availability of alternative resources within the swarm to make informed decisions about when to initiate recovery procedures. Machine learning algorithms analyze historical failure patterns and environmental correlations to improve detection accuracy and reduce both false positive and false negative detection rates.

According to an embodiment, when failure detection 1010 determines that no critical failures are present or that detected anomalies remain within acceptable operational parameters, the system proceeds to continue normal operations 1011 while maintaining continuous monitoring surveillance. The normal operations mode implements standard coordination protocols, task execution procedures, and communication patterns while preserving the monitoring infrastructure necessary to detect emerging problems. The system returns to health monitoring 1001 through a continuous feedback loop that ensures persistent surveillance of system health throughout normal mission execution.

When failure detection 1010 identifies critical failures, performance degradation, or conditions that threaten mission success, the system initiates a RAFT-like consensus protocol beginning with election initiation at step 1020. The election initiation process increments the current election term to distinguish the new election from previous attempts, identifies the failed or degraded command drone that requires replacement, and broadcasts election announcement messages to all participating subordinate drones within communication range. The initiation system implements timeout mechanisms that prevent indefinite waiting for responses from failed nodes and includes candidate qualification protocols that verify potential leader candidates possess necessary capabilities including processing capacity, communication functionality, battery capacity, and mission-critical sensors required for effective leadership.

Vote collection at step 1021 implements distributed voting protocols where eligible subordinate drones evaluate candidate qualifications and submit votes based on predetermined criteria including battery level, processing capacity, communication reliability, sensor functionality, and recent performance history. The voting system implements secure authentication mechanisms that prevent vote manipulation or spoofing, utilizes cryptographic verification to ensure vote integrity, and includes anti-replay protections that prevent duplicate voting or election manipulation by malicious actors. Voting algorithms consider candidate proximity to mission objectives, current task load, and specialized capabilities that may be relevant to ongoing mission requirements.

Majority decision point 1022 evaluates collected votes to determine whether any candidate has received sufficient support to assume leadership responsibilities. The majority calculation may implement RAFT-like quorum requirements that typically require more than half of available nodes to agree on a single candidate, ensuring that elected leaders have broad support within the swarm. The decision process may comprise tie-breaking algorithms that consider secondary criteria such as battery level, processing capacity, or mission-specific qualifications when multiple candidates receive similar vote counts. Timeout mechanisms prevent indefinite waiting for votes from failed or unreachable nodes while ensuring adequate time for all healthy nodes to participate in the election process.

According to an embodiment, when majority decision 1022 confirms that a candidate has received sufficient votes for election, the system proceeds to elect new leader at step 1030 through formal leadership transition protocols. The leader election process may comprise leadership announcement broadcasts that inform all swarm members of the new command drone, authentication verification that confirms the elected leader's identity and authorization, and capability confirmation that verifies the new leader possesses necessary resources and functionality for effective coordination. The election system implements gradual authority transfer that enables the new command drone to assume responsibilities progressively while maintaining mission continuity and coordination effectiveness.

Role reassignment at step 1031 redistributes leadership responsibilities and coordination tasks from the failed command drone to the newly elected leader while reallocating subordinate tasks among available subordinate drones. The reassignment process may comprise capability assessment that evaluates each drone's current status, available resources, and mission-relevant skills to optimize task allocation. Task redistribution algorithms consider mission priorities, deadline constraints, drone proximity to objectives, and workload balancing to ensure effective mission continuation despite reduced swarm capacity. Priority assignment protocols ensure that critical mission functions receive appropriate resource allocation while deferring less essential tasks when necessary.

Degraded mode operations at step 1032 implement reduced functionality protocols that preserve essential mission capabilities while adapting to diminished swarm capacity or capabilities. Degraded mode prioritizes mission-critical functions including safety monitoring, communication maintenance, basic navigation, and core mission objectives while temporarily suspending non-essential activities such as comprehensive mapping, detailed surveillance, or advanced coordination maneuvers. The degraded mode implements adaptive resource allocation that concentrates available processing power, battery capacity, and communication bandwidth on essential functions while maintaining minimum acceptable performance levels for mission success.

According to an embodiment, when majority decision 1022 determines that no candidate has received sufficient votes for leadership, the system activates restart election at step 1033 protocols that initiate a new election cycle with modified parameters. The restart process includes term increment that distinguishes the new election attempt from the failed election, candidate pool reassessment that may include previously unavailable drones or exclude candidates that demonstrated poor performance, and modified voting criteria that adapt to lessons learned from the failed election attempt. Restart mechanisms may implement exponential backoff algorithms that gradually increase time intervals between election attempts to prevent election storms that could consume excessive communication bandwidth or processing resources.

The restart election process returns to election initiation at step 1020 through a feedback loop that enables multiple election attempts until successful leadership establishment or until degraded mode protocols determine that continued election attempts are counterproductive. The system implements maximum attempt limits that prevent infinite election loops while maintaining sufficient persistence to overcome temporary communication disruptions or coordination difficulties.

According to an embodiment, the fault recovery method includes return-to-monitoring protocols that restore normal health surveillance after successful completion of recovery procedures. From continue normal operations at step 1011, the system implements continuous monitoring return that maintains uninterrupted health surveillance throughout normal mission execution. From degraded mode operations at step 1032, the system implements recovery monitoring that gradually restores full functionality as conditions permit while maintaining enhanced surveillance to detect recurring problems or incomplete recovery.

The recovery monitoring process evaluates system performance improvements, communication restoration, and capability recovery to determine when normal operations can be safely resumed. Gradual restoration protocols incrementally increase operational complexity and resource utilization while monitoring for signs of recurring failures or insufficient recovery. The system maintains degraded mode readiness that enables rapid return to reduced functionality if recovery attempts prove unsuccessful or if new failures emerge during the restoration process.

The leader election and fault recovery method provides various resilience mechanisms that enable autonomous drone swarms to maintain mission effectiveness despite individual component failures, communication disruptions, or environmental challenges through systematic failure detection, democratic leadership transition, intelligent resource reallocation, and adaptive operational mode adjustment that collectively ensure mission continuity and coordination effectiveness in challenging operational environments including subterranean facilities, GPS-denied areas, and contested electromagnetic environments where conventional recovery mechanisms would be ineffective.

Figure 11:
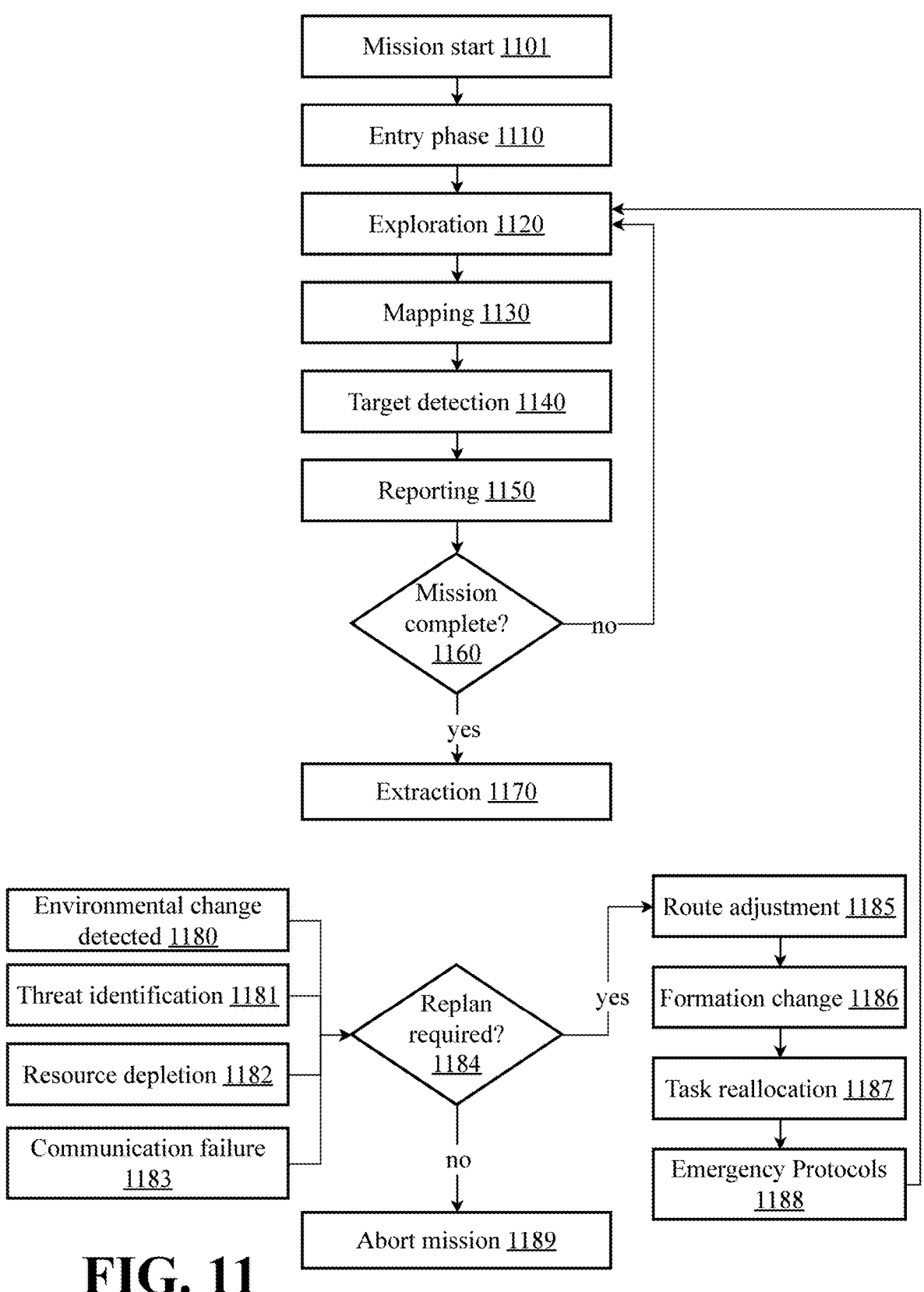
FIG. 11 is a method flow diagram illustrating an exemplary mission flow process for autonomous subterranean operations, demonstrating the systematic progression through mission phases combined with adaptive replanning capabilities that enable autonomous drone swarms to maintain mission effectiveness despite dynamic operational challenges, according to an embodiment.

FIG. 11 is a method flow diagram illustrating an exemplary mission flow process for autonomous subterranean operations, demonstrating the systematic progression through mission phases combined with adaptive replanning capabilities that enable autonomous drone swarms to maintain mission effectiveness despite dynamic operational challenges, according to an embodiment. The mission flow method provides comprehensive autonomous operation capabilities from initial deployment through successful extraction while implementing intelligent adaptation mechanisms that respond to changing environmental conditions, emerging threats, and operational constraints.

According to an embodiment, the mission flow process initiates with mission start at step 1101 that establishes initial operational parameters, validates system readiness, and confirms communication connectivity with command and control systems. The mission start process may comprise pre-deployment system checks that verify hardware functionality, sensor calibration, communication system operation, and navigation system accuracy before commencing autonomous operations. Battery level verification can be performed to ensure sufficient power capacity for planned mission duration with appropriate safety margins, while mission parameter validation confirms that operational objectives, geographic boundaries, time constraints, and safety protocols are properly configured and understood by all swarm members.

The mission start phase implements final coordination protocols that establish command-subordinate drone (i.e., Queen-Worker) relationships, verify mesh network connectivity, confirm backup communication channels, and validate emergency procedures before entering the operational environment. Mission authorization verification ensures that all necessary approvals have been obtained and that operational constraints including no-fly zones, time restrictions, and engagement rules are properly programmed into autonomous decision-making systems.

Entry phase at step 1110 manages the transition from surface operations to subterranean environments through controlled access procedures that ensure safe passage while establishing initial positioning and communication relay capabilities. The entry process may comprise portal approach and penetration protocols that navigate entry points while avoiding obstacles, structural hazards, and potential security threats. Initial positioning establishment utilizes available GPS signals during surface approach combined with inertial navigation systems as satellite signals become unavailable during subterranean entry.

Communication relay establishment during entry phase ensures continued connectivity with surface-based fog layer servers and command systems through strategic positioning of relay nodes, activation of multi-modal communication systems, and verification of signal propagation through entry portals. The entry phase implements adaptive formation control that adjusts swarm configuration based on entry portal dimensions, structural constraints, and operational requirements while maintaining coordination and collision avoidance protocols.

According to an embodiment, exploration phase at step 1120 conducts systematic reconnaissance of the subterranean environment to identify navigation pathways, potential hazards, areas of interest, and mission-relevant features while establishing comprehensive situational awareness. The exploration process can be configured to implement frontier-based exploration algorithms that systematically investigate unknown areas while maintaining safe distances from potential hazards and ensuring continued communication connectivity with other swarm members.

One or more pathfinding algorithms during exploration identify optimal routes for mission execution while considering factors including passage dimensions, structural stability, communication line-of-sight requirements, and potential escape routes for emergency extraction. The exploration phase utilizes distributed exploration strategies that allocate individual Workers to different areas while maintaining coordination through Queen drone oversight and mesh network communication.

Environmental hazard assessment during exploration identifies potential threats including, but not limited to, structural instability, hazardous materials, flooding risks, air quality concerns, and security threats that could impact mission success or safety. The exploration system implements progressive area clearance that verifies safety conditions before advancing into new areas while maintaining communication pathways and escape route accessibility.

Mapping phase at step 1130 generates comprehensive three-dimensional environmental models through collaborative SLAM processing that combines observations from multiple drone platforms to create accurate, detailed representations of the subterranean environment. The mapping process utilizes LiDAR scanning, visual odometry, and photogrammetry to capture geometric details of tunnels, chambers, obstacles, and infrastructure elements while maintaining real-time position tracking and coordinate system consistency.

The mapping phase can implement fog-assisted processing that offloads computationally intensive map generation tasks to fog layer servers while maintaining essential navigation capabilities on individual drone platforms. Point cloud registration, surface reconstruction, and semantic labeling operations are performed at the fog layer to generate high-quality environmental models that support navigation, mission planning, and target identification activities.

Collaborative mapping protocols ensure that observations from multiple drone platforms are integrated consistently while resolving conflicts between overlapping observations and maintaining global map accuracy. The mapping system generates multi-resolution representations that provide appropriate detail levels for different operational requirements while optimizing storage and transmission efficiency.

According to an embodiment, target detection phase at step 1140 implements comprehensive surveillance and identification protocols that locate mission-relevant objects, persons, or conditions using multi-modal sensor integration and artificial intelligence-driven analysis. The target detection system utilizes electro-optical cameras, infrared thermal imaging, LiDAR scanning, and specialized sensors including chemical detection systems to identify targets of interest while distinguishing between mission objectives and environmental features.

Machine learning algorithms within the target detection system implement object recognition, pattern analysis, and anomaly detection to identify targets that match predetermined criteria while adapting to varying environmental conditions, target orientations, and partial occlusion scenarios. The detection system maintains confidence scoring that indicates target identification reliability and provides supporting evidence for human operator review when required.

Target classification protocols categorize detected objects based on mission requirements, threat assessment criteria, and operational priorities while maintaining detailed records of target characteristics, location coordinates, and supporting sensor data. The target detection phase implements verification procedures that require multiple sensor modalities or multiple drone observations to confirm high-priority target identifications.

Reporting phase at step 1150 transmits mission-critical information to command and control systems through prioritized communication protocols that ensure critical intelligence reaches decision-makers despite bandwidth constraints or communication disruptions. The reporting system may comprise intelligent data compression and prioritization that transmits essential target information, environmental assessments, and mission status updates while managing communication bandwidth efficiently.

Real-time reporting protocols provide immediate notification of critical discoveries, safety hazards, or emergency conditions that require immediate attention or response. The reporting system maintains mission logs that document all significant observations, decisions, and actions for post-mission analysis and operational improvement purposes.

Mission complete decision 1160 evaluates current mission status against predetermined success criteria to determine whether operational objectives have been achieved or whether continued operations are required. The decision process considers factors including target detection success, area coverage completion, time constraints, resource availability, and emerging threats to make informed determinations about mission continuation or termination.

According to an embodiment, when mission complete decision 1160 determines that operational objectives have not been achieved and conditions permit continued operations, the system returns to exploration phase 1120 to continue systematic area coverage, target detection, and mission execution. This iterative approach enables comprehensive area coverage and persistent surveillance until mission objectives are accomplished or termination becomes necessary due to operational constraints.

When mission complete decision 1160 confirms that operational objectives have been achieved or that mission termination is required, the system proceeds to extraction phase at step 1170 that manages safe withdrawal from the subterranean environment through controlled egress procedures. The extraction process implements route planning that utilizes previously mapped pathways while accounting for any environmental changes, new hazards, or structural modifications that may have occurred during mission execution.

Emergency extraction procedures provide rapid egress capabilities when immediate withdrawal is required due to safety threats, equipment failures, or mission abort conditions. The extraction phase maintains communication connectivity throughout the withdrawal process while ensuring that all swarm members successfully reach surface extraction points.

According to an embodiment, the mission flow method implements comprehensive adaptive replanning capabilities through policy-based trigger mechanisms that detect conditions requiring mission modification or termination. This provides parallel monitoring and response methods that can interrupt the main flow (steps 1101-1170) at anytime. The replanning flow operates continuously in parallel with the main mission flow, providing real-time adaptive capability while the primary mission phases progress sequentially. This dual-flow design enables autonomous adaptation wherein the system can modify its approach based on changing conditions while maintaining systematic progression toward mission objectives. Environmental change detected 1180 monitors for structural modifications, new obstacles, altered passage configurations, or changing environmental conditions that could impact mission execution or safety. The environmental monitoring system utilizes comparison of current sensor observations with previously mapped conditions to identify significant changes that may require route modification, formation adjustment, or mission replanning.

Threat identification 1181 implements continuous security monitoring that detects potential hostile activities, security threats, or dangerous conditions that could compromise mission success or personnel safety. The threat identification system utilizes behavioral analysis, pattern recognition, and anomaly detection to identify suspicious activities while distinguishing between legitimate environmental features and potential security concerns.

Resource depletion 1182 monitors critical system resources including battery capacity, communication bandwidth, processing capacity, and sensor functionality to predict resource exhaustion and trigger appropriate conservation measures or mission modification. The resource monitoring system implements predictive analysis that estimates remaining operational time based on current consumption rates and planned mission activities.

Communication failure 1183 detects degradation or loss of communication connectivity that could compromise coordination effectiveness or safety protocols. The communication monitoring system evaluates signal quality, transmission success rates, and network connectivity across all communication modalities to identify potential communication failures before they impact mission effectiveness.

Replan required decision 1184 evaluates detected trigger conditions against predetermined thresholds and mission criticality factors to determine whether adaptive replanning is necessary or whether detected conditions can be accommodated within existing mission parameters. The replan decision process considers factors including trigger severity, available alternatives, resource availability, mission time constraints, and risk assessment to make informed decisions about mission adaptation requirements.

According to an embodiment, when replan required decision 1184 determines that adaptive measures are necessary, the system implements one or more mission adaptation actions that modify operational parameters while preserving essential mission objectives. Route adjustment 1185 modifies planned pathways to accommodate detected obstacles, environmental changes, or emerging threats while maintaining mission effectiveness and safety protocols. The route adjustment system utilizes real-time pathfinding algorithms that incorporate current environmental conditions and mission requirements to identify optimal alternative pathways.

Formation change 1186 modifies swarm configuration to adapt to changing environmental conditions, communication requirements, or tactical situations while maintaining coordination effectiveness and mission capability. Formation adaptation considers factors including passage dimensions, communication line-of-sight requirements, threat response protocols, and mission objectives to optimize swarm configuration for current conditions.

Task reallocation 1187 redistributes mission responsibilities among available drone platforms to accommodate equipment failures, resource constraints, or changing mission priorities while maintaining overall mission effectiveness. The task reallocation system evaluates individual drone capabilities, current workload, available resources, and mission requirements to optimize task distribution across the swarm.

Emergency protocols 1188 implement immediate response procedures for critical safety threats, equipment failures, or mission-threatening conditions that require rapid intervention to preserve mission success or ensure personnel safety. Emergency protocols include automatic threat response, immediate communication of critical conditions, formation defensive measures, and preparation for emergency extraction if required. In some cases, after emergency protocols have been activated, the drone may re-enter exploration mode with modified operating parameters.

According to an embodiment, when replan required decision 1184 determines that detected conditions cannot be effectively addressed through adaptive measures or that continued operations would pose unacceptable risks, the system initiates abort mission 1189 procedures that terminate current operations and initiate immediate extraction protocols. The mission abort process includes immediate notification of command and control systems, activation of emergency extraction procedures, implementation of safety protocols, and preservation of collected mission data for post-mission analysis.

The mission abort system maintains coordination among all swarm members during emergency withdrawal while implementing threat avoidance measures and ensuring that critical mission intelligence is preserved and transmitted despite operational termination. Emergency communication protocols ensure that abort decisions and extraction status are communicated to command systems even during degraded communication conditions.

The mission flow method illustrated in FIG. 11 provides comprehensive autonomous operation capabilities that enable drone swarms to execute complex subterranean missions while maintaining adaptability to changing conditions through intelligent replanning mechanisms, ensuring mission success and operational safety despite the challenging environmental conditions, communication constraints, and operational uncertainties typical of GPS-denied subterranean operations while preserving the autonomous coordination capabilities essential for effective swarm operations in contested environments.

Figure 13:
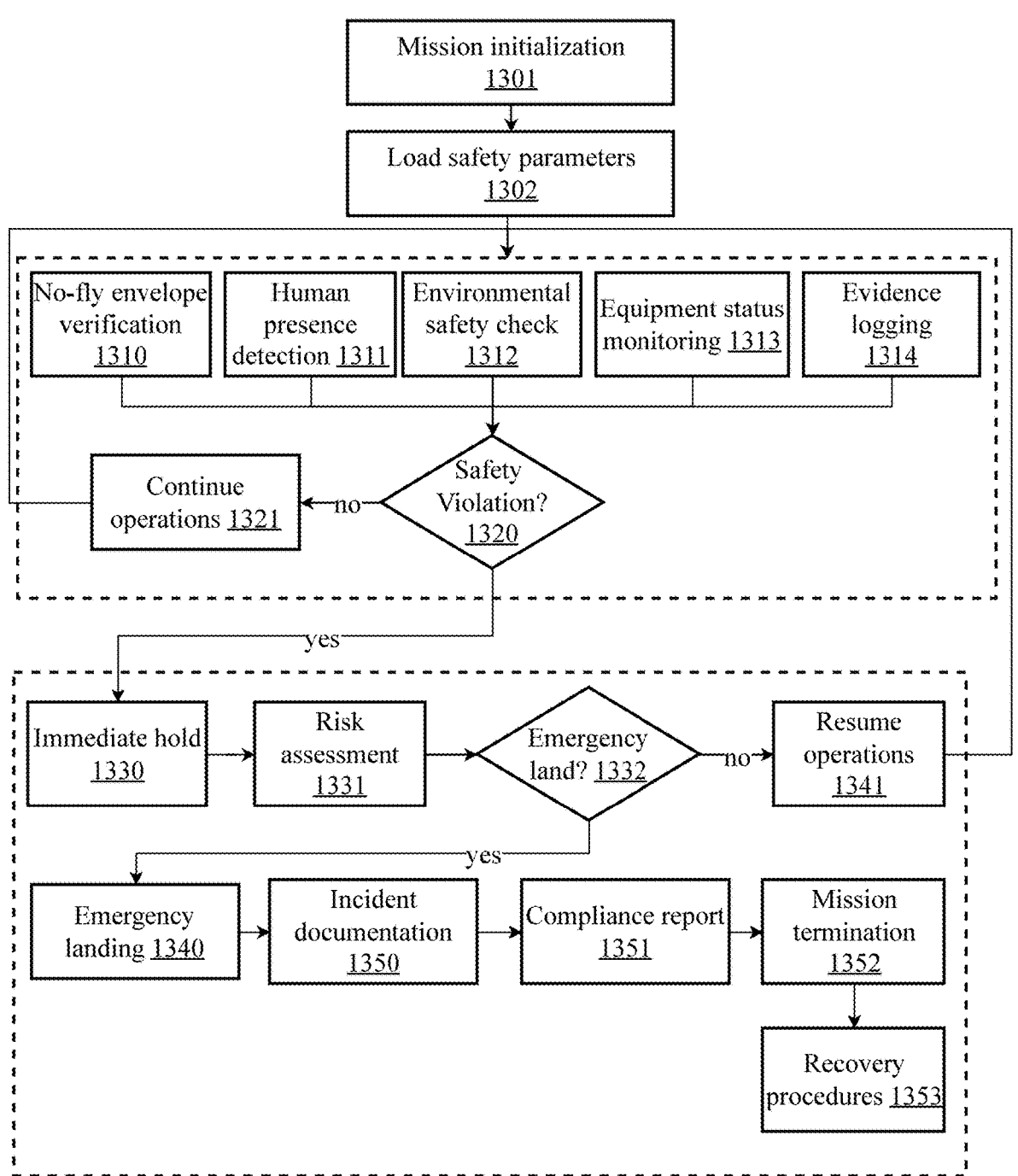
FIG. 13 is a flow diagram illustrating an exemplary method for a safety and compliance process for autonomous drone swarm operations, demonstrating comprehensive safety monitoring, regulatory compliance enforcement, and emergency response protocols that ensure safe operation while maintaining adherence to applicable safety regulations and operational standards, according to an embodiment.

FIG. 13 is a flow diagram illustrating an exemplary method for a safety and compliance process for autonomous drone swarm operations, demonstrating comprehensive safety monitoring, regulatory compliance enforcement, and emergency response protocols that ensure safe operation while maintaining adherence to applicable safety regulations and operational standards, according to an embodiment. The safety and compliance method provides systematic risk management capabilities that protect personnel, equipment, and mission objectives while ensuring compliance with federal, state, and local regulations governing unmanned aerial system operations in various operational environments.

According to an embodiment, the safety and compliance process initiates with mission initialization at step 1301 that establishes operational parameters, validates system readiness, and confirms compliance with applicable regulatory requirements before commencing autonomous operations. The mission initialization process may comprise comprehensive pre-flight safety checks that verify hardware functionality, sensor calibration, communication system operation, and emergency protocol readiness. Safety system validation ensures that all monitoring systems, detection algorithms, and response mechanisms are operational and properly configured for the specific mission environment and requirements.

Regulatory compliance verification during mission initialization confirms that planned operations adhere to Federal Aviation Administration Part 107 regulations for unmanned aircraft systems, Occupational Safety and Health Administration workplace safety requirements, Department of Transportation safety protocols, Environmental Protection Agency environmental standards, and applicable military or defense operational directives. The initialization process implements mission authorization validation that ensures all necessary permits, waivers, and approvals have been obtained before operation commencement.

Loading safety parameters at step 1302 configures operational constraints, safety thresholds, and compliance boundaries that govern autonomous decision-making throughout mission execution. The parameter loading process includes no-fly envelope definitions that establish restricted airspace boundaries, minimum altitude constraints, maximum operating distances, and prohibited operational areas based on regulatory requirements and mission-specific safety considerations. Human presence detection thresholds configure sensitivity levels for personnel detection systems including thermal signature recognition, motion pattern analysis, and voice recognition capabilities.

Environmental safety parameters establish detection thresholds for hazardous gas concentrations, structural instability indicators, weather condition limits, and emergency evacuation triggers that protect both equipment and personnel. Equipment monitoring parameters configure health monitoring thresholds for critical systems including battery levels, communication connectivity, navigation accuracy, and sensor functionality that could impact safe operation.

According to an embodiment, the safety and compliance method implements continuous safety monitoring loop comprising five parallel monitoring systems that provide comprehensive surveillance of operational conditions, regulatory compliance, and safety threats throughout mission execution. The monitoring loop operates continuously during all phases of autonomous operation to ensure immediate detection and response to safety violations or emergency conditions.

No-fly envelope verification at step 1310 implements real-time monitoring of drone position and trajectory against predetermined airspace restrictions, altitude constraints, and operational boundaries to ensure continued compliance with regulatory requirements and safety protocols. The verification system utilizes GPS positioning data, inertial navigation measurements, and map-referenced position calculations to maintain accurate awareness of drone location relative to restricted airspace, no-fly zones, and operational boundary limits.

Airspace restriction monitoring includes temporary flight restrictions, controlled airspace boundaries, military operations areas, and other dynamic airspace limitations that may change during mission execution. The system implements automatic notification and compliance enforcement when drones approach restricted areas, providing graduated warnings and automatic course corrections to maintain regulatory compliance. Emergency airspace protocols enable immediate compliance with air traffic control directives or emergency airspace restrictions.

Human presence detection at step 1311 utilizes multi-modal sensor systems to identify and track human personnel within the operational area to ensure compliance with visual line-of-sight requirements, personnel safety protocols, and operational separation standards. The detection system implements thermal signature analysis using infrared sensors to identify human heat signatures despite challenging environmental conditions, camouflage, or limited visibility scenarios.

Motion pattern analysis algorithms process visual and radar sensor data to identify human movement patterns, distinguish between personnel and environmental motion, and track individual movement trajectories to predict potential safety conflicts. Voice and audio recognition capabilities detect human speech, communication attempts, and emergency signals that may indicate personnel presence or safety concerns requiring immediate response.

The human presence detection system implements graduated response protocols that provide warnings when personnel approach operational areas, implement automatic separation maintenance that adjusts drone positioning to maintain safe distances, and activate emergency protocols when personnel safety may be compromised by continued operations.

Environmental safety check at step 1312 monitors operational environment conditions for hazards that could compromise safety including hazardous gas concentrations, structural instability, severe weather conditions, and environmental threats that could impact mission safety or equipment integrity. The environmental monitoring system utilizes chemical detection sensors to identify toxic gases, explosive vapors, oxygen depletion, and other atmospheric hazards that could endanger personnel or equipment.

Structural stability monitoring analyzes environmental vibrations, acoustic signatures, and visual indicators that could indicate structural collapse risks, unstable surfaces, or dynamic hazards that could impact safe operation. Weather monitoring systems track wind conditions, precipitation, temperature extremes, and atmospheric conditions that could exceed safe operational limits or compromise equipment functionality.

Environmental threat assessment algorithms correlate multiple environmental indicators to identify emerging hazards, predict environmental changes that could impact safety, and trigger appropriate response protocols including mission modification, area evacuation, or emergency termination when environmental conditions exceed safe operational parameters.

Equipment status monitoring at step 1313 implements continuous surveillance of critical system health including hardware functionality, sensor performance, communication connectivity, navigation accuracy, and power system status to ensure continued safe operation and early detection of equipment failures that could compromise safety. The monitoring system tracks battery voltage, current consumption, charging status, and remaining capacity to prevent power-related failures and ensure adequate power reserves for emergency response procedures.

Communication system monitoring evaluates signal strength, transmission quality, network connectivity, and backup communication system status to ensure continued coordination capability and emergency communication readiness. Navigation system monitoring tracks GPS signal quality, inertial navigation accuracy, sensor correlation, and positioning confidence to maintain accurate location awareness and prevent navigation-related safety incidents.

Sensor health monitoring evaluates camera functionality, LiDAR performance, radar operation, and specialized sensor status to ensure continued environmental awareness and detection capability. The equipment monitoring system implements predictive failure analysis that identifies degrading performance trends and triggers maintenance alerts or operational modifications before failures impact safety.

Evidence logging at step 1314 maintains comprehensive documentation of all operational activities, safety events, decision processes, and system performance to ensure regulatory compliance, support incident investigation, and provide audit trails for safety analysis and improvement. The logging system records continuous flight data including position, altitude, speed, heading, and control inputs with precise timestamps and coordinate references.

Sensor data logging captures environmental monitoring data, detection system outputs, and safety system status with sufficient detail to support post-mission analysis and incident reconstruction. Decision audit trails document all autonomous decision-making processes including safety assessments, risk evaluations, and response selections to enable review of system behavior and decision logic.

Compliance documentation maintains records of regulatory adherence including airspace compliance, safety protocol execution, and emergency response actions to support regulatory reporting requirements and demonstrate compliance with applicable safety standards.

According to an embodiment, safety assessment decision 1320 evaluates all monitoring system inputs to determine whether safety violations, regulatory non-compliance, or emergency conditions exist that require immediate intervention or operational modification. The assessment process implements multi-factor analysis that considers violation severity, immediate threat level, regulatory implications, and available response options to make informed decisions about appropriate response measures.

Threat prioritization algorithms evaluate multiple simultaneous safety concerns to identify the most critical threats requiring immediate attention while ensuring that response measures address all significant safety issues. Risk assessment calculations consider probability of harm, potential consequences, available mitigation options, and time constraints to optimize response effectiveness while minimizing operational disruption.

The safety assessment system implements graduated response thresholds that distinguish between minor violations requiring course corrections, moderate violations requiring operational modifications, and severe violations requiring immediate emergency response. Assessment confidence levels ensure that response measures are proportionate to threat severity and assessment reliability.

When safety assessment decision 1320 determines that no safety violations or emergency conditions exist, the system proceeds to continue operations 1321 while maintaining continuous monitoring surveillance. The continue operations mode implements standard operational protocols while preserving all monitoring capabilities and maintaining readiness for immediate response to emerging safety concerns.

Normal operations continuation includes periodic safety system verification, monitoring threshold validation, and emergency response readiness checks to ensure continued safety system effectiveness. The system maintains communication with command and control systems to provide ongoing safety status updates and enable external oversight of safety compliance.

According to an embodiment, when safety assessment decision 1320 identifies safety violations, regulatory non-compliance, or emergency conditions, the system activates emergency response protocols beginning with immediate hold 1330 that implements immediate cessation of forward motion while maintaining position and altitude stability. The immediate hold response prioritizes immediate threat mitigation through rapid response activation, position stabilization, and emergency communication initiation.

Position hold protocols maintain current altitude and geographic position while preventing continued movement that could exacerbate safety violations or increase threat exposure. Communication alert systems provide immediate notification to command and control systems, emergency response personnel, and relevant authorities regarding the safety violation and initiated response measures.

Emergency beacon activation provides location identification and distress signaling to support emergency response coordination and personnel safety measures. The immediate hold system maintains full situational awareness and emergency response readiness while preventing continued operations that could compromise safety.

Risk assessment 1331 conducts detailed analysis of detected safety threats to determine appropriate response measures including threat severity evaluation, available response options, potential consequences of different response choices, and time constraints affecting decision-making. The risk assessment process considers immediate threats requiring emergency landing, moderate threats permitting operational modification, and minor threats enabling continued operations with enhanced monitoring.

Environmental factor analysis evaluates weather conditions, terrain characteristics, personnel proximity, and operational constraints that could impact response effectiveness or create additional safety concerns. Resource availability assessment considers battery capacity, landing site options, emergency equipment functionality, and communication connectivity that could affect response implementation.

Emergency decision 1332 determines whether immediate emergency landing is required based on threat severity, risk assessment results, and available response options. The decision process implements safety-first protocols that prioritize personnel protection and equipment preservation while considering mission objectives and operational constraints.

Decision criteria include imminent threat to personnel safety, critical equipment failures affecting flight safety, environmental conditions exceeding safe operational limits, and regulatory violations requiring immediate compliance action. The emergency decision system implements rapid decision-making algorithms that provide timely response while ensuring appropriate consideration of all relevant safety factors.

According to an embodiment, when emergency decision 1332 determines that immediate landing is required, the system activates emergency landing 1340 protocols that implement controlled descent and landing procedures prioritizing safety while minimizing equipment damage and environmental impact. Emergency landing site selection utilizes real-time environmental assessment, terrain analysis, and safety consideration to identify optimal landing locations that provide personnel safety, equipment protection, and emergency access capability.

Controlled descent procedures implement power management, approach path optimization, and landing technique selection that ensure safe landing despite emergency conditions. Emergency communication protocols provide continuous updates to emergency response personnel, command systems, and relevant authorities throughout the landing process.

Post-landing safety procedures include equipment shutdown, area securing, emergency signal activation, and personnel safety measures that ensure continued safety until recovery operations can be implemented. The emergency landing system maintains situation awareness and communication capability to support emergency response coordination and personnel evacuation if required.

When emergency decision 1332 determines that continued operations are feasible with appropriate modifications, the system implements resume operations 1341 protocols that address detected safety concerns while enabling mission continuation. Operational modification procedures include route adjustment to avoid safety threats, altitude modification to maintain regulatory compliance, formation changes to improve safety separation, and enhanced monitoring activation to prevent recurrence of safety concerns.

Safety enhancement measures include increased monitoring sensitivity, reduced operational tempo, enhanced communication protocols, and additional safety margins that reduce risk while enabling productive mission continuation. The resume operations system maintains continuous safety monitoring with enhanced vigilance for recurring safety concerns or developing emergency conditions.

According to an embodiment, the safety and compliance method implements comprehensive documentation and recovery procedures that ensure regulatory compliance, support incident analysis, and enable operational improvement. Incident documentation 1350 creates detailed records of all safety events including violation descriptions, detection circumstances, response measures implemented, and outcome assessment to support regulatory reporting requirements and internal safety analysis.

Documentation standards include precise timestamps, geographic coordinates, environmental conditions, system status, and decision rationale to enable thorough incident reconstruction and analysis. Evidence preservation ensures that all relevant data including sensor recordings, communication logs, and system telemetry are maintained with appropriate security and chain-of-custody procedures.

Compliance report 1351 generates regulatory notifications and documentation required by applicable safety authorities including Federal Aviation Administration incident reporting, Occupational Safety and Health Administration workplace safety documentation, and other regulatory notification requirements. The compliance reporting system implements standardized formats, required data elements, and submission timelines that ensure regulatory compliance while supporting safety authority investigation and analysis activities.

Mission termination 1352 implements controlled mission conclusion procedures when safety conditions require operational cessation including safe equipment recovery, area securing, personnel accounting, and emergency service coordination. Termination procedures prioritize personnel safety while preserving equipment and mission data to the maximum extent feasible under emergency conditions.

Recovery procedures 1353 coordinate equipment retrieval, personnel evacuation, and area restoration activities that ensure complete mission conclusion while maintaining safety protocols and regulatory compliance. Recovery operations include emergency service coordination, specialized equipment utilization, and safety protocol maintenance throughout recovery activities.

Figure 15:
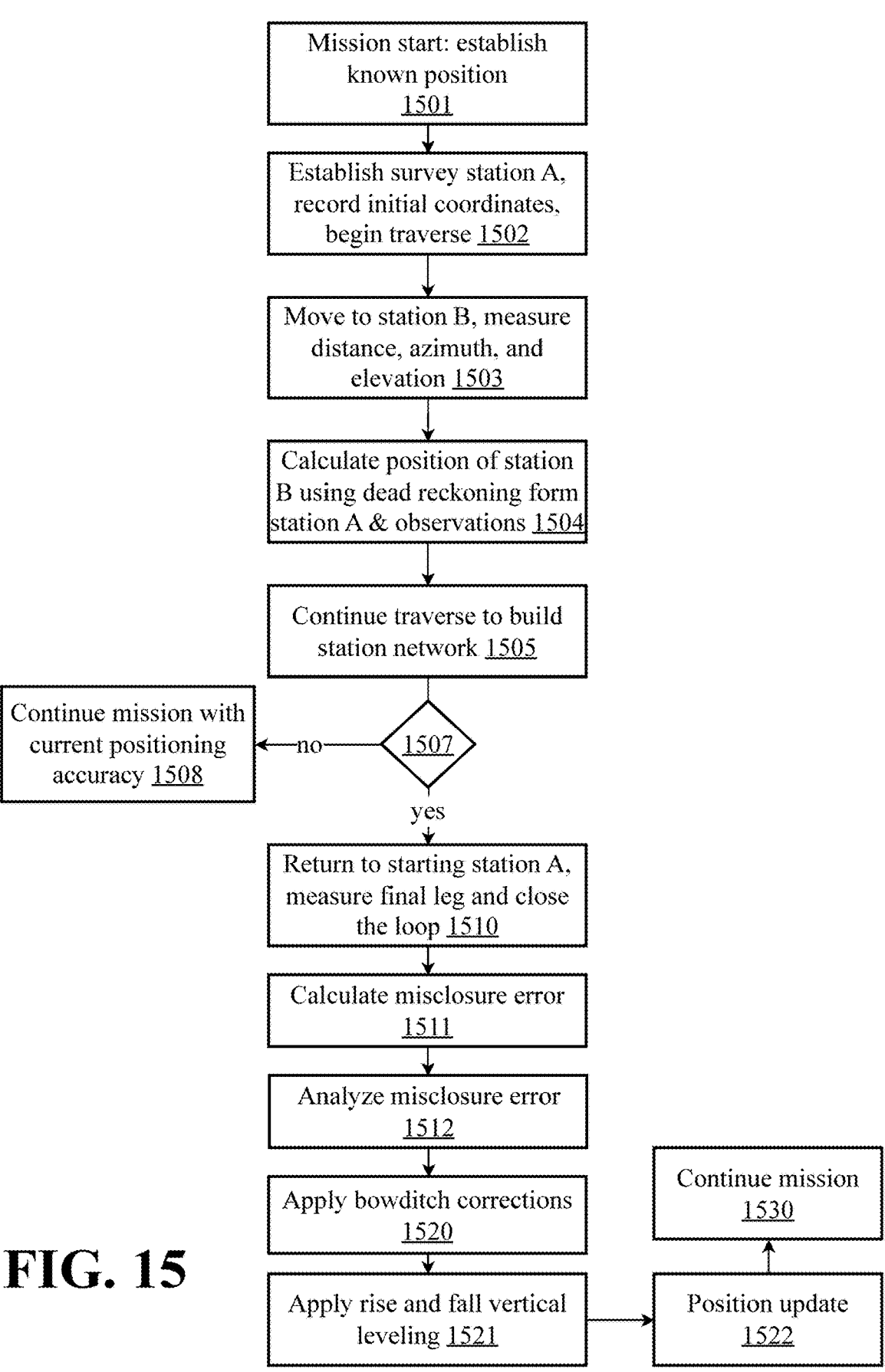
FIG. 15 is a flow diagram illustrating an exemplary GPS-denied traverse and back-trace methodology for achieving survey-grade positioning accuracy in subterranean environments where satellite navigation signals are unavailable or unreliable, according to an embodiment.

FIG. 15 is a flow diagram illustrating an exemplary GPS-denied traverse and back-trace methodology for achieving survey-grade positioning accuracy in subterranean environments where satellite navigation signals are unavailable or unreliable, according to an embodiment. The sequential method flow demonstrates how autonomous drone platforms can maintain centimeter-level positioning accuracy through traditional surveying mathematics combined with modern sensor integration and automated error correction algorithms, enabling precise navigation and coordination in underground facilities, tunnels, mines, and other GPS-denied operational environments.

According to an embodiment, the method initiates with mission start step 1501 that establishes a known reference position comprising easting ($E_0$), northing ($N_0$), altitude ($U_0$), and surface-referenced Z coordinate ($SRZ_0$) values obtained from the last reliable GPS fix before entering the GPS-denied environment or from pre-surveyed control points at facility entry portals. The mission start step implements coordinate system initialization protocols that establish the geodetic reference frame and surface model parameters required for subsequent UGF-SRZ coordinate calculations throughout the traverse operation. Initial position validation ensures that starting coordinates meet accuracy requirements and provide adequate geometric strength for error propagation analysis during subsequent traverse calculations.

Survey station establishment step 1502 implements station monumentation protocols that record the initial coordinates and establish Station A as the primary reference point for the traverse network. The station establishment process comprises coordinate documentation with timestamp and measurement metadata, sensor calibration verification to ensure measurement accuracy, and environmental condition assessment including atmospheric pressure, temperature, and magnetic declination values that may affect subsequent observations. The station establishment step further comprises initialization of the traverse database that will store all subsequent station coordinates, observations, and quality control metrics throughout the traverse operation.

Inter-station measurement step 1503 executes movement from Station A to Station B while collecting comprehensive observation data comprising distance ($d_1$), azimuth ($\theta_1$), and vertical difference ($\Delta U_1$) measurements using integrated sensor systems. The measurement process utilizes LiDAR ranging systems for precise distance measurement, magnetometer and gyroscopic systems for azimuth determination, and barometric or radar altimetry for vertical difference calculation. Observation data may comprise precision metrics and quality indicators that enable subsequent error analysis and correction procedures. The measurement step implements redundant observation protocols that collect multiple independent measurements for each traverse leg, enabling statistical analysis and outlier detection that improves overall measurement reliability and accuracy.

Position calculation step 1504 applies dead reckoning algorithms that compute Station B coordinates based on Station A position combined with the measured observations ($d_1$, $\theta_1$, $\Delta U_1$). The calculation process implements coordinate transformation algorithms that convert polar observations (distance and azimuth) to rectangular coordinate differences, applies elevation corrections based on measured vertical differences, and propagates coordinate uncertainties through the calculation process to maintain accuracy assessment throughout the traverse network. The position calculation step further comprises coordinate validation protocols that verify calculated positions against expected ranges and geometric constraints to detect potential measurement errors or calculation anomalies.

Traverse continuation step 1505 implements systematic network building that extends the traverse through additional stations ($B \rightarrow C \rightarrow D \rightarrow \ldots \rightarrow N$) using identical measurement and calculation procedures for each subsequent leg. The continuation process maintains measurement consistency through standardized observation protocols, implements quality control procedures that monitor measurement precision and accuracy throughout the traverse operation, and builds a comprehensive station database that includes all positions, observations, and metadata required for subsequent error analysis and correction procedures. The traverse continuation step adapts to mission requirements and operational constraints while maintaining geometric strength and measurement redundancy necessary for reliable error correction.

Loop closure decision point 1507 evaluates mission requirements and operational conditions to determine whether return to the starting position is necessary for accuracy verification and error correction. The decision process may consider factors including, but not limited to, mission duration and complexity, required positioning accuracy for subsequent operations, availability of alternative accuracy verification methods, and operational constraints such as battery capacity and mission timeline. When loop closure is not required, the method proceeds to continue mission step 1508 that maintains current positioning accuracy while preserving traverse data for potential post-mission analysis and correction.

According to an embodiment, when loop closure decision point 1507 determines that accuracy verification is required, the method proceeds to return navigation step 1510 that implements systematic return to the starting Station A while measuring the final traverse leg with distance ($d_n$), azimuth ($\theta_n$), and vertical difference ($\Delta U_n$) observations. The return navigation process utilizes previously mapped pathways and station positions to ensure efficient return routing while maintaining measurement accuracy and consistency with forward traverse observations. The return step implements arrival verification protocols that confirm successful return to the starting position within acceptable geometric tolerances.

Misclosure calculation step 1511 computes positioning errors by comparing the calculated final position with the known starting coordinates to determine misclosure vectors in easting ($\Delta E$), northing ($\Delta N$), and elevation ($\Delta U$) components. Misclosure analysis at step 1512 evaluates error magnitude and distribution to assess the overall accuracy of the traverse network and determine appropriate correction procedures. The misclosure calculation implements statistical analysis that considers measurement precision, geometric strength of the traverse network, and expected error propagation to distinguish between acceptable measurement uncertainty and systematic errors requiring correction. The analysis process generates comprehensive error assessment reports that document misclosure magnitude, error distribution patterns, and correction requirements for subsequent processing steps.

Error correction processing begins with Bowditch horizontal correction step 1520 that applies classical surveying adjustment procedures to distribute horizontal positioning errors proportionally among all traverse legs based on their respective distances. The Bowditch correction algorithm computes correction factors for each traverse leg based on the ratio of individual leg distance to total traverse perimeter, applies proportional corrections to easting and northing coordinates at each station, and maintains geometric consistency throughout the adjusted traverse network. The horizontal correction process preserves relative positioning relationships while minimizing overall network distortion and achieving optimal distribution of unavoidable measurement errors.

Rise-and-fall vertical leveling step 1521 implements elevation correction procedures that distribute vertical positioning errors through systematic adjustment of elevation differences between adjacent stations. The rise-and-fall correction process computes cumulative elevation errors and distributes corrections proportionally among all elevation observations, applies elevation adjustments that maintain consistency with observed vertical differences, and ensures that corrected elevations satisfy geometric constraints and measurement consistency requirements. The vertical leveling procedure generates adjusted elevations that achieve survey-grade accuracy while preserving the relative elevation relationships observed during traverse data collection.

Position update step 1522 applies calculated corrections to all station coordinates and converts adjusted positions to UGF-SRZ coordinates using surface model selection and vertical ray projection algorithms described herein. The position update process implements comprehensive coordinate transformation that integrates corrected traverse positions with the unified ground frame coordinate system, applies surface-referenced Z calculations that provide consistent vertical reference for both surface and subterranean operations, and generates final coordinates with accuracy metadata and confidence intervals that enable appropriate safety margin application during subsequent navigation and coordination operations.

According to an embodiment, the method concludes with mission continuation step 1530 that enables autonomous drone operations to proceed with survey-grade positioning accuracy that supports precise navigation, formation control, and collaborative coordination in GPS-denied environments. The mission continuation process integrates corrected positioning with ongoing navigation algorithms, provides position updates to swarm coordination systems, and maintains positioning accuracy through continued application of dead reckoning and sensor fusion techniques. The corrected positions enable centimeter-level navigation accuracy that supports advanced autonomous operations including precision formation flying, accurate target designation, and reliable return-to-base navigation in challenging subterranean environments where conventional GPS-dependent navigation systems would fail.

The GPS-denied traverse and back-trace methodology provides essential positioning capabilities that enable autonomous drone swarms to maintain operational effectiveness in subterranean environments through systematic application of traditional surveying mathematics enhanced with modern sensor integration and automated processing algorithms. The method integrates seamlessly with the UGF-SRZ coordinate system and hierarchical swarm coordination protocols to provide comprehensive navigation support for autonomous operations in GPS-denied environments while maintaining the survey-grade accuracy essential for mission success and operational safety.

Figure 16:
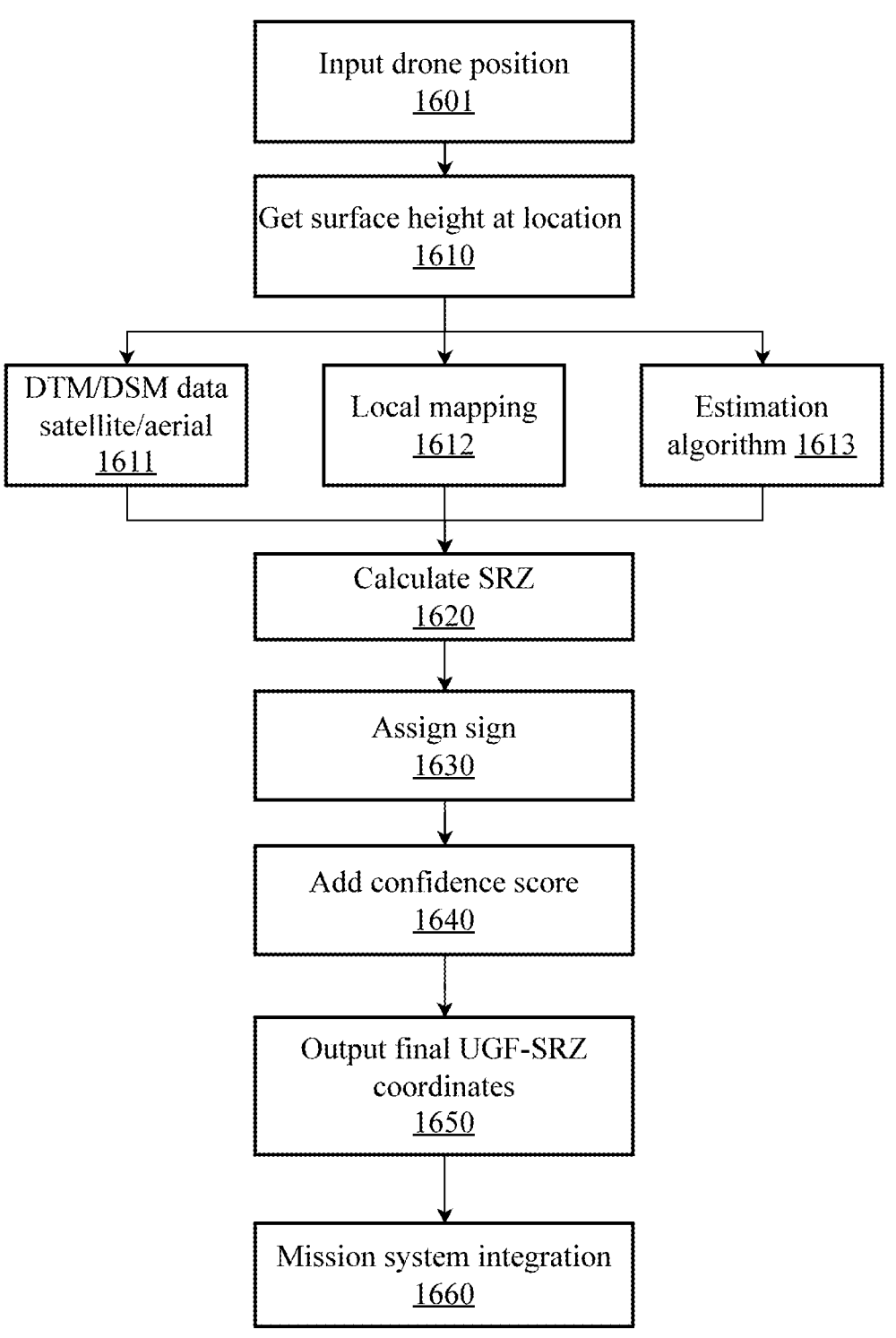
FIG. 16 is a method flow diagram illustrating an exemplary UGF-SRZ coordinate computation process for converting traditional geodetic coordinates into surface-referenced coordinates that enable unified positioning reference above and below ground level, according to an embodiment.

FIG. 16 is a method flow diagram illustrating an exemplary UGF-SRZ coordinate computation process for converting traditional geodetic coordinates into surface-referenced coordinates that enable unified positioning reference above and below ground level, according to an embodiment. The sequential computation method demonstrates how autonomous drone platforms transform conventional navigation coordinates (E, N, U) into the surface-referenced coordinate system (E, N, U, SRZ) through systematic surface model integration and mathematical coordinate transformation, providing consistent spatial reference capabilities essential for seamless operation across surface and subterranean environments.

According to an embodiment, the computation method initiates with input processing step 1601 that receives drone position coordinates comprising easting (E), northing (N), and altitude (U) values from the autonomous navigation system. The input processing step accepts coordinate data from multiple navigation sources including GPS receivers when satellite signals are available, inertial navigation systems for GPS-denied environments, dead reckoning calculations from traverse and back-trace operations described herein, and collaborative positioning algorithms that utilize mesh network coordination among multiple drone platforms. Input validation protocols ensure coordinate accuracy and consistency while maintaining coordinate system integrity throughout the computation process.

Surface height retrieval step 1610 implements comprehensive surface model query procedures that determine the surface elevation $H_{surface}(E, N, t)$ at the drone's planimetric location (E, N) using optimal available surface data sources. The surface height retrieval process queries multiple potential data sources and selects the most appropriate surface reference based on data quality, temporal currency, and confidence metrics. Surface data source 1611 comprises DTM/DSM data from satellite and aerial imagery that provides high-resolution authoritative surface models with sub-meter accuracy when available. Local mapping source 1612 utilizes Hive-led LiDAR scanning and cursory mapping operations that generate real-time surface data when authoritative sources are unavailable or outdated. Surface estimation source 1613 implements algorithmic surface generation including forest canopy stripping, shifting sand modeling, and below-grade fallback procedures when direct surface measurement is not feasible.

The surface height retrieval process implements dynamic source selection algorithms that evaluate data recency, spatial resolution, coverage completeness, and measurement confidence to choose optimal surface references for each coordinate query. Priority hierarchies favor authoritative DTM/DSM data when available, utilize local mapping for areas with recent environmental changes, and apply estimation algorithms when direct measurement sources are insufficient. The retrieval step generates surface height values with associated metadata including surface type identifier, confidence score, and temporal validity information that enables appropriate uncertainty propagation through subsequent coordinate calculations.

SRZ calculation step 1620 applies the fundamental UGF-SRZ mathematical transformation that computes the surface-referenced vertical coordinate by subtracting the retrieved surface height from the drone's altitude using the core formula $SRZ = U - H_{surface}(E, N, t)$. The calculation process implements precise arithmetic operations that maintain coordinate accuracy while accounting for measurement uncertainties and computational precision limitations. Coordinate transformation algorithms ensure mathematical consistency between input geodetic coordinates and output surface-referenced values while preserving spatial relationships and geometric integrity essential for navigation and coordination applications.

The SRZ calculation step processes altitude and surface height values in consistent units and coordinate systems, applies appropriate datum transformations when necessary, and maintains precision through controlled rounding and error propagation procedures. Calculation validation protocols verify computational accuracy and detect potential anomalies including unrealistic altitude differences, coordinate system inconsistencies, and mathematical overflow conditions that could compromise coordinate integrity.

Sign assignment step 1630 implements standardized sign convention protocols that assign positive SRZ values to positions above the selected surface reference and negative SRZ values to positions below the surface reference. The sign assignment process establishes mathematical consistency where SRZ greater than zero indicates drone positions above ground level (equivalent to traditional "Above Ground Level" measurements), SRZ equal to zero indicates positions at the surface reference level, and SRZ less than zero indicates positions below ground level (equivalent to traditional "Below Ground Level" measurements). This unified sign convention eliminates ambiguity between surface and subsurface positioning while enabling consistent navigation algorithms and coordination protocols across diverse operational environments.

The sign assignment step implements validation procedures that verify sign consistency with expected operational parameters, detect potential coordinate anomalies, and ensure mathematical coherence throughout the coordinate transformation process. Sign validation algorithms consider operational context including mission environment, expected altitude ranges, and surface reference characteristics to identify potential calculation errors or unexpected positioning scenarios requiring additional verification.

Confidence scoring step 1640 applies uncertainty assessment procedures that propagate measurement uncertainties from input coordinates and surface data through the coordinate transformation process to generate comprehensive quality metadata for output coordinates. The confidence scoring process evaluates multiple uncertainty sources including input coordinate accuracy from navigation systems, surface data quality and resolution characteristics, computational precision limitations, and temporal validity of surface references. Confidence metrics utilize mathematical uncertainty propagation that combines individual uncertainty components using appropriate statistical methods to generate overall coordinate confidence scores ranging from zero to one.

Quality metadata generation includes surface data source identification, measurement timestamp information, coordinate accuracy estimates, and operational validity indicators that enable downstream navigation and coordination systems to apply appropriate safety margins and operational constraints. The confidence scoring step implements adaptive uncertainty assessment that considers operational environment characteristics, mission criticality requirements, and available alternative positioning methods to provide contextually appropriate quality indicators for autonomous decision-making systems.

Final coordinate generation step 1650 produces complete UGF-SRZ coordinate sets comprising traditional planimetric coordinates (E, N), geodetic altitude (U), surface-referenced vertical coordinate (SRZ), and comprehensive metadata including surface source identification, confidence scoring, and temporal validity information. The output generation process formats coordinates in standardized data structures compatible with autonomous navigation systems, mission planning algorithms, and swarm coordination protocols while maintaining mathematical precision and metadata completeness essential for operational applications.

Output coordinate validation ensures mathematical consistency between all coordinate components, verifies metadata completeness and accuracy, and confirms coordinate format compatibility with downstream processing systems. The coordinate generation step implements data integrity verification through checksums and redundancy validation that detect potential corruption or transmission errors during coordinate distribution to navigation and mission systems.

Mission system integration step 1660 provides final UGF-SRZ coordinates to autonomous navigation systems and mission control algorithms that utilize surface-referenced positioning for precise autonomous operations in both surface and subterranean environments. The integration process implements standardized coordinate interfaces that enable adoption of UGF-SRZ coordinates by existing navigation algorithms while maintaining backward compatibility with traditional coordinate systems when necessary. Coordinate distribution protocols ensure timely delivery of updated positioning information to all relevant subsystems including individual drone navigation, swarm coordination algorithms, mission planning systems, and external command and control interfaces.

According to an embodiment, the UGF-SRZ coordinate computation method provides essential coordinate transformation capabilities that enable autonomous drone swarms to maintain consistent spatial reference across diverse operational environments through systematic integration of optimal surface data sources and robust mathematical coordinate transformation procedures. The method integrates seamlessly with navigation systems described in connection with FIG. 15 and surface reference concepts illustrated in FIG. 14 to provide comprehensive positioning capabilities that support autonomous coordination and navigation in challenging operational environments where traditional coordinate systems would provide inadequate spatial reference for mission success and operational safety.

Figure 17:
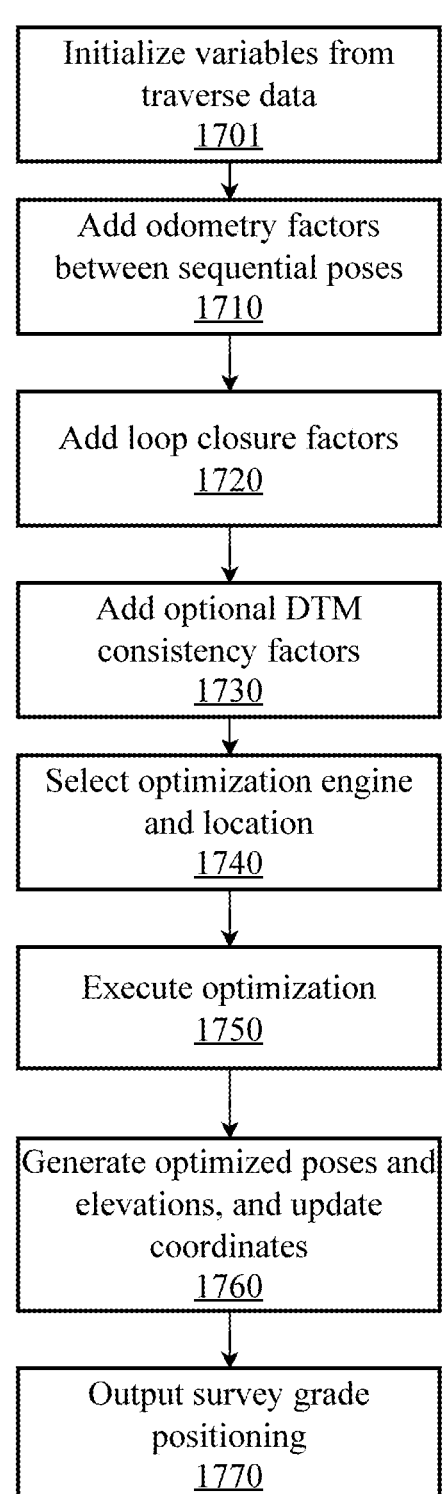
FIG. 17 is a method flow diagram illustrating an exemplary factor graph adjustment process for achieving survey-grade positioning accuracy in GPS-denied environments through advanced mathematical optimization of pose networks and elevation constraints, according to an embodiment.

FIG. 17 is a method flow diagram illustrating an exemplary factor graph adjustment process for achieving survey-grade positioning accuracy in GPS-denied environments through advanced mathematical optimization of pose networks and elevation constraints, according to an embodiment. The factor graph adjustment method may apply sophisticated least-squares optimization algorithms to refine positioning estimates obtained from traverse operations by treating drone poses and elevations as variables connected through measurement factors, loop closure constraints, and optional surface reference factors, enabling centimeter-level positioning accuracy that exceeds conventional dead reckoning and traverse correction methods.

According to an embodiment, the factor graph adjustment process initiates with variable initialization step 1701 that establishes the mathematical framework by defining pose variables and elevation variables derived from traverse data collection operations described herein. Pose variable initialization creates a set of pose variables $\{x_i, y_i, \theta_i\}$ representing the position and orientation of each survey station within the traverse network, where $x_i$ and $y_i$ represent planimetric coordinates in the local coordinate system and $\theta_i$ represents the azimuth orientation at each station. Elevation variable initialization establishes elevation variables $\{z_i\}$ representing the vertical position of each station, providing the foundation for three-dimensional optimization of the complete station network.

The variable initialization process implements data validation that ensures mathematical consistency between traverse observations and initial variable estimates, establishes appropriate coordinate system references for optimization calculations, and assigns initial uncertainty estimates to each variable based on measurement quality and geometric strength of observations.

Initial variable values derive from dead reckoning calculations and traverse adjustment procedures, providing starting estimates that facilitate convergence of subsequent optimization algorithms while maintaining reasonable computational efficiency.

Odometry factor construction step 1710 implements systematic addition of measurement factors that connect sequential poses through observed traverse legs, creating binary factors $f(x_i, x_{\{i+1\}})$ that encode distance, azimuth, and elevation difference measurements between adjacent stations. Odometry factor data comprises comprehensive station-to-station observations including horizontal distance (d), azimuth angle ($\theta$), and elevation difference ($\Delta z$) measurements collected during traverse operations, with each observation creating a binary factor that connects consecutive poses in the factor graph structure. The odometry factors implement measurement models that relate observed quantities to differences between pose variables while accounting for measurement uncertainties and systematic error sources.

Factor construction algorithms apply appropriate weighting based on measurement precision, geometric strength of observations, and environmental conditions during data collection to ensure optimal factor graph performance. The odometry factors provide the primary connectivity structure for the factor graph, establishing geometric relationships that constrain relative positioning between stations while enabling global optimization of the entire network through mathematical optimization procedures.

Loop closure factor addition step 1720 incorporates geometric constraints that arise when the traverse network returns to previously visited locations or when absolute position references become available, providing critical constraints that enable correction of accumulated drift errors throughout the traverse operation. Loop closure factor types include return-to-start constraints that enforce geometric consistency when traverse operations return to the initial station, and GPS re-acquisition constraints that provide absolute position references when satellite navigation becomes available during or after traverse operations. Visual recognition factors utilize landmark identification and place recognition algorithms that detect when drones revisit previously mapped locations, providing additional loop closure constraints based on environmental feature recognition and visual place recognition techniques.

Loop closure factors implement constraint models that specify the expected relationship between poses when geometric closure conditions are satisfied, account for measurement uncertainties and detection confidence levels, and provide mathematical frameworks for incorporating diverse types of closure information including absolute position references, relative position constraints, and place recognition observations. The loop closure factors provide essential global constraints that distinguish factor graph optimization from local trajectory optimization, enabling correction of systematic errors and drift accumulation that would otherwise compromise positioning accuracy over extended operations.

Optional DTM consistency factor incorporation step 1730 adds surface elevation constraints that relate drone elevations to known surface models when reliable terrain data is available, providing absolute elevation references that enhance vertical positioning accuracy. DTM consistency factor implementation creates unary factors $f(z_i)=H_{surface}(x_i, y_i)$ that constrain drone elevations to match known surface elevations plus measured SRZ offsets, providing absolute elevation references when high-quality Digital Terrain Model or Digital Surface Model data is available for the operational area. Surface elevation constraints implement measurement models that account for surface data accuracy, spatial resolution limitations, and temporal validity considerations while providing valuable absolute references that improve overall network accuracy.

The DTM consistency factors provide particularly valuable constraints for operations in areas with high-quality surface data, enabling integration of authoritative geodetic references with autonomous positioning systems. Factor implementation considers surface data confidence levels, spatial interpolation requirements, and coordinate system consistency to ensure optimal integration with pose and elevation variables throughout the optimization process.

Optimization engine selection step 1740 determines appropriate computational resources and algorithmic approaches based on network size, processing constraints, and accuracy requirements. An edge processing option can implement lightweight optimization algorithms suitable for execution on individual drone platforms, providing real-time optimization capability for smaller networks with limited computational requirements. Edge processing utilizes simplified factor graphs with reduced variable sets and streamlined optimization algorithms that maintain computational efficiency while providing improved positioning accuracy compared to basic traverse adjustment methods.

A fog processing option implements full-scale optimization algorithms executed on fog layer servers with enhanced computational resources, enabling optimization of large factor graphs with comprehensive variable sets and sophisticated optimization algorithms. Fog processing provides maximum optimization capability for complex traverse networks, multiple drone coordination, and integration of diverse constraint types while maintaining real-time performance through distributed computing resources positioned near operational areas.

Optimization algorithm execution step 1750 implements iterative least-squares minimization algorithms including, but not limited to, Gauss-Newton and Levenberg-Marquardt methods that minimize the sum of squared residuals across all factors in the graph structure. Optimization algorithm implementation performs iterative least-squares minimization of factor graph residuals through systematic computation of Jacobian matrices that encode the relationship between variables and measurement residuals, solution of linear systems that determine optimal variable adjustments, and iterative variable updates that progressively reduce overall network error. Convergence detection algorithms monitor the magnitude of variable changes between iterations, terminating optimization when change magnitudes fall below predetermined tolerance thresholds that indicate mathematical convergence.

The optimization process implements adaptive algorithms that adjust convergence criteria based on network characteristics, measurement quality, and computational constraints to ensure optimal balance between positioning accuracy and computational efficiency. Robust optimization techniques detect and mitigate the influence of outlier measurements that could compromise overall network accuracy, while maintaining sensitivity to valid measurements that provide essential positioning constraints.

Optimized coordinate generation step 1760 produces refined pose and elevation estimates with significantly improved accuracy compared to initial variable values, implementing coordinate transformation algorithms that convert optimized variables to standard coordinate systems including UGF-SRZ coordinates described herein. The coordinate generation process applies optimized pose variables to update station positions throughout the traverse network, incorporates optimized elevation variables to improve vertical positioning accuracy, and generates comprehensive uncertainty estimates that reflect the improved positioning accuracy achieved through factor graph optimization.

Coordinate output validation ensures mathematical consistency between optimized variables and measurement constraints, verifies coordinate accuracy improvements compared to initial estimates, and confirms compatibility with downstream navigation and coordination systems. The coordinate generation process produces final positioning results with accuracy metadata, confidence intervals, and quality indicators that enable appropriate safety margin application and operational decision-making.

Mission continuation step 1770 provides survey-grade positioning accuracy that enables precise autonomous navigation, formation control, and coordination in GPS-denied environments, with positioning accuracy that approaches or exceeds conventional surveying standards. The factor graph adjustment method integrates with traverse operations, UGF-SRZ coordinate systems, and autonomous navigation algorithms to provide comprehensive positioning capabilities that support advanced autonomous operations in challenging environments where conventional GPS-dependent positioning systems would be inadequate for mission success.

According to an exemplary implementation, the following worked example demonstrates UGF-SRZ coordinate calculation for a three-station traverse (A→B→C) involving a 10-foot elevation drop followed by a 2-foot elevation rise across sloped terrain, illustrating the distinction between traditional geodetic positioning and surface-referenced positioning under varying surface slope conditions.

Station A serves as the traverse starting point with known coordinates established through GPS positioning before entering a GPS-denied environment. Station A coordinates comprise Easting $(E_A)$=1000.00 meters, Northing $(N_A)$ =2000.00 meters, Altitude $(U_A)$=150.00 meters above mean sea level, representing the initial reference position for subsequent traverse calculations. Surface elevation at Station A location is determined to be $H_{surface}(E_A, N_A)$=148.00 meters above mean sea level, indicating that the drone at Station A operates 2.00 meters above the local surface reference.

The traverse proceeds from Station A to Station B with measured observations comprising horizontal distance $d_{AB}$=30.48 meters (100 feet), azimuth $\theta_{AB}$=090° (due east), and vertical difference $\Delta U_{AB}$=−3.048 meters (−10 feet), representing a significant elevation decrease during eastward movement. Dead reckoning calculation determines Station B coordinates as Easting $E_B$=$E_A$+$d_{AB}$×cos($\theta_{AB}$) =1000.00+30.48×cos(90°)=1030.48 meters, Northing $N_B$=$N_A$+$d_{AB}$×sin($\theta_{AB}$)=2000.00+30.48×sin(90°)=2030.48 meters, and Altitude $U_B$=$U_A$+$\Delta U_{AB}$=150.00+(−3.048) =146.952 meters above mean sea level.

Surface elevation at Station B location varies depending on terrain slope characteristics. Under flat surface conditions, surface elevation remains $H_{surface}(E_B, N_B)$=148.00 meters, identical to Station A surface elevation, representing uniform terrain with no elevation change across the traverse distance. Under sloped surface conditions with eastward-descending terrain slope of 2% grade, surface elevation decreases to $H_{surface}(E_B, N_B)$=148.00−(30.48×0.02)=147.39 meters, reflecting natural terrain slope that parallels the drone's elevation change trajectory.

Station B SRZ calculation under flat surface conditions yields SRZ_B=$U$_B−$H_{surface}(E_B, N_B)$=146.952−148.00=− 1.048 meters, indicating that the drone operates 1.048 meters below the surface reference level, representing a transition from above-surface to below-surface operation despite no change in surface elevation. Station B SRZ calculation under sloped surface conditions yields SRZB=$U_B$−$H_{surface}(E_B, N_B)$=146.952−147.39=−0.438 meters, indicating reduced below-surface depth due to terrain slope that partially compensates for the drone's elevation decrease.

The traverse continues from Station B to Station C with measured observations comprising horizontal distance $d_{BC}$=15.24 meters (50 feet), azimuth $\theta_{BC}$=090° (continuing due east), and vertical difference $\Delta U_{BC}$=+0.610 meters (+2 feet), representing partial recovery from the previous elevation loss. Dead reckoning calculation determines Station C coordinates as Easting $E_C$=$E_B$+$d_{BC}$×cos($\theta_{BC}$)=1030.48+ 15.24×cos(90°)=1045.72 meters, Northing $N_C$=$N_B$+$d_{BC}$×sin ($\theta_{BC}$)=2030.48+15.24×sin(90°)=2030.48 meters, and Altitude $U_C$=$U_B$+$\Delta U_{BC}$=146.952+0.610=147.562 meters above mean sea level.

Under flat surface conditions, surface elevation at Station C remains $H_{surface}(E_C, N_C)$=148.00 meters, maintaining uniform surface reference throughout the traverse operation. Under sloped surface conditions with continued 2% eastward-descending grade, surface elevation decreases further to $H_{surface}(E_C, N_C)$=148.00−(45.72×0.02)=147.09 meters, representing cumulative surface elevation change from Station A through the complete traverse distance of 45.72 meters.

Station C SRZ calculation under flat surface conditions yields SRZ$_C$=$U_C$−$H_{surface}(E_C, N_C)$=147.562−148.00=− 0.438 meters, indicating continued below-surface operation with reduced depth compared to Station B due to the partial elevation recovery. Station C SRZ calculation under sloped surface conditions yields SRZ$_C$=$U_C$−$H_{surface}(E_C, N_C)$=147.562−147.09=+0.472 meters, indicating return to above-surface operation due to the combined effect of drone elevation rise and continued surface slope descent.

The worked example demonstrates significant differences in SRZ interpretation based on surface slope characteristics. Under flat surface conditions, the traverse shows progressive transition from above-surface operation at Station A (SRZ$_A$=+2.00 meters) through increasingly below-surface operation at Station B (SRZ$_B$=−1.048 meters) to continued below-surface operation with partial recovery at Station C (SRZ$_C$=−0.438 meters). This interpretation suggests that the drone descends below ground level and remains subsurface throughout the latter portion of the traverse.

Under sloped surface conditions, the traverse demonstrates more realistic operational interpretation where natural terrain slope partially compensates for drone elevation changes. Station A maintains above-surface operation (SRZ$_A$=+2.00 meters), Station B transitions to modest below-surface operation (SRZ$_B$=−0.438 meters), and Station C returns to above-surface operation (SRZ$_C$=+0.472 meters), indicating that the drone follows terrain contours while maintaining reasonable operational altitude above the sloped surface.

The surface slope consideration provides critical operational intelligence for autonomous navigation systems. Flat surface reference interpretation might incorrectly suggest underground operation requiring subterranean navigation protocols, while sloped surface reference provides accurate representation of surface-following flight that requires standard obstacle avoidance and terrain-following navigation algorithms. Safety margin calculations based on SRZ values enable appropriate clearance maintenance, with positive SRZ values allowing standard flight operations and negative SRZ values triggering enhanced ground proximity awareness and specialized navigation procedures.

When incorporated into factor graph adjustment procedures described herein, surface slope considerations enable DTM consistency factors that improve overall positioning accuracy. Optional surface elevation constraints $f(z_i)=H_{surface}(x_i, y_i)$ provide absolute elevation references that account for realistic terrain characteristics, enabling factor graph optimization to achieve survey-grade accuracy while maintaining operational relevance for autonomous navigation in complex terrain environments.

FIG. 19 is a flow diagram illustrating an exemplary method for surface selection and estimation which implements a hierarchical source priority system, confidence scoring algorithms, terrain-specific algorithmic estimation techniques, and below-grade fallback procedures to provide robust surface-referenced coordinate determination across diverse operational environments, according to an embodiment. The surface selection and estimation method provides comprehensive surface determination capabilities that enable accurate UGF-SRZ coordinate calculation despite varying data availability, terrain complexity, and operational constraints.

According to an embodiment, the surface selection and estimation process initiates with receiving, retrieving, or otherwise obtaining a surface request at step 1901 that establishes requirements for surface-referenced coordinate determination at a specified planimetric location (E,N). The surface request process may comprise location specification including easting and northing coordinates, time constraints for surface validity, required confidence levels for operational safety, and terrain classification hints that may influence surface selection algorithms. The request system implements priority-based processing that ensures time-critical surface determinations receive immediate attention while managing computational resources efficiently across multiple concurrent requests.

Cloud DSM/DTM availability assessment at step 1902 implements the highest-priority surface source evaluation by checking for fresh satellite or aerial-derived Digital Surface Model and Digital Terrain Model data within the specified operational area. The assessment process comprises data recency verification that evaluates timestamp information against operational requirements, coverage analysis that confirms adequate spatial coverage for the requested location, resolution assessment that ensures sufficient detail for operational precision requirements, and quality validation that verifies data integrity and processing completeness. The cloud data assessment system maintains cached metadata that enables rapid availability determination without requiring full data retrieval for each request.

Fresh data decision 1903 evaluates whether available cloud DSM/DTM data meets recency requirements based on terrain type, operational criticality, and acceptable staleness thresholds. The decision process comprises temporal analysis that considers data age against terrain change rates, environmental change assessment that evaluates factors such as seasonal variations, construction activity, or natural disasters that could invalidate older surface data, and mission criticality evaluation that adjusts freshness requirements based on operational safety margins and precision requirements. Fresh data criteria automatically adapt to terrain classification, with dynamic environments requiring more recent data than stable terrain types.

When fresh data decision 1903 confirms that recent, high-quality cloud data is available, the system proceeds to use cloud DSM/DTM at step 1904 which provides the highest-confidence surface reference with confidence scoring typically, for example, ranging from 0.8 to 1.0. The cloud data utilization process comprises data retrieval from cached or streaming sources, coordinate transformation to the operational reference frame, interpolation algorithms for sub-pixel location accuracy, and metadata extraction including confidence metrics, processing lineage, and uncertainty estimates. The cloud DSM/DTM system provides immediate surface determination with minimal computational overhead while maintaining the highest available accuracy for subsequent SRZ calculations.

According to an embodiment, when fresh data decision 1903 determines that cloud data is unavailable or insufficiently recent, the system proceeds to fog surface mosaic availability assessment at step 1905 which evaluates previously processed surface data maintained by the fog layer server. The fog mosaic assessment comprises data inventory analysis that identifies available surface tiles within the operational area, consistency verification that ensures mosaic continuity across tile boundaries, confidence evaluation that assesses aggregate reliability of mosaic components, and temporal validity checking that verifies mosaic currency against operational requirements. The fog mosaic system maintains distributed surface data that combines multiple source types while providing enhanced coverage and consistency compared to individual source tiles.

Mosaic suitability decision 1906 determines whether available fog surface mosaic data provides adequate quality and coverage for operational requirements based on confidence levels, spatial resolution, and temporal validity. The suitability assessment comprises confidence threshold comparison against operational requirements, coverage completeness verification that ensures adequate spatial extent, resolution adequacy analysis that confirms sufficient detail for precision requirements, and consistency validation that verifies mosaic quality across the operational area. Suitability criteria adapt dynamically based on operational context, with critical missions requiring higher confidence thresholds than routine operations.

When mosaic suitability decision 1906 confirms adequate fog mosaic data availability, the system proceeds to use fog mosaic at step 1907 which provides medium-high confidence surface reference with confidence scoring typically ranging from 0.6 to 0.8. The fog mosaic utilization process comprises tile retrieval from fog layer storage, coordinate system alignment with operational requirements, boundary interpolation for seamless coverage across tile edges, and confidence propagation that maintains uncertainty estimates throughout the processing chain. The fog mosaic system enables rapid surface determination with moderate computational requirements while providing enhanced accuracy compared to algorithmic estimation methods.

According to an embodiment, when mosaic suitability decision 1906 determines that fog mosaic data is inadequate or unavailable, the system evaluates local cursory mapping feasibility at step 1908 which assesses whether direct surface measurement by the drone swarm is safe and operationally feasible. The feasibility assessment comprises safety analysis that evaluates flight risks, airspace restrictions, and environmental hazards, resource availability verification that confirms adequate drone capacity and battery reserves, operational priority evaluation that balances cursory mapping requirements against primary mission objectives, and time constraint analysis that ensures mapping completion within mission schedules. The feasibility assessment system implements risk-based decision algorithms that prioritize operational safety while maximizing surface determination accuracy.

Local mapping feasibility decision 1909 determines whether cursory surface mapping can be safely executed within operational constraints and resource limitations. The feasibility decision process comprises risk assessment that evaluates flight safety, environmental conditions, and threat exposure, resource analysis that confirms adequate drone availability and power reserves, mission impact evaluation that considers mapping time requirements against operational priorities, and approval verification that ensures cursory mapping aligns with command authorization and rules of engagement. Feasibility criteria automatically adjust based on operational context, with permissive environments enabling more extensive mapping than contested or hazardous areas.

When local mapping feasibility decision 1909 confirms safe and feasible conditions, the system executes local mapping at step 1910 which conducts direct surface measurement using drone-mounted sensors to generate medium-confidence surface reference data with confidence scoring typically ranging, for example, from 0.4 to 0.7. The local mapping process comprises flight path planning that optimizes coverage while minimizing exposure time, sensor data collection using LiDAR, radar altimetry, or photogrammetric methods, real-time processing that generates preliminary surface models during data collection, and quality assessment that validates measurement accuracy and completeness. The local mapping system provides direct surface measurement capability that adapts to immediate operational requirements while maintaining acceptable confidence levels for SRZ determination.

According to an embodiment, when local mapping feasibility decision 1909 determines that direct measurement is unsafe or infeasible, the system proceeds to terrain classification at step 1911 which analyzes available environmental information to select appropriate algorithmic estimation methods. The terrain classification process may comprise geographic analysis using available map data, environmental assessment based on operational intelligence, historical data evaluation that identifies terrain characteristics from previous missions or archived information, and classification algorithm selection that chooses optimal estimation methods based on identified terrain type. The terrain classification system enables intelligent algorithm selection that maximizes estimation accuracy while adapting to diverse environmental conditions and limited input data.

The terrain classification system 1911 implements multiple specialized algorithmic estimation methods optimized for specific terrain types and environmental conditions. Forest canopy stripping at step 1912 addresses forested terrain through progressive morphological filtering algorithms that distinguish between ground returns and canopy vegetation in available point cloud data. The forest processing system may comprise point classification algorithms that separate ground and vegetation returns, morphological filtering techniques that progressively remove vegetation points while preserving ground topology, bare-earth DTM generation that creates ground surface models from filtered point data, and confidence estimation that evaluates algorithm performance based on point density and classification reliability. Forest canopy stripping provides effective surface estimation in vegetated areas where canopy obscures direct ground measurement.

Desert shifting sand estimation at step 1913 addresses dynamic sand environments through multi-temporal analysis and constrained surface modeling that accounts for aeolian processes and dune migration patterns. The desert processing system comprises multi-temporal imagery analysis that identifies stable terrain features despite sand movement, aeolian slope constraint application that enforces realistic sand slope angles and dune formation patterns, robust spline regression that fits smooth surfaces while accommodating outliers and measurement uncertainty, and dynamic change modeling that predicts surface evolution based on wind patterns and terrain characteristics. Desert estimation provides surface determination capability in challenging environments where conventional surface models may be invalidated by sand movement.

Urban/man-made surface processing at step 1914 addresses built environments through Digital Surface Model analysis combined with infrastructure layer subtraction to approximate ground-level surfaces. The urban processing system may comprise DSM preference algorithms that utilize building and infrastructure height data when available, roof and bridge layer identification that distinguishes elevated structures from ground surfaces, infrastructure subtraction techniques that remove elevated features to approximate pedestrian and vehicle grade levels, and ground grade approximation that generates surface models suitable for operational navigation and coordination. Urban processing provides surface estimation in complex built environments where ground access may be restricted or hazardous.

Hydrology/water surface modeling at step 1915 addresses aquatic environments through water stage analysis and hydrological modeling that accounts for tidal variations, seasonal changes, and flow dynamics. The water processing system may comprise water surface model generation using stage and tide readings when available, local altimetry integration that incorporates real-time water level measurements, hydrological analysis that considers flow patterns and seasonal variations, and temporal validity assessment that ensures water surface models reflect current conditions. Water surface modeling provides accurate surface reference for operations near or over aquatic environments where conventional terrain models are inappropriate.

According to an embodiment, when algorithmic estimation methods fail to produce reliable results or when only minimal terrain information is available, the system activates below-grade fallback at step 1916 which utilizes fog-maintained grade reference data as a provisional surface baseline. The below-grade fallback process may comprise grade reference retrieval from fog layer storage, coordinate system transformation to operational requirements, provisional surface assignment using available grade data, and labeling protocols that clearly identify below-grade status and associated limitations. The below-grade system provides minimal surface reference capability that enables continued operations while clearly indicating reduced confidence and accuracy compared to higher-priority surface sources.

Confidence scoring at step 1917 implements comprehensive reliability assessment that evaluates surface determination quality based on source type, data recency, spatial resolution, processing method, and environmental factors. The confidence scoring process may comprise source reliability weighting that assigns base confidence based on surface determination method, temporal decay modeling that reduces confidence based on data age and terrain change rates, resolution adequacy assessment that considers spatial detail relative to operational requirements, and environmental factor integration that accounts for conditions that may affect surface accuracy such as weather, vegetation changes, or recent construction activity. Confidence scores range from 0.0 to 1.0, with values above 0.8 indicating high reliability suitable for precision operations and values below 0.3 triggering additional verification requirements.

Surface mosaic generation at step 1918 combines surface data from multiple sources and processing methods to create seamless, multi-resolution surface representations with continuity across tile boundaries. The mosaic generation process can comprise tile boundary alignment that ensures seamless transitions between adjacent surface tiles, resolution harmonization that balances detail preservation with computational efficiency, confidence weighting that emphasizes higher-quality data while maintaining coverage completeness, and multi-resolution output generation that provides appropriate detail levels for different operational scales. The surface mosaic system enables comprehensive surface coverage that combines the best available data from multiple sources while maintaining consistency and reliability across operational areas.

SRZ computation at step 1919 performs the final surface-referenced coordinate calculation using the determined surface model to generate precise vertical positioning relative to the selected surface reference. The SRZ computation process comprises surface interpolation at the requested planimetric location (E,N), elevation difference calculation between the operational height (U) and interpolated surface height ($H_{surface}$), coordinate system verification that ensures consistent reference frames, and metadata attachment that includes surface identification, confidence scoring, and processing provenance. The SRZ computation generates the final surface-referenced vertical coordinate with the formula $SRZ=U-H_{surface}(E,N,t)$, providing positive values above the surface and negative values below the surface.

According to an embodiment, a fog server issues SRZ corrections at step 1920 implements continuous improvement through feedback mechanisms that enable the fog layer to distribute enhanced surface data and coordinate corrections as improved information becomes available. The correction process comprises surface model improvement based on accumulated data from multiple operations, correction calculation that determines adjustments required for previously issued SRZ coordinates, distribution protocols that efficiently transmit corrections to edge devices through the communication hierarchy, and version control that maintains consistency across distributed operations while enabling incremental improvements. The correction system provides continuous surface model enhancement that improves accuracy over time while maintaining operational continuity.

Exemplary Hardware Environment

In one exemplary embodiment, the command drone is implemented as a Queen prototype platform incorporating specific hardware and software configurations that demonstrate practical implementation of the autonomous swarm coordination capabilities described herein.

The Queen drone prototype incorporates a dual-module processing architecture optimized for autonomous swarm coordination and real-time decision-making. In some embodiments, a Mission-AI Module (e.g., i.e., processing system) implements an NVIDIA Jetson AGX Orin 64 GB system providing approximately 275 TOPS of AI performance with configurable power consumption ranging from 15-60 watts. This high-performance computing module provides sufficient computational capacity for large language model processing, multi-modal sensor fusion, and real-time mission planning algorithms. In some aspects, the Mission-AI Module specifically supports the LLaMA-13B architecture implementation described herein while maintaining power consumption within acceptable limits for sustained aerial operations.

According to the prototype embodiment, a Swarm-Control Module (i.e., navigation and control system) utilizes an ARK Jetson PAB Orin NX 16 GB NDAA-compliant bundle providing approximately 100 TOPS INT8 performance with 10-25 watt power consumption. This processing unit handles leader-follower control algorithms, mesh routing protocols, RAFT consensus logic, and telemetry coordination for a plurality of Worker drones. Capacity analysis demonstrates that policy inference requirements of approximately 5 GFLOPs at 10 Hz per Worker drone results in 0.5 TOPS total utilization for a plurality of Workers, representing less than one percent of available 100 TOPS capacity and enabling coordination of a large plurality of Workers while operating at less than fifteen percent utilization for the baseline ten-Worker configuration.

According to the prototype embodiment, a Flight Controller (i.e., navigation and control system) implements a Pixhawk 6X-class or CUAV X7 Pro NDAA-compliant system providing low-latency attitude, rate, and motor-mix control with triple-redundant IMU systems and dual barometers. The flight control system interfaces to twelve PWM/UAVCAN channels, dual GPS receivers, ADS-B transponder, and USB-C connectivity while maintaining 5V at 3 A regulation capability. The flight controller serves as the primary autopilot while the Swarm-Control Orin NX functions as the companion computer, adding approximately 0.2 pounds to the overall system weight.

According to an embodiment, the prototype implements swappable lithium-ion smart battery packs utilizing 12-14 series configuration providing approximately 1200 watt-hours of energy storage. The electrical architecture utilizes 50V main bus for propulsion systems, 24V avionics rail, and 5V/12V auxiliary converters for subsystem power distribution. Peak load budget analysis indicates propulsion requirements of 1800 watts, Mission-AI module consumption of 60 watts, Swarm-Control module consumption of 25 watts, and sensors/communications consumption of 40 watts for total system power requirements below 2 kilowatts.

The power management system may comprise hot-swap capabilities enabling continuous operation during battery replacement procedures. The hot-swap buffer system requires two batteries for normal operation but enables battery replacement when one battery remains connected while the second battery is replaced, followed by replacement of the remaining battery after the first replacement is completed. High-current charging ports sized for 1 C charging rate enable rapid battery restoration while robotic docking capabilities are deferred to Phase II development.

According to an embodiment, the prototype incorporates comprehensive sensor integration optimized for multi-modal environmental awareness and target identification. Voice command capabilities can utilize a far-field four-microphone array with beam-forming digital signal processing operating at frequencies above 20 kHz. Terrain-aware self-positioning employs RGB global-shutter 12 megapixel cameras in 360-degree under-body mounting configuration, micro-LiDAR and photogrammetry systems with 20-meter range for immediate obstacle mapping, high-density mapping LiDAR and photogrammetry for modular payload applications, and thermal imaging systems equivalent to FLIR capabilities optimized for object detection in low-light and heat-optimized environments.

Target detection and positive identification capabilities utilize electro-optical/infrared dual-sensor gimbal systems providing 640×480 LWIR and 4K RGB imaging capabilities. Mesh networking implementation incorporates tri-band software-defined radio systems supporting S-band, C-band, and HF 3-30 MHz frequency ranges, eye-safe 30 milliwatt laser systems, and LED array visual LiFi capabilities. The HF link serves as the primary long-haul communication pathway utilizing narrow-band frequency-hopping protocols operating at 64 kilobits per second or higher data rates.

Local connectivity includes dual-band Wi-Fi 802.1 lac and Bluetooth 5.2 capabilities for maintenance and pre-flight configuration procedures. The mesh network sustains aggregate user data rates of 300 megabits per second or higher to support ten (or more) simultaneous 720p30 H.265 video feeds at 3 megabits per second each plus telemetry margin requirements. Multi-modal fusion capabilities utilize 10 gigabit Ethernet connections to mission computing systems, four-lane CSI-2 camera interfaces, and CAN bus integration for LiDAR and photogrammetry system connectivity.

According to the prototype embodiment, the storage architecture implements 1 TB M.2 NVMe PCIe Gen4 drives shared across both processing modules via carrier backplane for operating system storage, container images, model weights, and operational logs. This storage system operates independently from the 2 TB buffer storage to ensure random-IO performance remains optimal during cache drive streaming operations. The storage system adds approximately 8 grams weight and consumes approximately 4 watts peak power consumption.

According to the prototype embodiment, internal networking utilizes 10 gigabit Ethernet or PCIe Gen4 bridge connections between Mission-AI and Swarm-Control modules with latency specifications below 2 microseconds. Thermal management implements dual heat-pipe systems with 60 millimeter blowers and airflow routing through dorsal chimneys to maintain junction temperatures below 75 degrees Celsius at 40 degrees Celsius ambient temperature.

Buffer storage provides rolling 8-hour sensor buffering and mission replay capabilities with sustained write bandwidth exceeding 1 gigabit per second without impacting inference latencies. The buffer storage system adds approximately 15 grams weight and consumes approximately 4 watts peak power while providing essential mission data preservation and replay capabilities for post-mission analysis and training applications.

This exemplary Queen drone prototype demonstrates practical implementation of the autonomous swarm coordination capabilities described herein while providing specific technical specifications that enable reproduction of the invention by persons skilled in the relevant arts.

Exemplary Computing Environment

FIG. 20 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM) and a plurality of caches 34, and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. An autonomous drone swarm system for subterranean and GPS-denied operations comprising:
   a hierarchical swarm architecture comprising:
      at least one command drone comprising a large language model processor configured to process natural language instructions and generate autonomous mission plans; and
      a plurality of subordinate drones configured to execute tasks delegated by the command drone;
   a multi-modal communication system establishing encrypted mesh network connectivity between drones using at least two communication modalities selected from radio frequency, optical beaconing, acoustic signaling, and visual communication channels, wherein the mesh network implements self-healing protocols that automatically adapt routing pathways when individual communication links become unavailable;
   a GPS-denied navigation system comprising:
      multi-sensor dead reckoning algorithms processing inertial measurement data, visual odometry, and LiDAR scan matching;
      a Unified Ground Frame with Surface-Referenced Z (UGF-SRZ) coordinate system that dynamically selects surface references from hierarchical data sources comprising satellite-derived digital surface models, fog-maintained surface mosaics, local drone-generated cursory mapping, and algorithmic surface estimation, and computes signed vertical coordinates where positive SRZ values indicate positions above the selected surface reference and negative SRZ values indicate positions below the surface reference, thereby enabling unified coordinate representation across surface and subterranean operational environments; and
      collaborative positioning protocols that share navigation data across the mesh network to enhance swarm-wide positioning accuracy;
   a distributed mapping and localization system specifically configured for subterranean operations comprising:
      edge processing algorithms at individual drones that generate keyframes, feature descriptors, and point cloud fragments optimized for GPS-denied environments;
      fog layer processing that performs multi-agent map fusion, loop closure detection, and pose graph optimization using data streams from multiple drones, wherein the fog layer integrates UGF-SRZ surface corrections with collaborative mapping to maintain coordinate consistency between surface and subterranean operations; and
      map correction distribution that provides updated environmental models and UGF-SRZ positioning corrections back to individual drones, enabling seamless navigation transitions between surface and underground environments.

2. The system of claim 1, further comprising UGF-specific adhesion Workers configured to adhere to infrastructure surfaces including walls, ceilings, and pipes, wherein the adhesion Workers function as persistent communication relays, navigation reference targets, and environmental sensors.

3. The system of claim 1, further comprising federated learning protocols wherein subordinate drones generate compressed model parameter updates based on local operational experience and transmit the updates to the command drone without transmitting raw sensor data, and wherein the command drone aggregates the updates to improve swarm-wide artificial intelligence capabilities.

4. The system of claim 1, further comprising fault-tolerant operation protocols comprising continuous health monitoring of drone platforms, automatic task redistribution when individual drones become unavailable, consensus-based leader election using distributed algorithms when command drones fail, and degraded-mode operations that maintain essential mission capabilities despite reduced swarm capacity.

5. The system of claim 1, wherein the UGF-SRZ coordinate system implements surface selection policies that prioritize satellite-derived digital surface models when available, utilize fog-maintained surface mosaics when satellite data is unavailable or outdated, activate local drone-generated cursory mapping when higher-priority sources are insufficient, and apply algorithmic surface estimation as a fallback when direct measurement is not feasible.

6. The system of claim 1, further comprising a duo-sensing baseline scheme wherein individual drones are equipped with two spatially separated sensors at a fixed baseline distance, enabling single-vehicle triangulation and distance estimation for autonomous navigation when peer drones are not visible.

7. The system of claim 1, further comprising store-and-forward protocols that activate during communication degradation, wherein critical telemetry and events are written to append-only, content-addressable logs with signed manifests, queued by priority levels, and encrypted at rest, and wherein drones implement opportunistic peer synchronization and distribute erasure-coded parity to prevent mission data loss.

8. The system of claim 1, wherein the fog layer processing further implements point cloud registration using iterative closest point algorithms, three-dimensional mesh generation through surface reconstruction, and semantic labeling of environmental elements using machine learning algorithms.

9. The system of claim 1, further comprising GPS-denied traverse and back-trace methodology comprising systematic station-to-station movement with distance, azimuth, and vertical difference measurements, misclosure calculation upon return to starting position, and error correction using horizontal Bowditch adjustment and rise-and-fall vertical leveling to achieve survey-grade positioning accuracy.

10. The system of claim 1, wherein the multi-modal communication system further comprises delay-tolerant networking protocols for orchestrating data synchronization during communication restoration, implementing integrity-checked bandwidth scheduling with content hash deduplication to optimize catch-up operations.

11. A method for autonomous drone swarm operations in subterranean and GPS-denied environments comprising the steps of:

coordinating drone operations through a hierarchical swarm architecture by:

processing natural language instructions at a command drone using a large language model processor to generate autonomous mission plans; and executing tasks at a plurality of subordinate drones as delegated by the command drone;

establishing encrypted mesh network connectivity between drones using at least two communication modalities selected from radio frequency, optical beaconing, acoustic signaling, and visual communication channels, and implementing self-healing protocols that automatically adapt routing pathways when individual communication links become unavailable;

performing GPS-denied navigation by:

processing inertial measurement data, visual odometry, and LiDAR scan matching using multi-sensor dead reckoning algorithms;

computing signed vertical coordinates using a Unified Ground Frame with Surface-Referenced Z (UGF-SRZ) coordinate system that dynamically selects surface references from hierarchical data sources comprising satellite-derived digital surface models, fog-maintained surface mosaics, local drone-generated cursory mapping, and algorithmic surface estimation, where positive SRZ values indicate positions above the selected surface reference and negative SRZ values indicate positions below the surface reference, thereby enabling unified coordinate representation across surface and subterranean operational environments; and sharing navigation data across the mesh network using collaborative positioning protocols to enhance swarm-wide positioning accuracy;

executing distributed mapping and localization specifically configured for subterranean operations by:

generating keyframes, feature descriptors, and point cloud fragments at individual drones using edge processing algorithms optimized for GPS-denied environments;

performing multi-agent map fusion, loop closure detection, and pose graph optimization at a fog layer processor using data streams from multiple drones, wherein the fog layer integrates UGF-SRZ surface corrections with collaborative mapping to maintain coordinate consistency between surface and subterranean operations; and distributing updated environmental models and UGF-SRZ positioning corrections back to individual drones, enabling seamless navigation transitions between surface and underground environments.

12. The method of claim 11, further comprising deploying UGF-specific adhesion Workers that adhere to infrastructure surfaces including walls, ceilings, and pipes, and operating the adhesion Workers as persistent communication relays, navigation reference targets, and environmental sensors.

13. The method of claim 11, further comprising implementing federated learning by generating compressed model parameter updates at subordinate drones based on local operational experience, transmitting the updates to the command drone without transmitting raw sensor data, and aggregating the updates at the command drone to improve swarm-wide artificial intelligence capabilities.

14. The method of claim 11, further comprising implementing fault-tolerant operations by continuously monitoring health of drone platforms, automatically redistributing tasks when individual drones become unavailable, executing consensus-based leader election using distributed algorithms when command drones fail, and maintaining essential mission capabilities through degraded-mode operations despite reduced swarm capacity.

15. The method of claim 11, wherein computing signed vertical coordinates comprises implementing surface selection policies that prioritize satellite-derived digital surface models when available, utilize fog-maintained surface mosaics when satellite data is unavailable or outdated, activate local drone-generated cursory mapping when higher-priority sources are insufficient, and apply algorithmic surface estimation as a fallback when direct measurement is not feasible.

16. The method of claim 11, further comprising performing single-vehicle triangulation using a duo-sensing baseline scheme wherein individual drones equipped with two spatially separated sensors at a fixed baseline distance estimate distance and bearing for autonomous navigation when peer drones are not visible.

17. The method of claim 11, further comprising activating store-and-forward protocols during communication degradation by writing critical telemetry and events to append-only, content-addressable logs with signed manifests, queuing data by priority levels, encrypting data at rest, implementing opportunistic peer synchronization between drones, and distributing erasure-coded parity to prevent mission data loss.

18. The method of claim 11, wherein performing multi-agent map fusion further comprises implementing point cloud registration using iterative closest point algorithms, generating three-dimensional meshes through surface reconstruction, and performing semantic labeling of environmental elements using machine learning algorithms.

19. The method of claim 11, further comprising executing GPS-denied traverse and back-trace methodology by performing systematic station-to-station movement with distance, azimuth, and vertical difference measurements, calculating misclosure upon return to starting position, and correcting errors using horizontal Bowditch adjustment and rise-and-fall vertical leveling to achieve survey-grade positioning accuracy.

20. The method of claim 11, wherein establishing encrypted mesh network connectivity further comprises implementing delay-tolerant networking protocols for orchestrating data synchronization during communication restoration, and executing integrity-checked bandwidth scheduling with content hash deduplication to optimize catch-up operations.

* * * * *